United States Patent
You et al.

(10) Patent No.: US 12,342,327 B2
(45) Date of Patent: Jun. 24, 2025

(54) METHOD FOR CONFIGURING RESOURCE OF IAB NODE, AND DEVICE USING METHOD

(71) Applicant: LG ELECTRONICS INC., Seoul (KR)

(72) Inventors: Hyangsun You, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 193 days.

(21) Appl. No.: 17/796,227

(22) PCT Filed: Feb. 1, 2021

(86) PCT No.: PCT/KR2021/001279
§ 371 (c)(1),
(2) Date: Jul. 28, 2022

(87) PCT Pub. No.: WO2021/154058
PCT Pub. Date: Aug. 5, 2021

(65) Prior Publication Data
US 2024/0015705 A1    Jan. 11, 2024

(30) Foreign Application Priority Data

Jan. 31, 2020 (KR) .......... 10-2020-0012082
Feb. 13, 2020 (KR) .......... 10-2020-0017897

(51) Int. Cl.
H04W 72/0446    (2023.01)

(52) U.S. Cl.
CPC .................. *H04W 72/0446* (2013.01)

(58) Field of Classification Search
CPC ......... H04W 72/0446; H04W 84/0447; H04W 72/21; H04W 72/23; H04W 72/53; H04W 72/535; H04W 84/047; H04W 74/004; H04L 72/2602

See application file for complete search history.

(56) References Cited

U.S. PATENT DOCUMENTS

| | | | | |
|---|---|---|---|---|
| 11,418,375 | B2 * | 8/2022 | You | H04L 27/2602 |
| 11,516,063 | B2 * | 11/2022 | You | H04L 5/0048 |
| 11,528,173 | B2 * | 12/2022 | You | H04L 27/2613 |
| 2019/0261454 | A1 * | 8/2019 | Xiong | H04L 1/0026 |
| 2019/0313433 | A1 | 10/2019 | Abedini et al. | |
| 2022/0361174 | A1 * | 11/2022 | Liu | H04L 27/2602 |
| 2023/0171029 | A1 * | 6/2023 | Abotabl | H04L 1/1893 370/329 |

FOREIGN PATENT DOCUMENTS

WO    2019194737 A1    10/2019

OTHER PUBLICATIONS

"IAB resource configuration and multiplexing", Ericsson, 3GPP TSG-RAN WG1 Meeting #98bis, Chongqing, China, Oct. 14-20, 2019, R1-191092.

(Continued)

*Primary Examiner* — Hanh N Nguyen
(74) *Attorney, Agent, or Firm* — BRYAN CAVE LEIGHTON PAISNER LLP

(57) ABSTRACT

The present disclosure relates to a method for configuring a resource of an IAB node, and a device using the method.

12 Claims, 46 Drawing Sheets

(56) References Cited

OTHER PUBLICATIONS

"Mechanisms for resource multiplexing among backhaul and access links", NTT Docomo, Inc., 3GPP TSG RAN WG1 #98bis, Chongqing, China, Oct. 14-18, 2019, R1-1911166.
"Mechanisms for Resource Multiplexing among Backhaul and Access links", Intel Corporation, 3GPP TSG RAN WG1 #99, Nov. 18-Nov. 22, 2019, Chongqing, China, R1-1912202.
European Search Report for EP Patent Application No. 21748166.2 dated Jan. 26, 2024.
AT&T "Summary #1 of 7.2.3.1—Mechanisms for resource multiplexing among backhaul and access links," 3GPP TSG RAN WG1 #99, R1-1913321, dated Nov. 2019.
Nokia "Signalling for IAB timing," 3GPP TSG-RAN WG2 Meeting #108, R2-1915324, dated Nov. 2019.

* cited by examiner

METHOD FOR CONFIGURING RESOURCE OF IAB NODE, AND DEVICE USING METHOD

This application is a continuation application of is a National Stage filing under 35 U.S.C. 371 of International Application No. PCT/KR2021/001279, filed Feb. 1, 2021, which claims the benefit of KR 10-2020-0012082 A, filed Jan. 31, 2020 and KR 10-2020-0017897 A, filed Feb. 13, 2020, which are hereby incorporated by reference as fully set forth herein.

BACKGROUND OF THE DISCLOSURE

Field of the Disclosure

This disclosure relates to wireless communication.

Related Art

One potential technology aimed at enabling future cellular network deployment scenarios and applications is support for wireless backhaul and relay links. This enables flexible and highly dense deployment of NR cells without the need to proportionally densify the transport network.

It is expected that greater bandwidth in NR compared to LTE with the native deployment of massive MIMO or multi-beam systems will be available. Thus (e.g., mmWave spectrum) creates opportunities for the development and deployment of integrated access and backhaul links. This makes it easier for a deployment of a dense network of self-backhauled NR cells in a more integrated manner by establishing multiple control and data channels/procedures defined to provide access or access to the terminals. Such systems are referred to as integrated access and backhaul links (IAB).

SUMMARY OF THE DISCLOSURE

The present specification proposes a resource configuration method of an IAB node and an apparatus using the method.

According to the present specification, by proposing a method of processing overlapped resources in the time domain, more efficient communication is possible in the IAB system.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

The accompanying drawings below are provided to help understanding of the present disclosure, and may provide embodiments of the present disclosure together with the detailed description. However, the technical features of the present disclosure are not limited to specific drawings, and features disclosed in each drawing may be combined with each other to constitute a new embodiment. Reference numerals in each drawing may refer to structural elements.

FIG. 25 shows an example of IAB node timing when using timing alignment case 1.

FIG. 26 shows an example of the timing of the IAB node when using the timing alignment case 6.

FIG. 27 shows an example of the timing of the IAB node when using the timing alignment case 7.

DESCRIPTION OF EXEMPLARY
EMBODIMENTS

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

Figure 1:
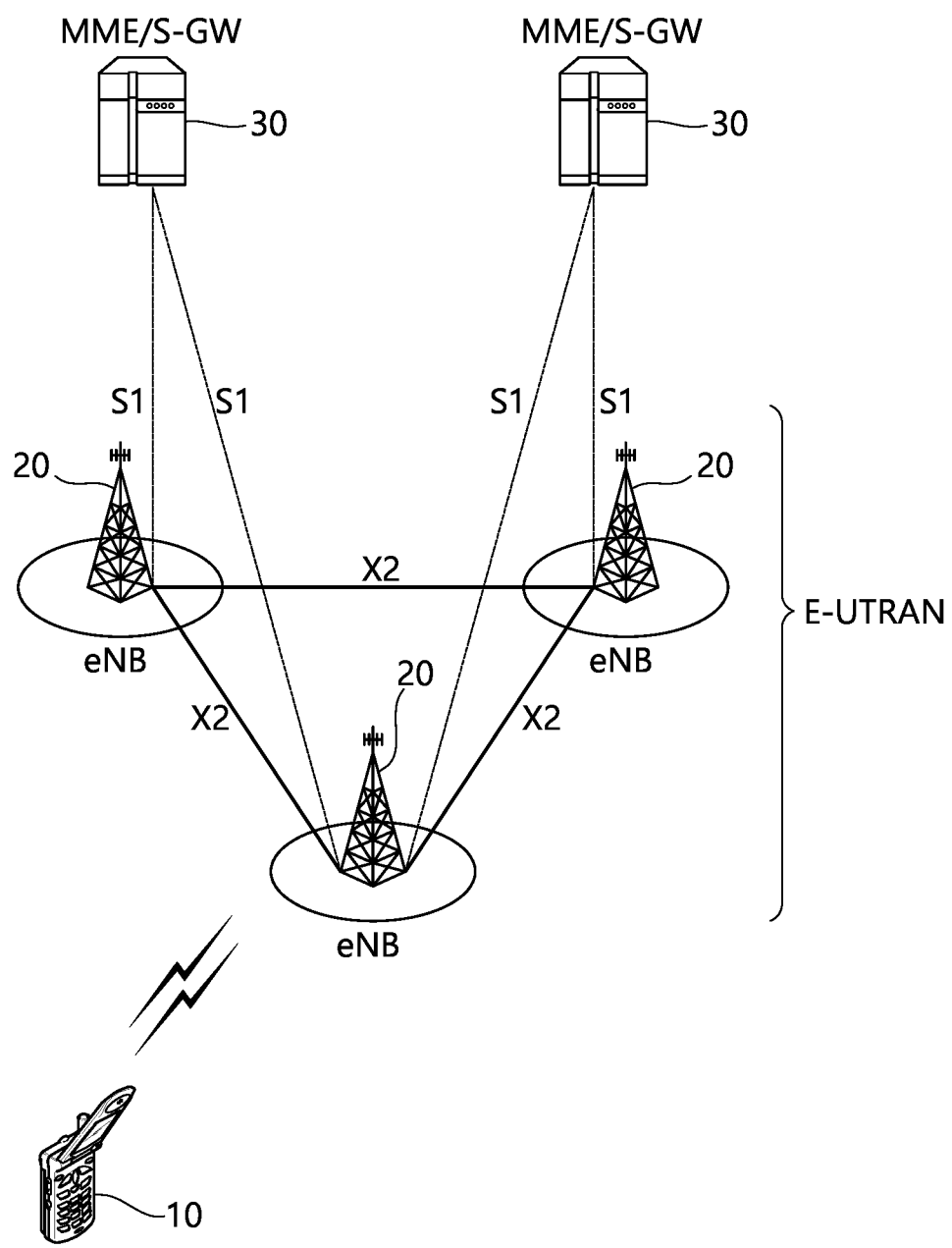
FIG. 1 shows a wireless communication system to which the present disclosure can be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
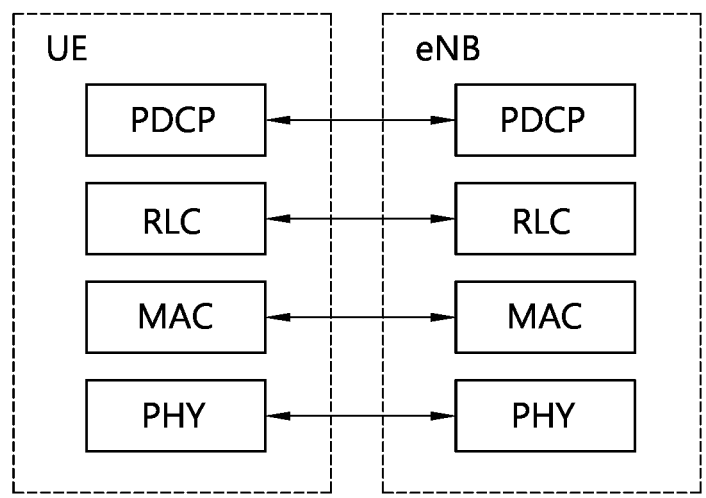
FIG. 2 is a diagram showing a wireless protocol architecture for a user plane.
Figure 3:
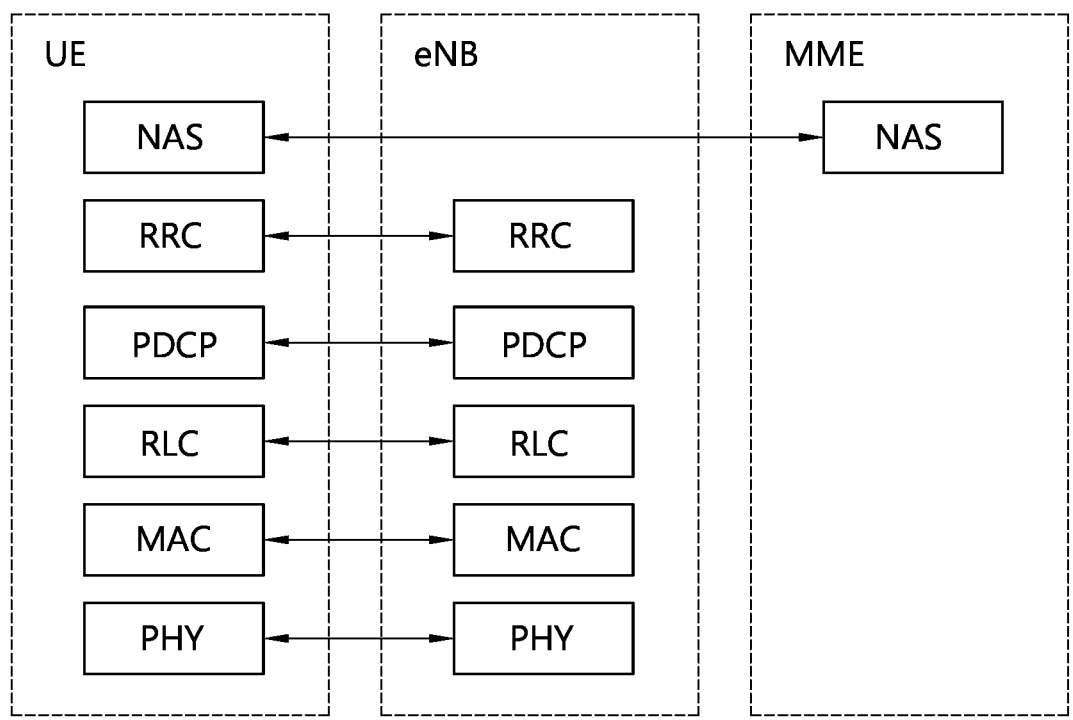
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer (=higher layer) with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time of transmission, and may be, for example, a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
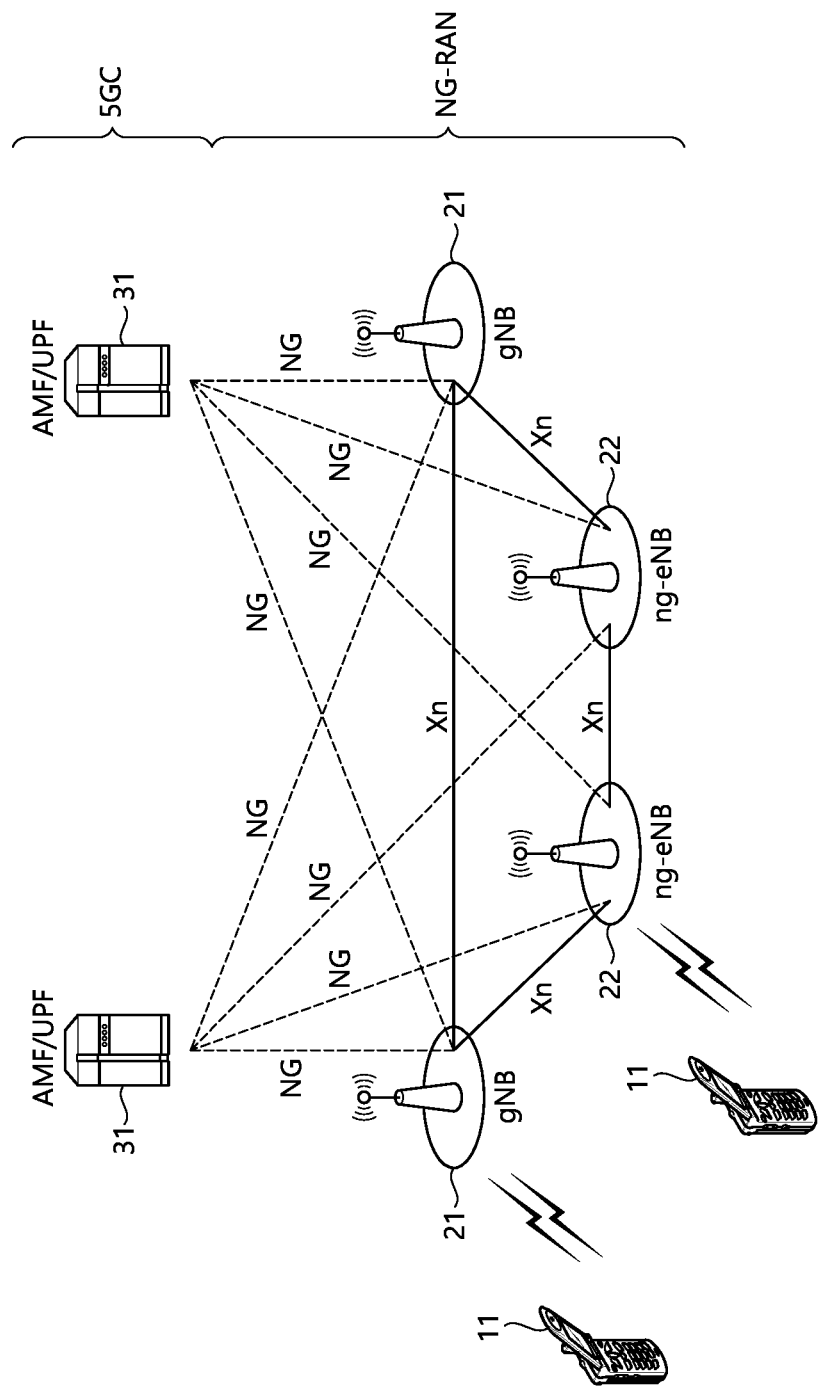
FIG. 4 shows another example of a wireless communication system to which the technical features of the present disclosure can be applied.

FIG. 4 illustrates another example of a wireless communication system to which technical features of the present disclosure are applicable.

Specifically, FIG. 4 shows system architecture based on a 5G new radio access technology (NR) system. Entities used in the 5G NR system (hereinafter, simply referred to as "NR") may absorb some or all functions of the entities (e.g., the eNB, the MME, and the S-GW) introduced in FIG. 1. The entities used in the NR system may be identified by terms with "NG" to be distinguished from LTE entities.

Referring to FIG. 4, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 5:
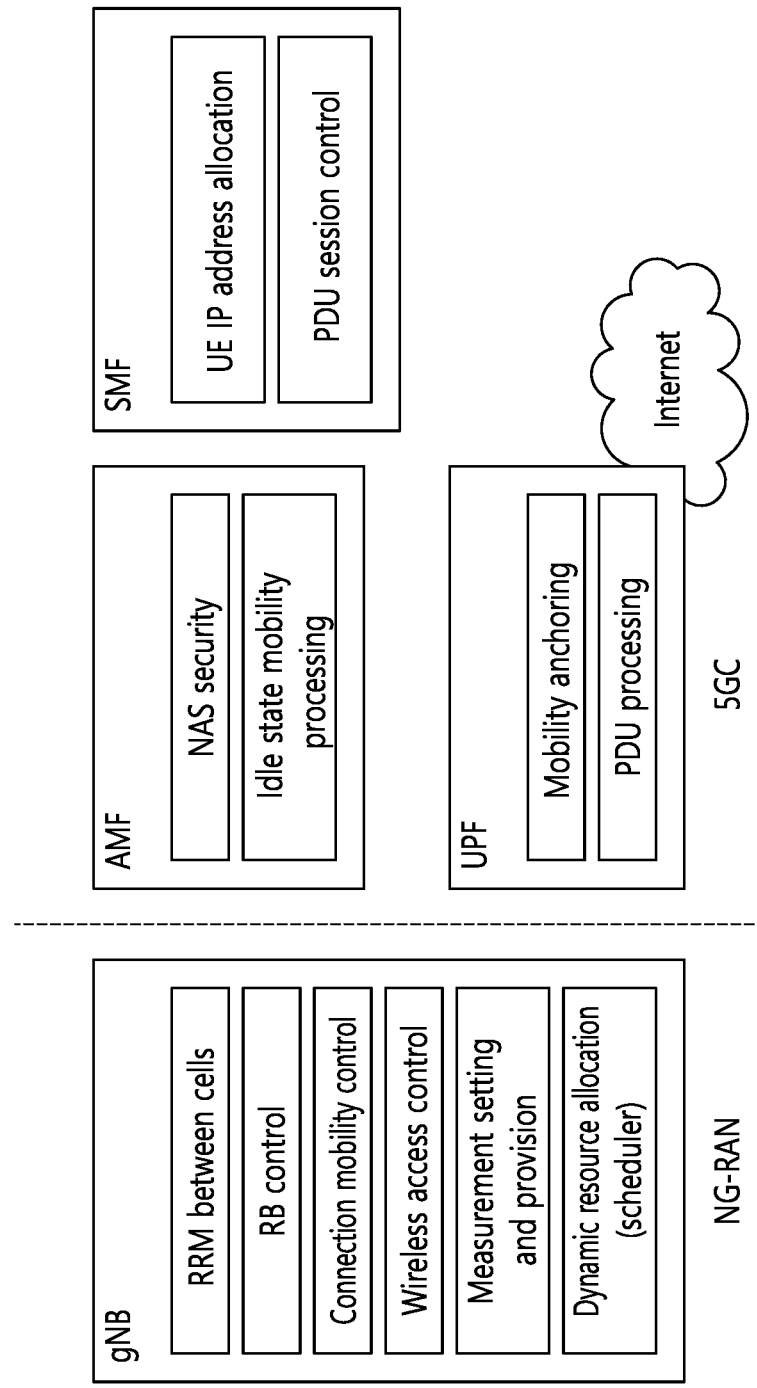
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
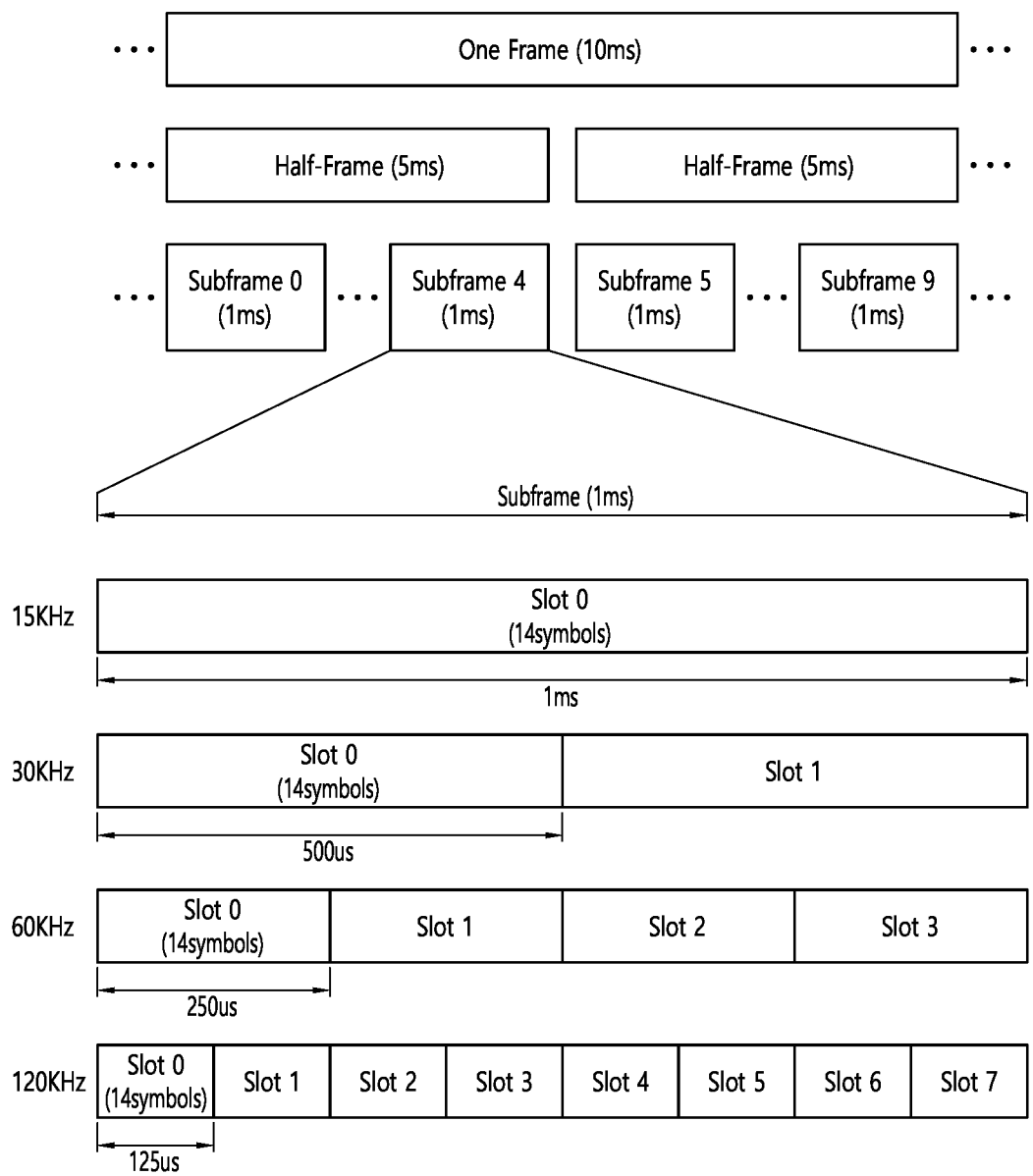
FIG. 6 illustrates an example of a frame structure that may be applied in NR.

FIG. 6 illustrates an example of a frame structure that may be applied in NR.

Referring to FIG. 6, a frame may be configured in 10 milliseconds (ms), and may include 10 subframes configured in 1 ms.

In NR, uplink and downlink transmission may be composed of frames. A radio frame has a length of 10 ms and may be defined as two 5 ms half-frames (HF). The HF may be defined as five 1 ms subframes (SFs). The SF may be divided into one or more slots, and the number of slots within the SF depends on a subcarrier spacing (SCS). Each slot includes 12 or 14 OFDM(A) symbols according to a cyclic prefix (CP). In case of using a normal CP, each slot includes 14 symbols. In case of using an extended CP, each slot includes 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

One or a plurality of slots may be included in the subframe according to subcarrier spacing.

The following table 1 illustrates a subcarrier spacing configuration µ.

TABLE 1

| µ | $\Delta f = 2^\mu \cdot 15$[kHz] | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations µ.

TABLE 2

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 3 illustrates that the number of symbols per slot, the number of slots per frame, and the number of slots per subframe vary depending on the SCS, in case of using an extended CP.

TABLE 3

| SCS ($15 \cdot 2^\mu$) | $N^{slot}_{symb}$ | $N^{frame, \mu}_{slot}$ | $N^{subframe, \mu}_{slot}$ |
|---|---|---|---|
| 60 kHz (µ = 2) | 12 | 40 | 4 |

NR supports multiple numerologies (or subcarrier spacing (SCS)) for supporting diverse 5G services. For example, if the SCS is 15 kHz, a wide area of the conventional cellular bands may be supported. If the SCS is 30 kHz/60 kHz, a dense-urban, lower latency, and wider carrier bandwidth is supported. If the SCS is 60 kHz or higher, a bandwidth greater than 24.25 GHz is used in order to overcome phase noise.

An NR frequency band may be defined as a frequency range of two types (FR1, FR2). Values of the frequency range may be changed. For example, the frequency range of the two types (FR1, FR2) may be as shown below in Table 4. For convenience of explanation, among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed. For example, as shown in Table 5 below, FR1 may include a band in the range of 410 MHz to 7125 MHz. That is, FR1 may include a frequency band of at least 6 GHz (or 5850, 5900, 5925 MHz, and so on). For example, a frequency band of at least 6 GHz (or 5850, 5900, 5925 MHz, and so on) included in FR1 may include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
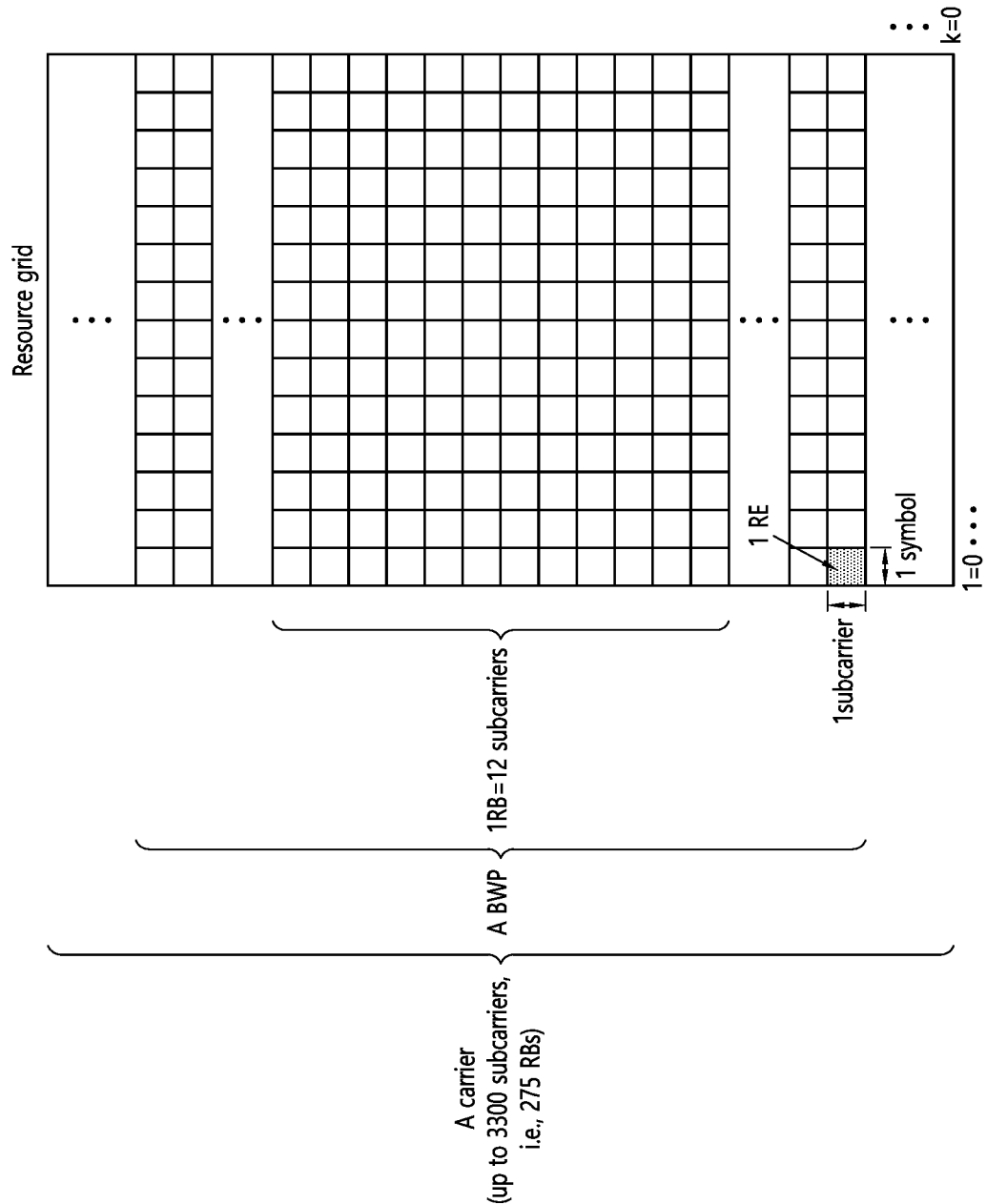
FIG. 7 illustrates a slot structure.

FIG. 7 illustrates a slot structure.

Referring to FIG. 7, a slot may include a plurality of symbols in a time domain. For example, in case of a normal CP, one slot may include 14 symbols. However, in case of an extended CP, one slot may include 12 symbols. Or, in case of a normal CP, one slot may include 7 symbols. However, in case of an extended CP, one slot may include 6 symbols.

A carrier may include a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and so on). The carrier may include up to N (e.g., 5) BWPs. Data communication may be performed via an activated BWP. In a resource grid, each element may be referred to as a resource element (RE), and one complex symbol may be mapped thereto.

A physical downlink control channel (PDCCH) may include one or more control channel elements (CCEs) as illustrated in the following table.

TABLE 6

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, a new unit called a control resource set (CORESET) may be introduced in the NR. The UE may receive a PDCCH in the CORESET.

Figure 8:
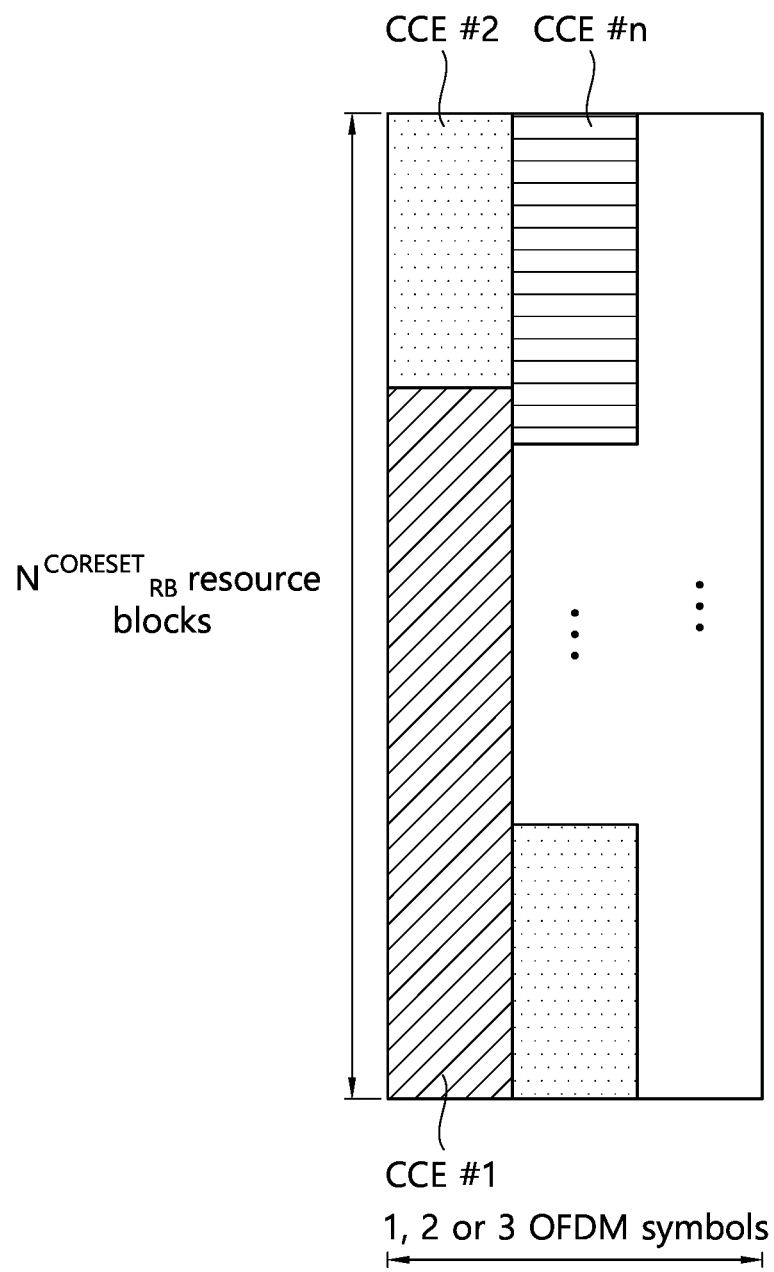
FIG. 8 illustrates CORESET.

FIG. 8 illustrates CORESET.

Referring to FIG. 8, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
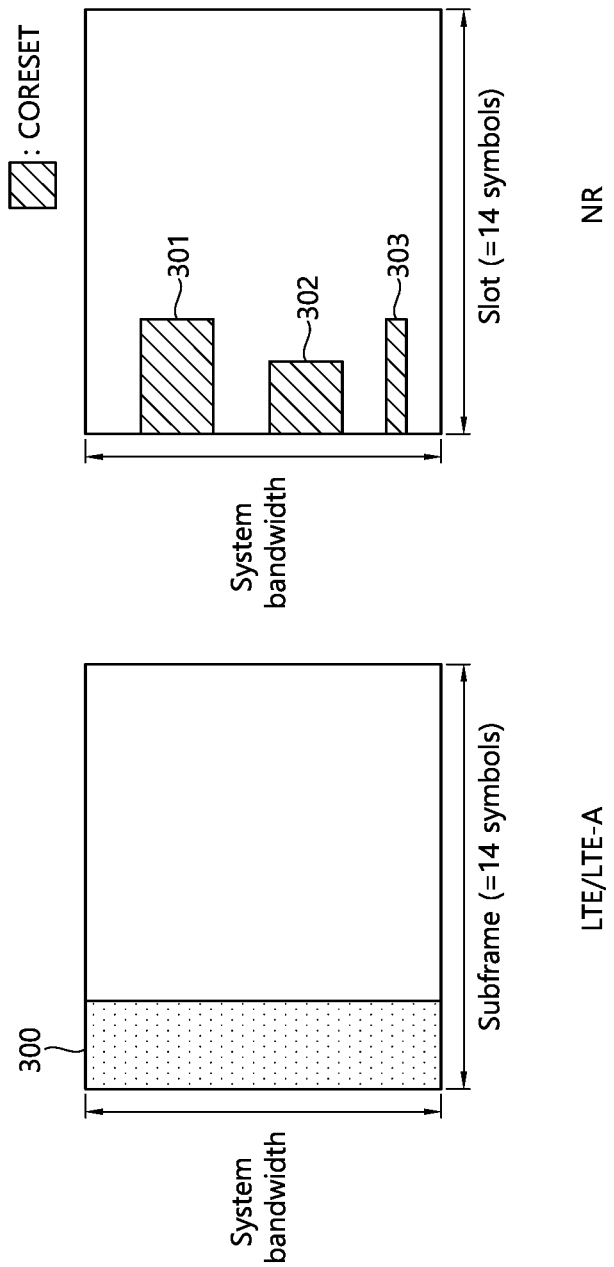
FIG. 9 is a diagram illustrating a difference between a related art control region and the CORESET in NR.

FIG. 9 is a diagram illustrating a difference between a related art control region and the CORESET in NR.

Referring to FIG. 9, a control region 300 in the related art wireless communication system (e.g., LTE/LTE-A) is configured over the entire system band used by a base station (BS). All the UEs, excluding some (e.g., eMTC/NB-IoT UE) supporting only a narrow band, shall be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the UE and may use only a portion, rather than the entirety of the system bandwidth. The BS may allocate the CORESET to each UE and may transmit control information through the allocated CORESET. For example, in FIG. 9, a first CORESET 301 may be allocated to UE 1, a second CORESET 302 may be allocated to UE 2, and a third CORESET 303 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

Meanwhile, in NR, the following technologies/features can be applied.

Self-Contained Subframe Structure

Figure 10:
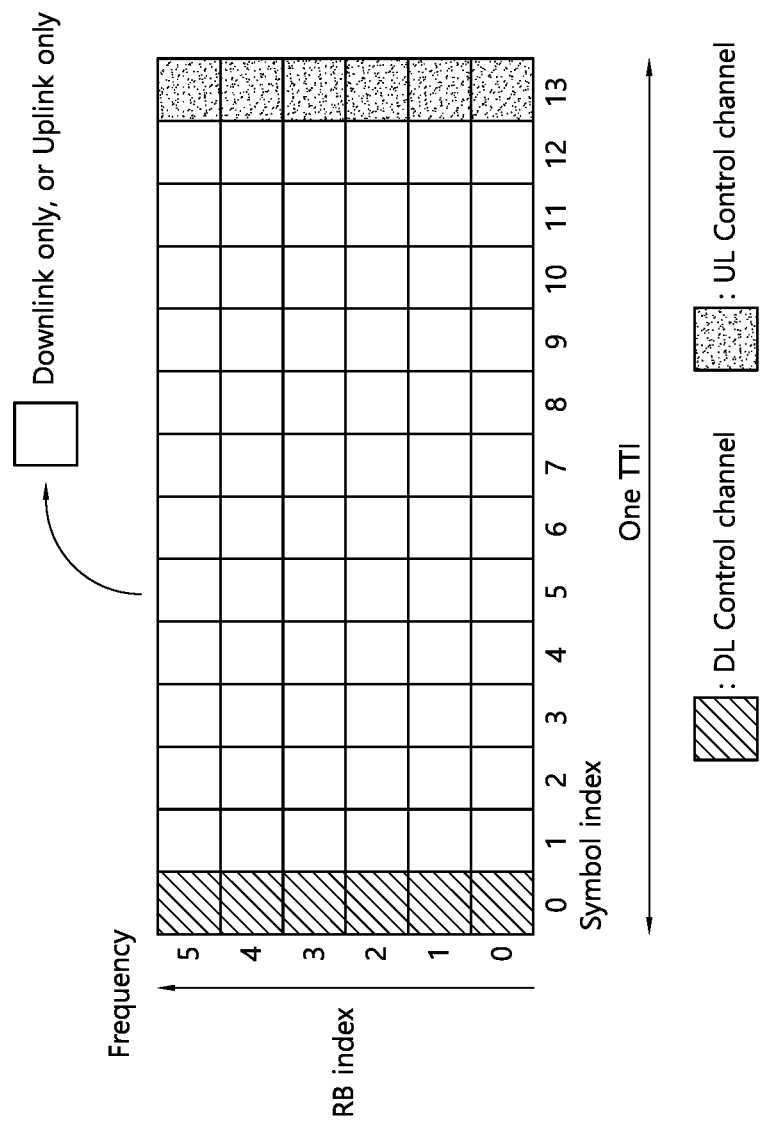
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
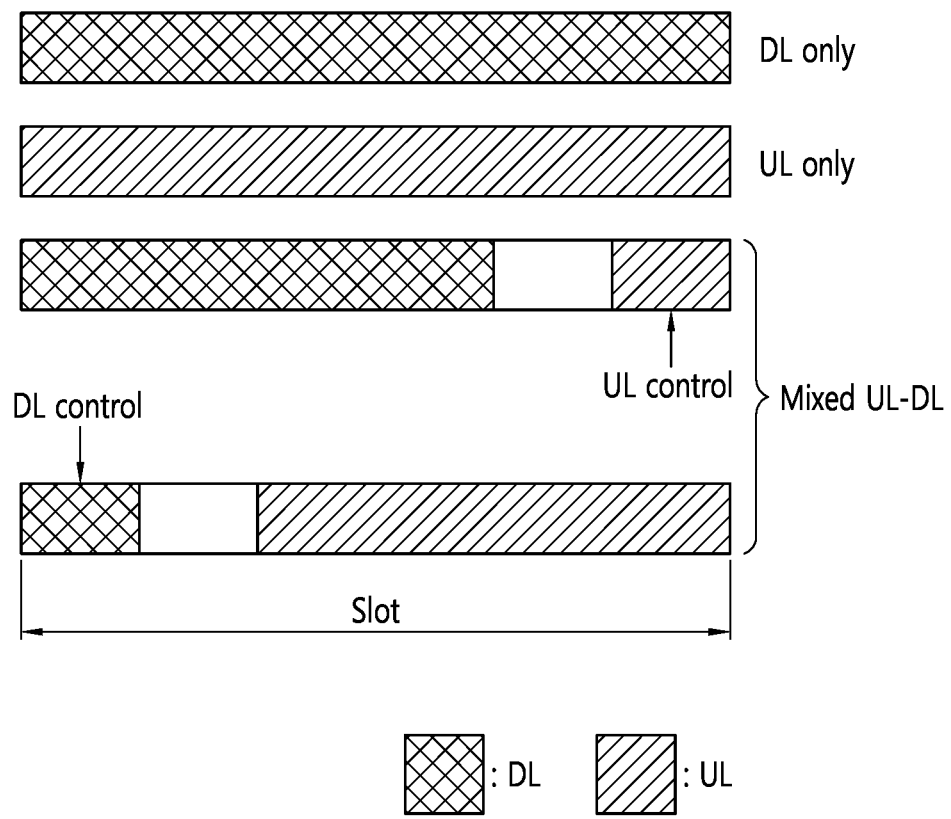
FIG. 11 illustrates a structure of a self-contained slot.

FIG. 11 illustrates a structure of a self-contained slot.

Referring to FIG. 11, one slot may have a self-contained structure in which all of a DL control channel, DL or UL data, and a UL control channel may be included. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission. For example, the following configuration may be considered. Respective durations are listed in a temporal order.

1. DL only configuration
2. UL only configuration
3. Mixed UL-DL configuration

DL region+Guard period (GP)+UL control region

DL control region+GP+UL region

Here, the DL region may be (i) DL data region, (ii) DL control region+DL data region. The UL region may be (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

Analog Beamforming #1

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

Analog Beamforming #2

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 12:
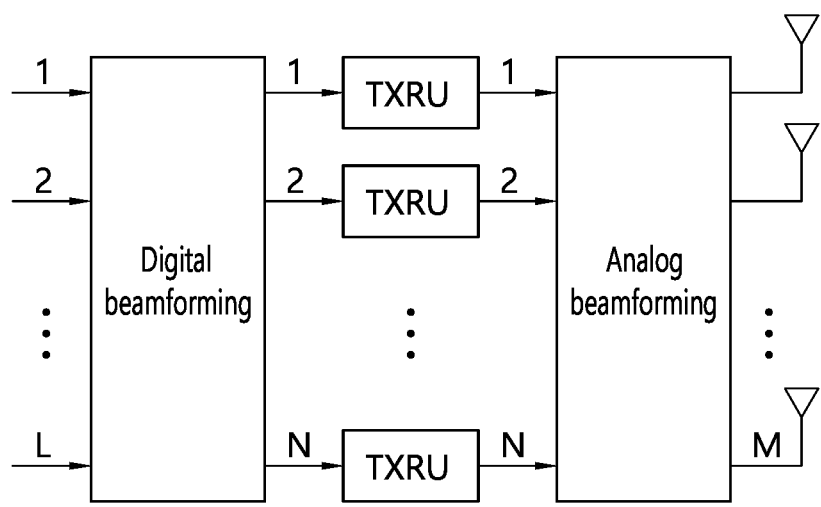
FIG. 12 is an abstract schematic diagram of a hybrid beamforming structure in terms of a TXRU and a physical antenna.

FIG. 12 is an abstract diagram of a hybrid beamforming structure from the viewpoint of the TXRU and the physical antenna.

In FIG. 12, the number of digital beams is L, and the number of analog beams is N. Furthermore, in the NR system, a direction of supporting more efficient beamforming to a UE located in a specific area is considered by designing the base station to change analog beamforming in units of symbols. Further, when defining N specific TXRUs and M RF antennas as one antenna panel in FIG. 12, in the NR system, a method of introducing a plurality of antenna panels to which hybrid beamforming independent of each other can be applied is being considered.

As described above, when the base station uses a plurality of analog beams, since analog beams advantageous for signal reception may be different for each UE, a beam sweeping operation, in which at least for a synchronization signal, system information, paging, etc., a plurality of analog beams to be applied by the base station in a specific subframe are changed for each symbol, that allows all UEs to have a reception occasion is being considered.

Figure 13:
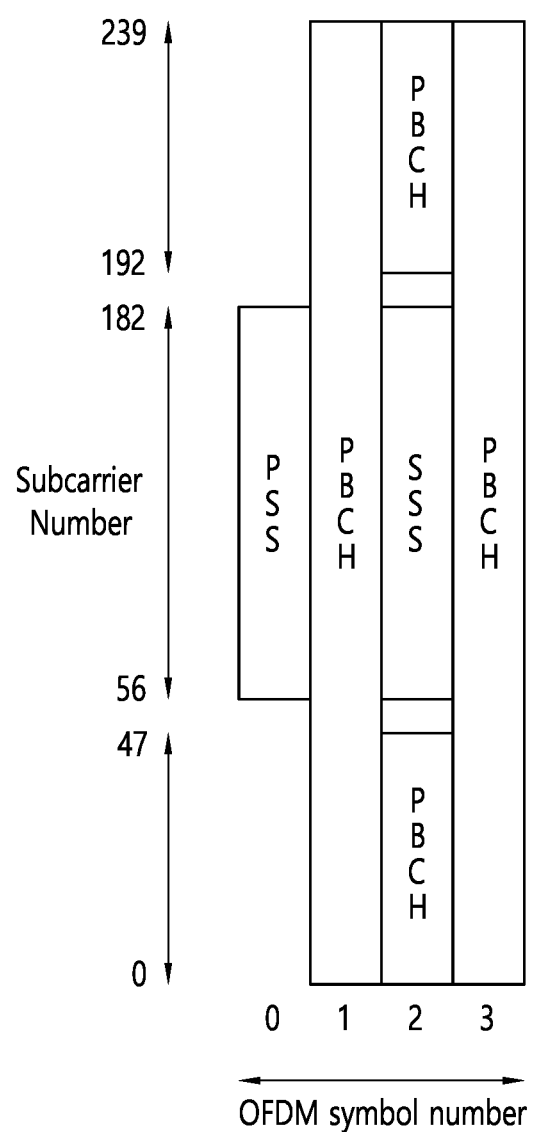
FIG. 13 shows a synchronization signal and a PBCH (SS/PBCH) block.

FIG. 13 shows a synchronization signal and a PBCH (SS/PBCH) block.

Referring to FIG. 13, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

For a half frame with SS/PBCH blocks, first symbol indices for candidate SS/PBCH blocks are determined according to subcarrier spacing of SS/PBCH blocks, which will be described later.

Case A—Subcarrier spacing 15 kHz: The first symbols of the candidate SS/PBCH blocks have an index of {2, 8}+14*n. For carrier frequencies less than or equal to 3 GHz, n=0,
1. For carrier frequencies greater than 3 GHz and less than or equal to 6 GHz, n=0, 1, 2, 3.

Case B—Subcarrier spacing 30 kHz: The first symbols of the candidate SS/PBCH blocks have an index of {4, 8, 16, 20}+28*n. For carrier frequencies less than or equal to 3 GHz, n=0. For carrier frequencies greater than 3 GHz and less than or equal to 6 GHz, n=0, 1.

Case C—Subcarrier spacing 30 kHz: The first symbols of candidate SS/PBCH blocks have an index of {2, 8}+14*n. For carrier frequencies less than or equal to 3 GHz, n=0, 1. For carrier frequencies greater than 3 GHz and less than or equal to 6 GHz, n=0, 1, 2, 3.

Case D—Subcarrier spacing 120 kHz: The first symbols of the candidate SS/PBCH blocks have an index of {4, 8, 16, 20}+28*n. For carrier frequencies greater than 6 GHz, n=0, 1, 2, 3, 5, 6, 7, 8, 10, 11, 12, 13, 15, 16, 17, 18.

Case E—Subcarrier spacing 240 kHz: The first symbols of the candidate SS/PBCH blocks have an index of {8, 12, 16, 20, 32, 36, 40, 44}±56*n. For carrier frequencies greater than 6 GHz, n=0, 1, 2, 3, 5, 6, 7, 8.

Candidate SS/PBCH blocks in a half frame are indexed in ascending order from 0 to L−1 on the time axis. The UE shall determine 2 LSB bits for L=4 and 3 LSB bits for L>4 of the SS/PBCH block index per half frame from one-to-one mapping with the index of the DM-RS sequence transmitted in the PBCH. For L=64, the UE shall determine 3 MSB bits of the SS/PBCH block index per half frame by the PBCH payload bits.

By the higher layer parameter 'SSB-transmitted-SIB1', the index of SS/PBCH blocks in which the UE cannot receive other signals or channels in REs overlapping with REs corresponding to SS/PBCH blocks can be set. In addition, according to the higher layer parameter 'SSB-transmitted', the index of SS/PBCH blocks per serving cell in which the UE cannot receive other signals or channels in REs overlapping with REs corresponding to the SS/PBCH blocks can be set. The setting by 'SSB-transmitted' may take precedence over the setting by 'SSB-transmitted-SIB 1'. A periodicity of a half frame for reception of SS/PBCH blocks per serving cell may be set by a higher layer parameter 'SSB-periodicityServingCell'. If the UE does not set the periodicity of the half frame for the reception of SS/PBCH blocks, the UE shall assume the periodicity of the half frame. The UE may assume that the periodicity is the same for all SS/PBCH blocks in the serving cell.

Figure 14:
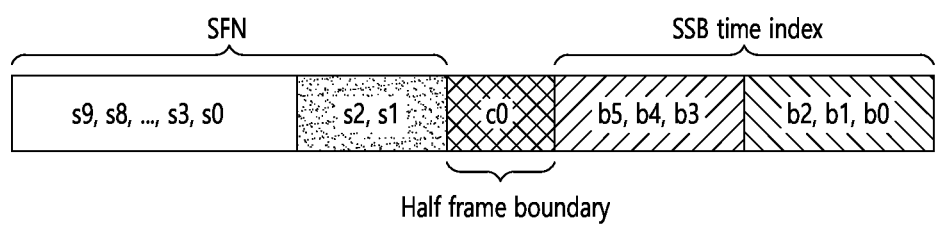
FIG. 14 is for explaining a method for a UE to obtain timing information.

FIG. 14 is for explaining a method for a UE to obtain timing information.

First, the UE may obtain 6-bit SFN information through the MIB (Master Information Block) received in the PBCH. In addition, SFN 4 bits can be obtained in the PBCH transport block.

Second, the UE may obtain a 1-bit half frame indicator as part of the PBCH payload. In less than 3 GHz, the half frame indicator may be implicitly signaled as part of the PBCH DMRS for Lmax=4.

Finally, the UE may obtain the SS/PBCH block index by the DMRS sequence and the PBCH payload. That is, LSB 3 bits of the SS block index can be obtained by the DMRS sequence for a period of 5 ms. Also, the MSB 3 bits of the timing information are explicitly carried within the PBCH payload (for >6 GHz).

In initial cell selection, the UE may assume that a half frame with SS/PBCH blocks occurs with a periodicity of 2 frames. Upon detecting the SS/PBCH block, the UE determines that a control resource set for the Type0-PDCCH common search space exists if $k_{SSB} \leq 23$ for FR1 and $k_{SSB} \leq 11$ for FR2. The UE determines that there is no control resource set for the Type0-PDCCH common search space if $k_{SSB} > 23$ for FR1 and $k_{SSB} > 11$ for FR2.

For a serving cell without transmission of SS/PBCH blocks, the UE acquires time and frequency synchronization of the serving cell based on reception of the SS/PBCH blocks on the PSCell or the primary cell of the cell group for the serving cell.

Hereinafter, system information acquisition will be described.

System information (SI) is divided into a master information block (MIB) and a plurality of system information blocks (SIBs) where:
- the MIB is transmitted always on a BCH according to a period of 40 ms, is repeated within 80 ms, and includes parameters necessary to obtain system information block type1 (SIB1) from a cell;
- SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;
- SIBs other than SIB1 are carried via system information (SI) messages transmitted on the DL-SCH. Each SI message is transmitted within a time-domain window (referred to as an SI window) periodically occurring;
- For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 15:
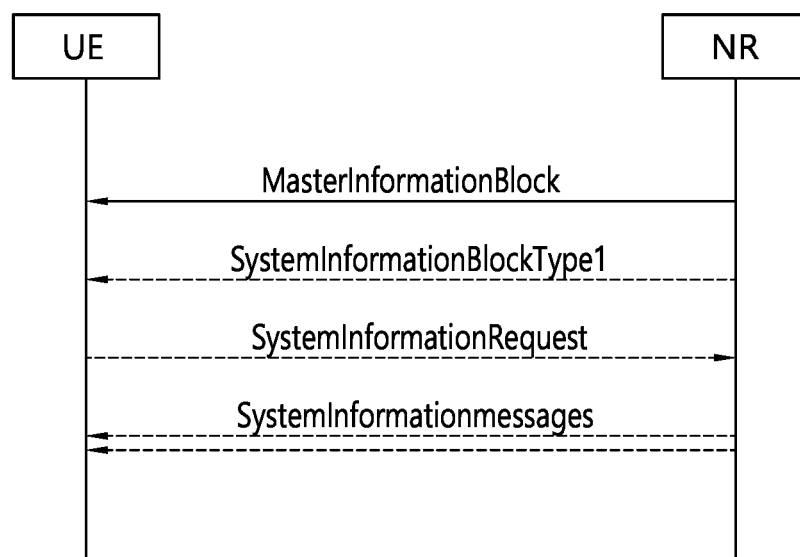
FIG. 15 shows an example of a process of acquiring system information of a UE.

FIG. 15 shows an example of a process of acquiring system information of a UE.

According to FIG. 15, the UE may receive the MIB from the network and then receive the SIB 1. Thereafter, the UE may transmit a system information request to the network, and may receive a 'SystemInformation message' from the network in response thereto.

The UE may apply a system information acquisition procedure for acquiring AS (access stratum) and NAS (non-access stratum) information.

UEs in RRC_IDLE and RRC_INACTIVE states shall ensure (at least) valid versions of MIB, SIB1 and SystemInformationBlockTypeX (according to the relevant RAT support for UE-controlled mobility).

The UE in RRC_CONNECTED state shall guarantee valid versions of MIB, SIB1, and SystemInformationBlockTypeX (according to mobility support for the related RAT).

The UE shall store the related SI obtained from the currently camped/serving cell. The SI version obtained and stored by the UE is valid only for a certain period of time. The UE may use this stored version of the SI after, for example, cell reselection, return from out of coverage, or system information change indication.

Hereinafter, random access will be described.

The random access procedure of the UE can be summarized as in the following table.

TABLE 7

| | Type of signal | Action/Acquired Information |
| --- | --- | --- |
| Step 1 | Uplink PRACH preamble | Initial beam acquisition<br>Random Election of RA-Preamble ID |
| Step 2 | Random access response on DL-SCH | Timing arrangement information<br>RA-preamble ID<br>Initial uplink grant, temporary C-RNTI |
| Step 3 | Uplink transmission on UL-SCH | RRC connection request<br>UE identifier |
| Step 4 | Contention resolution of downlink | C-RNTI on PDCCH for initial access<br>C-RNTI on PDCCH for UE in RRC_CONNECTED state |

Figure 16:
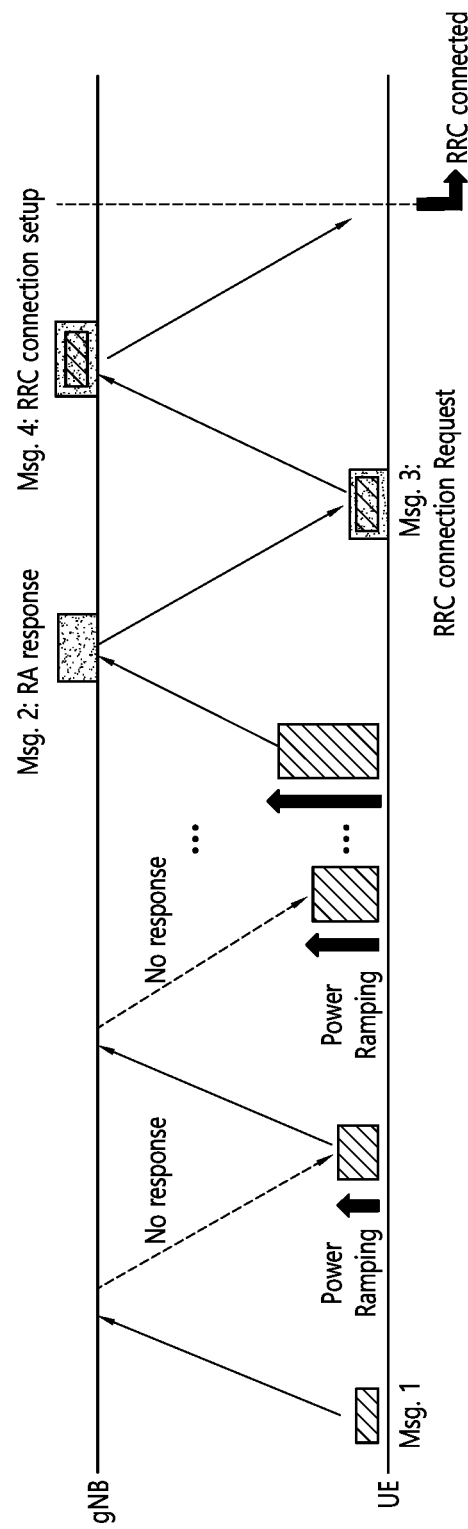
FIG. 16 is for explaining a random access procedure.

FIG. 16 is for explaining a random access procedure.

Referring to FIG. 16, first, the UE may transmit a physical random access channel (PRACH) preamble in uplink as message (Msg) 1 of the random access procedure.

Random access preamble sequences having two different lengths are supported. A long sequence of length 839 applies to subcarrier spacings of 1.25 kHz and 5 kHz, and a short sequence of length 139 applies to subcarrier spacings of 15, 30, 60, and 120 kHz. A long sequence supports an unrestricted set and a limited set of types A and B, whereas a short sequence supports only an unrestricted set.

A plurality of RACH preamble formats are defined with one or more RACH OFDM symbols, a different cyclic prefix (CP), and a guard time. The PRACH preamble configuration to be used is provided to the UE as system information.

If there is no response to Msg1, the UE may retransmit the power-rammed PRACH preamble within a prescribed number of times. The UE calculates the PRACH transmission power for retransmission of the preamble based on the most recent estimated path loss and power ramping counter. If the UE performs beam switching, the power ramping counter does not change.

Figure 17:
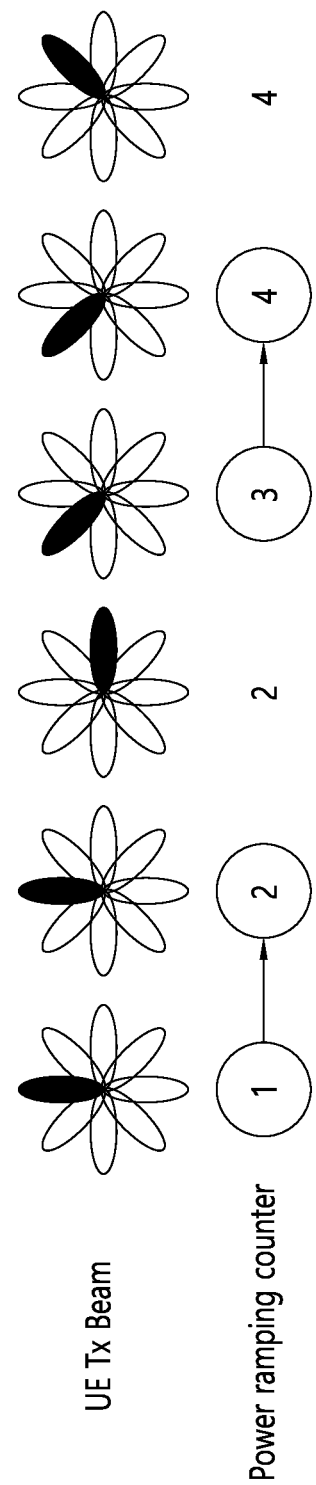
FIG. 17 is a diagram for describing a power ramping counter.

FIG. 17 is a diagram for describing a power ramping counter.

The UE may perform power ramping for retransmission of the random access preamble based on the power ramping counter. Here, as described above, the power ramping counter does not change when the UE performs beam switching during PRACH retransmission.

Referring to FIG. 17, when the UE retransmits the random access preamble for the same beam, the UE increments the power ramping counter by 1 as the power ramping counter increases from 1 to 2 and from 3 to 4. However, when the beam is changed, the power ramping counter does not change during PRACH retransmission.

Figure 18:
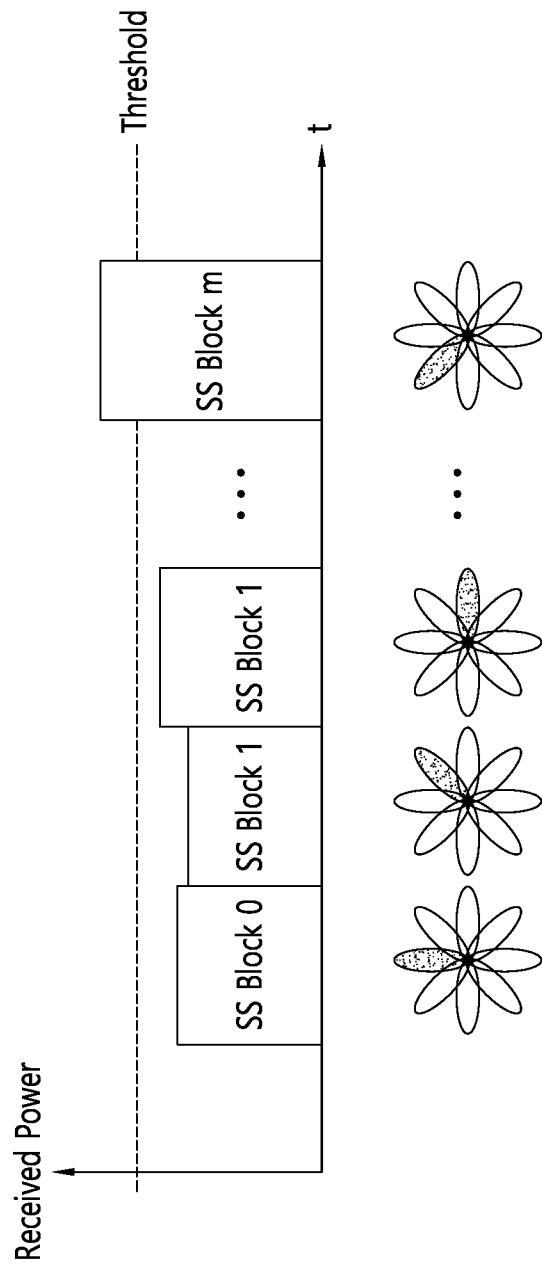
FIG. 18 is for explaining the concept of the threshold value of the SS block for the RACH resource relationship.

FIG. 18 is for explaining the concept of the threshold value of the SS block for the RACH resource relationship.

The system information informs the UE of the relationship between SS blocks and RACH resources. The threshold of the SS block for the RACH resource relationship is based on RSRP and network configuration. Transmission or retransmission of the RACH preamble is based on an SS block that satisfies a threshold. Accordingly, in the example of FIG. 18, since the SS block m exceeds the threshold of the received power, the RACH preamble is transmitted or retransmitted based on the SS block m.

Thereafter, when the UE receives a random access response on the DL-SCH, the DL-SCH may provide timing arrangement information, an RA-preamble ID, an initial uplink grant, and a temporary C-RNTI.

Based on the information, the UE may perform uplink transmission on the UL-SCH as Msg3 of the random access procedure. Msg3 may include the RRC connection request and UE identifier.

In response, the network may transmit Msg4, which may be treated as a contention resolution message, in downlink. By receiving this, the UE can enter the RRC connected state.

Bandwidth Part (BWP)

In the NR system, a maximum of 400 MHz can be supported per component carrier (CC). If a UE operating in such a wideband CC operates with RF for all CCs turn on all the time, UE battery consumption may increase. Or, considering use cases operating in one wideband CC (e.g., eMBB, URLLC, mMTC, etc.), different numerologies (e.g., subcarrier spacings (SCSs)) can be supported for different frequency bands in the CC. Or, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Meanwhile, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

DRX (Discontinuous Reception)

Discontinuous Reception (DRX) refers to an operation mode in which a UE (User Equipment) reduces battery consumption so that the UE can discontinuously receive a downlink channel. That is, the UE configured for DRX can reduce power consumption by discontinuously receiving the DL signal.

The DRX operation is performed within a DRX cycle indicating a time interval in which On Duration is periodically repeated. The DRX cycle includes an on-duration and a sleep duration (or a DRX opportunity). The on-duration indicates a time interval during which the UE monitors the PDCCH to receive the PDCCH.

DRX may be performed in RRC (Radio Resource Control) IDLE_state (or mode), RRC_INACTIVE state (or mode), or RRC_CONNECTED state (or mode). In RRC_IDLE state and RRC_INACTIVE state, DRX may be used to receive paging signal discontinuously.

RRC_IDLE state: a state in which a radio connection (RRC connection) is not established between the base station and the UE.

RRC_INACTIVE state: A wireless connection (RRC connection) is established between the base station and the UE, but the wireless connection is inactive.

RRC_CONNECTED state: a state in which a radio connection (RRC connection) is established between the base station and the UE.

DRX can be basically divided into idle mode DRX, connected DRX (C-DRX), and extended DRX.

DRX applied in the IDLE state may be named idle mode DRX, and DRX applied in the CONNECTED state may be named connected mode DRX (C-DRX).

Extended/Enhanced DRX (eDRX) is a mechanism that can extend the cycles of idle mode DRX and C-DRX, and Extended/Enhanced DRX (eDRX) can be mainly used for (massive) IoT applications. In idle mode DRX, whether to allow eDRX may be configured based on system information (e.g., SIB1). SIB1 may include an eDRX-allowed parameter. The eDRX-allowed parameter is a parameter indicating whether idle mode extended DRX is allowed.

Idle Mode DRX

In the idle mode, the UE may use DRX to reduce power consumption. One paging occasion (paging occasion; PO) is a subframe in which P-RNTI (Paging-Radio Network Temporary Identifier) can be transmitted through PDCCH (Physical Downlink Control Channel), MPDCCH (MTC PDCCH), or NPDCCH (a narrowband PDCCH) (which addresses the paging message for NB-IoT).

In P-RNTI transmitted through MPDCCH, PO may indicate a start subframe of MPDCCH repetition. In the case of the P-RNTI transmitted through the NPDCCH, when the subframe determined by the PO is not a valid NB-IoT downlink subframe, the PO may indicate the start subframe of the NPDCCH repetition. Therefore, the first valid NB-IoT downlink subframe after PO is the start subframe of NPDCCH repetition.

One paging frame (PF) is one radio frame that may include one or a plurality of paging occasions. When DRX is used, the UE only needs to monitor one PO per DRX cycle. One paging narrow band (PNB) is one narrow band in which the UE performs paging message reception. PF, PO, and PNB may be determined based on DRX parameters provided in system information.

Figure 19:
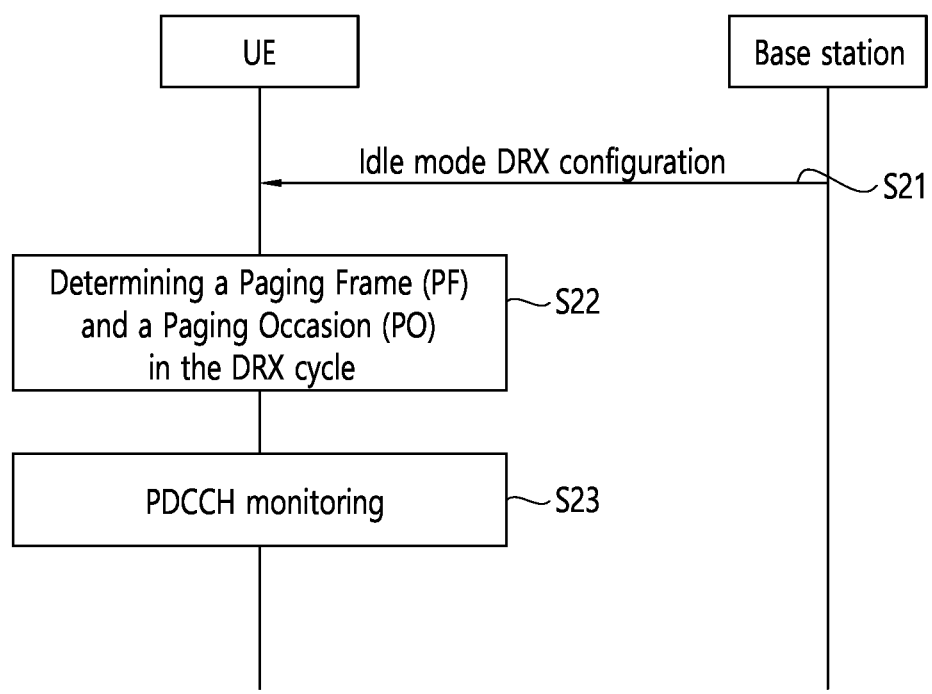
FIG. 19 is a flowchart illustrating an example of performing an idle mode DRX operation.

FIG. 19 is a flowchart illustrating an example of performing an idle mode DRX operation.

According to FIG. 19, the UE may receive idle mode DRX configuration information from the base station through higher layer signaling (e.g., system information) (S21).

The UE may determine a Paging Frame (PF) and a Paging Occasion (PO) to monitor the PDCCH in the paging DRX cycle based on the idle mode DRX configuration information (S22). In this case, the DRX cycle may include an on-duration and a sleep duration (or an opportunity of DRX).

The UE may monitor the PDCCH in the PO of the determined PF (S23). Here, for example, the UE monitors only one subframe (PO) per paging DRX cycle. In addition, when the UE receives the PDCCH scrambled by the P-RNTI during the on-duration (i.e., when paging is detected), the UE may transition to the connected mode and may transmit/receive data to/from the base station.

Connected Mode DRX(C-DRX)

C-DRX means DRX applied in the RRC connection state. The DRX cycle of C-DRX may consist of a short DRX cycle and/or a long DRX cycle. Here, a short DRX cycle may correspond to an option.

When C-DRX is configured, the UE may perform PDCCH monitoring for the on-duration. If the PDCCH is successfully detected during PDCCH monitoring, the UE may operate (or run) an inactive timer and maintain an awake state. Conversely, if the PDCCH is not successfully detected during PDCCH monitoring, the UE may enter the sleep state after the on-duration ends.

When C-DRX is configured, a PDCCH reception occasion (e.g., a slot having a PDCCH search space) may be configured non-contiguously based on the C-DRX configuration. In contrast, if C-DRX is not configured, a PDCCH reception occasion (e.g., a slot having a PDCCH search space) may be continuously configured in the present disclosure.

On the other hand, PDCCH monitoring may be limited to a time interval set as a measurement gap (gap) regardless of the C-DRX configuration.

Figure 20:
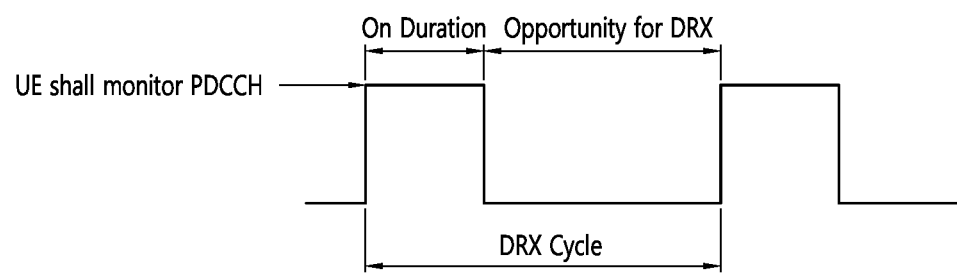
FIG. 20 illustrates a DRX cycle.

FIG. 20 illustrates a DRX cycle.

Referring to FIG. 20, a DRX cycle includes "On Duration" and "Opportunity for DRX". The DRX cycle defines a time interval in which "On Duration" is periodically repeated. "On Duration" represents a time period that the UE monitors to receive the PDCCH. When DRX is configured, the UE performs PDCCH monitoring during "On Duration". If there is a PDCCH successfully detected during PDCCH monitoring, the UE operates an inactivity timer and maintains an awake state. Meanwhile, if there is no PDCCH successfully detected during PDCCH monitoring, the UE enters a sleep state after the "On Duration" is over. Accordingly, when DRX is configured, PDCCH monitoring/reception may be discontinuously performed in the time domain in performing the procedures and/or methods described/suggested above. For example, when DRX is configured, in the present disclosure, a PDCCH reception occasion (e.g., a slot having a PDCCH search space) may be set discontinuously according to the DRX configuration. Meanwhile, when DRX is not configured, PDCCH monitoring/reception may be continuously performed in the time domain in performing the procedure and/or method described/proposed above. For example, when DRX is not configured, a PDCCH reception occasion (e.g., a slot having a PDCCH search space) may be continuously set in the present disclosure. Meanwhile, regardless of DRX configuration, PDCCH monitoring may be restricted in a time period set as a measurement gap.

Table 8 shows a UE procedure related to the DRX (RRC_CONNECTED state). Referring to Table 8, DRX configuration information is received through higher layer (e.g., RRC) signaling, and DRX ON/OFF is controlled by a DRX command of the MAC layer. When DRX is configured, the UE may discontinuously perform PDCCH monitoring in performing the procedure and/or method described/proposed in the present disclosure.

TABLE 8

| | Type of signals | UE procedure |
| --- | --- | --- |
| 1st step | RRC signalling (MAC-CellGroupConfig) | Reception of DRX configuration information |
| 2nd Step | MAC CE ((Long) DRX command MAC CE) | Reception of DRX command |
| 3rd Step | — | Monitor a PDCCH during an 'on-duration' of a DRX cycle |

MAC-CellGroupConfig may include configuration information required to set a medium access control (MAC) parameter for a cell group. MAC-CellGroupConfig may also include configuration information on DRX. For example, MAC-CellGroupConfig may include information as follows in defining DRX.

- Value of drx-OnDurationTimer: It defines a length of a start interval of a DRX cycle.
- Value of drx-InactivityTimer: It defines a length of a time interval in which the UE is awake after a PDCCH occasion in which the PDCCH indicating initial UL or DL data is detected
- Value of drx-HARQ-RTT-TimerDL: It defines a length of a maximum time interval until DL retransmission is received, after initial DL transmission is received.
- Value of drx-HARQ-RTT-TimerUL: It defines a length of a maximum time interval until a grant for UL retransmission is received, after a grant for UL initial transmission is received.
- drx-LongCycleStartOffset: It defines a time length and a start point of a DRX cycle
- drx-ShortCycle (optional): It defines a time length of a short DRX cycle Here, if any one of drx-OnDurationTimer, drx-InactivityTimer, drx-HARQ-RTT-TimerDL, drx-HARQ-RTT-TimerUL is in operation, the UE performs PDCCH monitoring at every PDCCH occasion while maintaining an awake state.

Hereinafter, an integrated access and backhaul link (IAB) will be described. Meanwhile, hereinafter, for convenience of description, a proposed method will be described based on a new RAT (NR) system. However, the range of the system to which the proposed method is applied is expandable to other systems such as 3GPP LTE/LTE-A systems in addition to the NR system.

One of the potential technologies aimed at enabling future cellular network deployment scenarios and applications is support for wireless backhaul and relay links, and it enables flexible and highly dense deployment of NR cells without the need to proportionally densify the transport network.

It is expected that greater bandwidth in NR compared to LTE will be available (e.g., mmWave spectrum) with the native deployment of massive MIMO or multi-beam systems, thus, opportunities are created for the development and deployment of integrated access and backhaul links. This makes it easier of a dense network of self-backhauled NR cells in a more integrated manner by establishing multiple control and data channels/procedures defined to provide access or access to the UEs. Such systems are referred to as integrated access and backhaul links (IAB).

The following terms may be used in the present disclosure.

AC (x): an access link between the node (x) and the UE(s).

BH (xy): a backhaul link between the node (x) and the node (y).

In this case, the node may mean a donor gNB (DgNB) or a relay node (RN). Here, the DgNB or the donor node may be a gNB that provides a function to support backhaul to IAB nodes.

In addition, in the present disclosure, for convenience of explanation, when relay node 1 and relay node 2 exist, relay node 1 which is connected to relay node 2 by a backhaul link and relaying data transmitted and received to relay node 2 is called a parent node of relay node 2, and relay node 2 is called a child node of relay node 1.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 21:
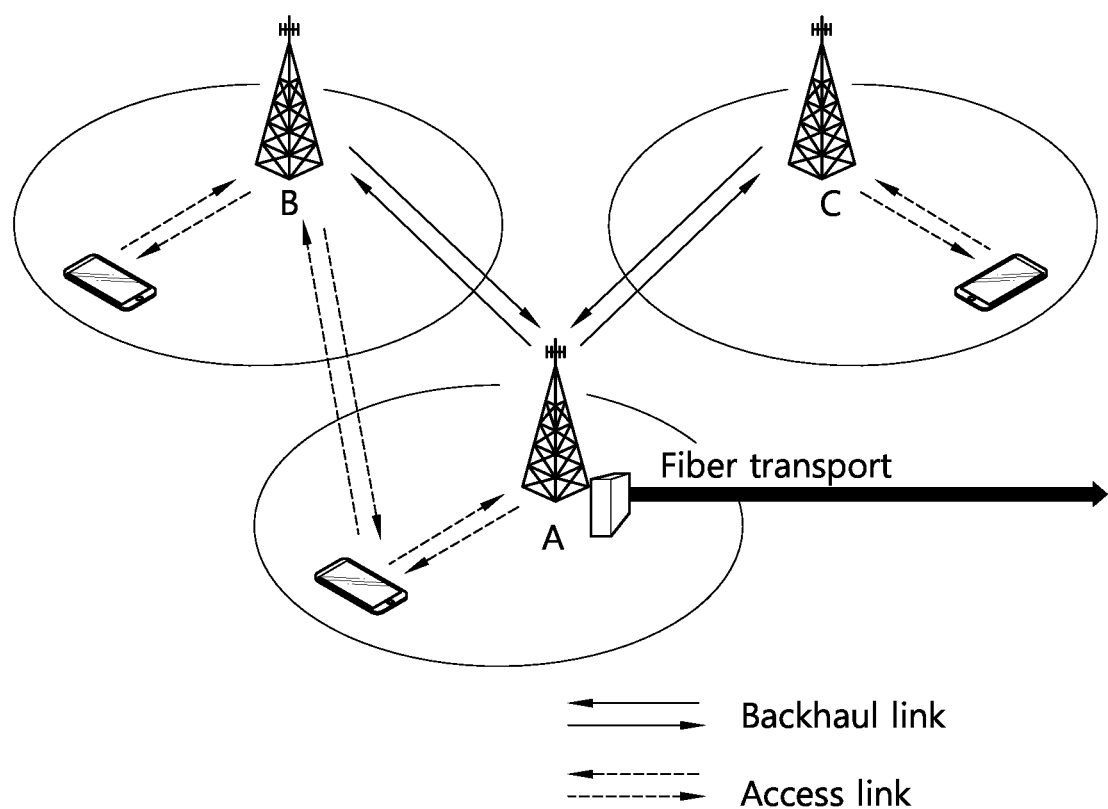
FIG. 21 schematically illustrates an example for a network with integrated access and backhaul links (IAB).

FIG. 21 schematically illustrates an example for a network with integrated access and backhaul links (IAB).

According to FIG. 21, relay nodes (rTRPs) may multiplex access and backhaul links in the time, frequency, or space domain (i.e., beam-based operation).

The operation of different links may operate on the same frequency or on different frequencies (which may also be referred to as 'in-band' or 'out-band' relays, respectively). Although efficient support of out-of-band relays is important for some NR deployment scenarios, it is very important to understand the requirements of in-band operation, which implies tight interworking with access links operating on the same frequency to accommodate duplex restrictions and avoid/mitigate interference.

Furthermore, operating an NR system in the millimeter wave spectrum have some unique challenges. It involves experiencing severe short-term blocking that cannot be easily mitigated by the current RRC-based handover mechanism due to the larger time scale required for completion of the procedure compared to short blocking. Overcoming short blocking in mmWave systems may require a fast RAN-based mechanism for switching between rTRPs that does not necessarily require the inclusion of a core network. The aforementioned need for mitigation of short blocking for NR operation in the millimeter wave spectrum, along with the need for easier deployment of self-backhauled NR cells, creates a need for the development of an integrated framework that allows for fast switching of access and backhaul links. Over-the-air (OTA) coordination between rTRPs may also be considered to mitigate interference and support end-to-end path selection and optimization.

The following requirements and aspects shall be addressed by the IAB for NR:

Efficient and flexible operation for in-band and out-of-band relaying in indoor and outdoor scenarios
Multi-hop and redundant connections
End-to-end path selection and optimization
Support of backhaul links with high spectral efficiency
Support of legacy NR UEs Legacy NR is designed to support half-duplex devices. As such, half-duplex may be supported and worthy of being targeted in an IAB scenario. Furthermore, IAB devices having a full duplex may also be considered.

Figure 22:
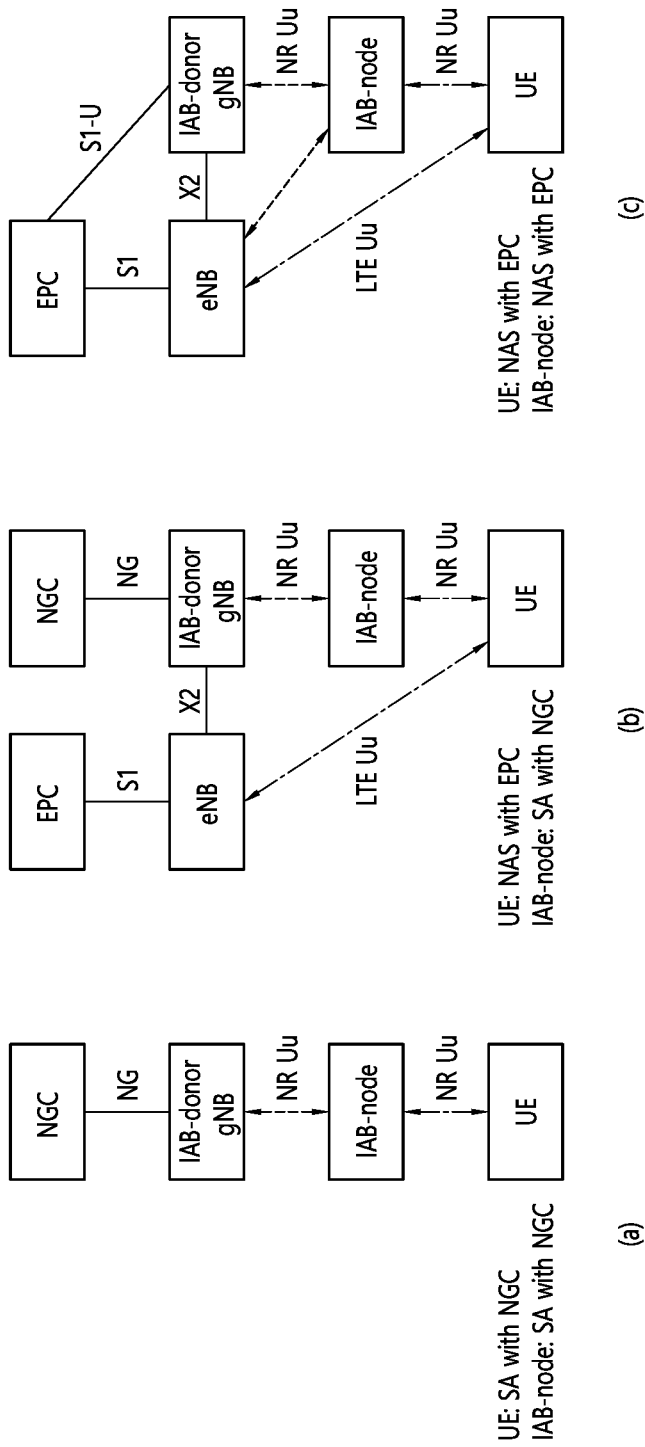
FIG. 22 shows an example of the operation of the IAB system in a standalone (SA) mode and a non-standalone (NSA) mode.

FIG. 22 shows an example of the operation of the IAB system in a standalone (SA) mode and a non-standalone (NSA) mode. Specifically, (a) of FIG. 22 shows an example of the operation of the UE and IAB node considering NGC in SA mode, (b) of FIG. 22 shows an example of the operation of the IAB node considering NGC in SA mode and the UE considering EPC in NSA mode, (c) of FIG. 22 shows an example of the operation of the UE and IAB node considering EPC in the NSA mode.

The IAB node may operate in SA mode or NSA mode. When operating in NSA mode, the IAB node uses only the NR link for backhauling. A UE connected to the IAB node may select an operation mode different from that of the IAB node. The UE may further connect to a different type of core network than the connected IAB node. In this case, (e) DECOR ((enhanced) dedicated core network) or slicing may be used for CN selection. An IAB node operating in NSA mode may be connected to the same or different eNB(s). UEs operating in the NSA mode may be connected to the same or different eNB from the IAB node to which they are connected. FIG. 22 shows an example in consideration of NGC in SA mode and an example in consideration of EPC in NSA mode.

In the IAB scenario, if each relay node (RN) does not have the scheduling capability, the donor gNB (DgNB) shall schedule the entire links between the DgNB, related relay nodes and UEs. In other words, the DgNB should make a scheduling decision for all links by collecting traffic information from all related relay nodes, and then inform each relay node of the scheduling information.

On the other hand, distributed scheduling can be performed when each relay node has a scheduling capability. Then, immediate scheduling of the uplink scheduling request of the UE is possible, and the backhaul/access link can be used more flexibly by reflecting the surrounding traffic conditions.

Figure 23:
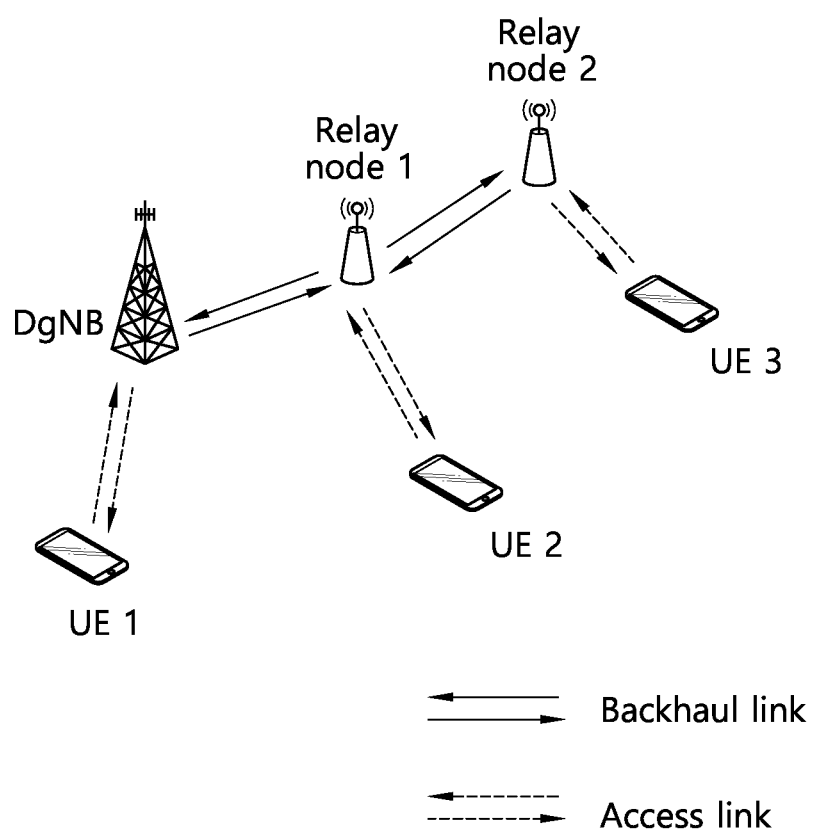
FIG. 23 schematically shows an example of the configuration of access and backhaul links.

FIG. 23 schematically illustrates an example of the configuration of access and backhaul links.

FIG. 23 shows an example in which a backhaul link and an access link are configured when DgNB and IAB relay nodes (RNs) exist. RN(b) and RN(e) are connecting a backhaul link, RN(c) is connecting a backhaul link to RN(b), RN(d) is connecting a backhaul link to RN(c).

Referring to FIG. 23, the DgNB not only receives the scheduling request of UE1, but also receives the scheduling request of UE2 and UE3. Then, the DgNB makes a scheduling decision of two backhaul links and three access links, and informs the scheduling results. Thus, such centralized scheduling involves scheduling delays and introduces latency issues.

On the other hand, distributed scheduling can be performed if each relay node has a scheduling capability. Then, immediate scheduling for the uplink scheduling request of the UE can be performed, and the backhaul/access links can be used more flexibly by reflecting the surrounding traffic conditions.

Figure 24:
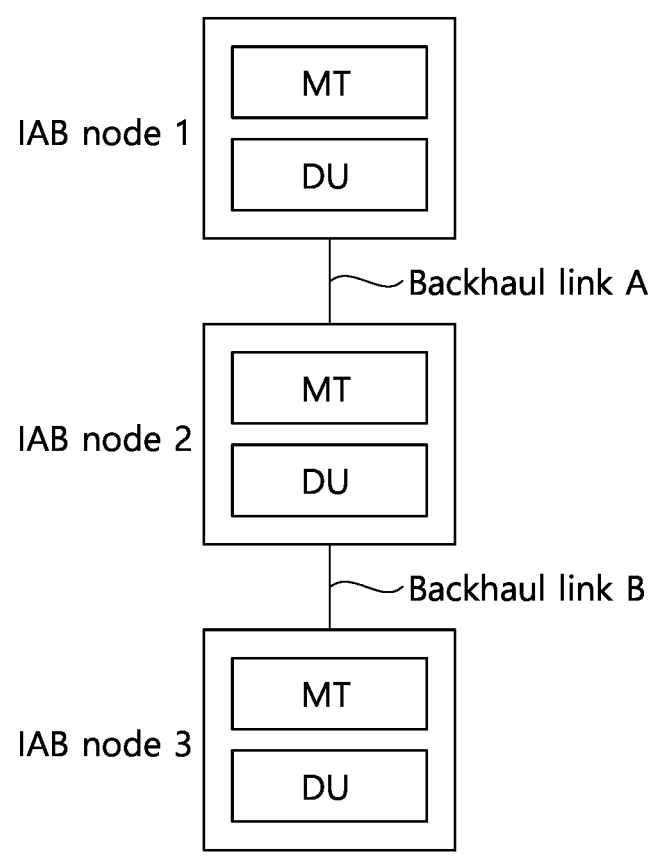
FIG. 24 is for explaining links and relationships between IAB nodes.

FIG. 24 is for explaining links and relationships between IAB nodes.

Referring to FIG. 24, IAB node 1 is connected to IAB node 2 by a backhaul link A. And, for the backhaul link A, IAB node 1 is a parent node of IAB node 2, and IAB node 2 is a child node of IAB node 1. In addition, IAB node 2 is connected to IAB node 3 by a backhaul link B. And, for the backhaul link B, IAB node 2 is a parent node of IAB node 3, and IAB node 3 is a child node of IAB node 2.

Here, each of the IAB nodes may perform two functions. One is mobile termination (MT), which maintains a wireless backhaul connection to an upper IAB node or a donor node. And, the other is a DU (distributed unit), which provides access connection with UEs or connection with MT of a lower IAB node.

For example, from the point of view of IAB Node 2, the DU of IAB Node 2 has a functional backhaul link B with the MT of IAB Node 3. At the same time, the MT of the IAB node 2 has a functional backhaul link A with the DU of the IAB node 1. Here, the child link of the DU of the IAB node 2 may mean a backhaul link B between the IAB node 2 and the IAB node 3. Also, here, the parent link of the MT of the IAB node 2 may refer to the backhaul link A between the IAB node 2 and the IAB node 1.

Hereinafter, the initial access of the IAB node will be described.

In order to initially establish a connection with a parent node or a donor node, the IAB node may follow the same procedure as the UE's initial access procedure including cell search, system information acquisition, and random access. SSB/CSI-RS based RRM measurement is the starting point of IAB node discovery and measurement.

A method of avoiding SSB configuration conflicts between IAB nodes, the IAB inter-node discovery procedure applying half-duplex restriction and multi-hop topology, including the feasibility of IAB node discovery based on CSI-RS, should be considered. Considering the cell ID used by a given IAB node, the following two cases may be considered.

Case 1: Donor node and IAB node share the same cell ID
Case 2: Donor node and IAB node maintain separate cell IDs Furthermore, a mechanism for multiplexing of RACH transmission from UEs and RACH transmission from IAB nodes should be further considered.

For standalone (SA) deployment, the initial IAB node discovery (stage 1) by the MT follows the same initial access procedure as the UE, including cell search, system information acquisition, and random access based on the same SSB available to the access UEs, to initially establish a connection with a parent IAB node or an IAB donor.

In the case of NSA (non-standalone) deployment (from the point of view of access/access UE), the IAB node MT follows the aforementioned stage 1 initial connection in SA deployment (from the point of view of the access UE) when performing the initial connection on the NR carrier. The SSB/RMSI period assumed by the MTs for the initial connection may be longer than the 20 ms assumed for the rel-15 UEs of the NR, and one of the candidate values 20 ms, 40 ms, 80 ms, and 160 ms is selected.

Here, this means that candidate parent IAB nodes/donors shall support both NSA functionality for UE and SA functionality for MT on the NR carrier.

When the IAB node MT performs initial access on the LTE carrier, stage 2 solutions can be used with parent selection of the IAB node by the MT on the NR carrier.

Hereinafter, backhaul link measurement will be described.

Measurements for multiple backhaul links for link management and path selection should be considered. To support half-duplex limiting in terms of a given IAB node, IAB supports detection and measurement of candidate backhaul links (after initial connection) using resources orthogonal to the resources used by access UEs for cell detection and measurement. In this regard, the following may be further considered.

TDM of a plurality of SSBs (e.g., may follow hop order, cell ID, etc.)
SSB muting across IAB nodes
Multiplexing of SSB for access UEs and IAB nodes within or across half-frames
Additional IAB node discovery signal to be TDMed with SSB transmission (e.g., CSI-RS)
Use of off-raster SSB
different transmission period for backhaul link detection and measurement compared to the period used by access UEs Coordination mechanisms for different solutions should be further considered, including coordination mechanisms for measurement time and reference signal (RS) transmission for IAB nodes.

Improvement of SMTC and CSI-RS configuration to support RRM measurement for IAB nodes may be considered.

For the purpose of backhaul link RSRP/RSRQ RRM measurement, IAB supports SSB-based and CSI-RS-based solutions.

After the IAB node DU is activated, for the purpose of inter IAB node and donor detection (stage 2), the IAB inter-node discovery procedure needs to consider the half-duplex limit for the IAB node and multi-hop topology. The following solution is supported: SSB based solution—use of SSBs orthogonal (TDM and/or FDM) to SSBs used for access UEs.

Hereinafter, backhaul link management will be described.

The IAB node supports a mechanism for detecting/recovering backhaul link failures. Enhancements to beam failure recovery (BFR) and radio link failure (RLF) procedures are advantageous and should be supported for NR IAB as follows.

Improvement of support for interaction (interaction) between beam failure recovery success indication and RLF.
Improvement of current beam management procedures for faster beam switching/coordination/recovery to avoid backhaul link outage should be considered for IAB nodes.

Further, for example, when the backhaul link of the parent IAB node fails, etc., the need for an additional backhaul link condition notification mechanism from the parent IAB node to the child IAB node and the need for the corresponding IAB node operation is discussed. Solutions to avoid RLF in child IAB node due to parent backhaul link failure should be supported.

Hereinafter, a mechanism for changing a path or transmitting/receiving in a plurality of backhaul links will be described.

Mechanisms (e.g., multi-TRP (Tx/Rx point) operation and intra-frequency dual connectivity) for efficient re-route or transmit/receive simultaneously in multiple backhaul links should be considered.

Hereinafter, the scheduling of the backhaul and access link will be described.

Downlink IAB node transmission (i.e., transmission from the IAB node on the backhaul link to the child IAB node served by the IAB node and transmission to the UEs served by the IAB node on the access link) shall be scheduled by the IAB node itself. Uplink IAB transmission (transmission from the IAB node to its parent or donor node on the backhaul link) shall be scheduled by a parent node or a donor node.

The following describes multiplexing of access and backhaul links.

IAB supports TDM, FDM and SDM between access and backhaul links at the IAB node according to half-duplex restrictions. A mechanism for efficient TDM/FDM (frequency division multiplexing)/SDM (spatial division multiplexing) multiplexing of access/backhaul traffic across multiple hops taking into account IAB node half-duplex restrictions should be considered. The following solutions for different multiplexing options can be further considered.

A mechanism for orthogonal partitioning of time slots or frequency resources between access and backhaul links across one or more hops
  Utilization of different DL/UL slot settings for access and backhaul links
  DL and UL power control enhancement and timing requirements to allow intra-panel FDM and SDM of backhaul and access link
  Interference management including cross-link interference Hereinafter, resource coordination will be described.

Mechanisms for scheduling coordination, resource allocation and path selection across the IAB node/donor node and multiple backhaul hops should be considered. The coordination of resources (frequency, time in terms of slot/slot format, etc.) between semi-static IAB nodes (on the time scale of RRC signaling) should be supported. The following aspects may be further considered.

Distributed or centralized coordination mechanism
  Resource granularity of the required signal (e.g., TDD configuration pattern)
  Exchange of L1 (layer-1) and/or L3 (layer-3) measurements between IAB nodes
  Exchange of topology-related information (e.g. hop order) affecting backhaul link physical layer design
  Coordination of resources (frequency, time in terms of slot/slot format, etc.) faster than semi-static coordination Hereinafter, IAB node synchronization and timing alignment will be described.

Feasibility of over-the-air (OTA) synchronization and the impact of timing misalignment on IAB performance (e.g., the number of supportable hops) should be considered. Assuming a timing requirement of 3 us or less at IAB nodes in overlapping coverage, TA-based OTA synchronization can support multi-hop IAB networks (up to 5 hops) for FR 2. TA based OTA synchronization may not be sufficient to support multiple hops in FR1.

The next level of alignment between IAB nodes/IAB donors or within IAB nodes is discussed.

Slot-level alignment
  Symbol-level alignment
  No alignment

A mechanism for timing alignment in a multi-hop IAB network is discussed. IAB supports TA-based synchronization between IAB nodes including multiple backhaul hops. Improvements to existing timing alignment mechanisms are discussed, including TAs required for IAB nodes to support different transmission timing alignment cases.

The following transmission timing alignment case across IAB nodes and IAB donors is discussed.

Case 1: DL transmission timing alignment across IAB node and IAB donor: If downlink transmission and uplink reception are not well aligned at the parent node, the child node needs additional information on the alignment to properly set its downlink transmission timing for OTA-based timing and synchronization.
  Case 2: Downlink and uplink transmission timings are aligned for one IAB node.
  Case 3: Downlink and uplink reception timings are aligned for one IAB node.
  Case 4: For one IAB node, in case of transmission using case 2 when receiving using case 3.
  Case 5: Case 4 for backhaul link timing for one IAB node in different time slots and Case 1 for access link timing
  Case 6: Sum of downlink transmission timing of Case 1 and uplink transmission timing of Case 2: The downlink transmission timing of all IAB nodes is aligned with the downlink timing of the parent IAB node or the donor; The uplink transmission timing of the IAB node may be aligned with the downlink transmission timing of the IAB node.
  Case 7: Sum of the downlink transmission timing of Case 1 and the uplink reception timing of Case 3: The downlink transmission timing of all IAB nodes is aligned with the downlink timing of the parent IAB node or the donor; The uplink reception timing of the IAB node may be aligned with the downlink reception timing of the IAB node; If downlink transmission and uplink reception are not well aligned in the parent node, the child node needs additional information on the alignment to properly set its downlink transmission timing for OTA-based timing and synchronization.

Impact of different cases on TDM/FDM/SDM multiplexing of parent and child links, potential impact of incomplete timing adjustment, overhead of required downlink/uplink switching gap, cross-link interference, the impact of feasibility and access UEs (particularly compatibility with rel-15 UEs) when an IAB node is connected with one or more parent nodes are discussed.

Case 1 is supported for both access and backhaul link transmission timing alignment.

Cases 2-5 are not supported for IAB.

The use of case 6 for IAB nodes, if supported, should be under the control of the parent or network. To enable alignment of downlink transmission between IAB nodes, examples of the following solutions have been identified.

Alternative 1: IAB nodes may have to perform parallel (always time multiplexed) Case 1 and Case 6 uplink transmissions.
  Alternative 2: Signaling between the parent and the IAB node for the time difference of the downlink transmission and uplink reception timing at the parent node to correct potential misalignment of the downlink transmission timing at the child node: The child IAB node compares the corresponding difference in its downlink transmission timing and backhaul reception timing; If the signaled difference of the parent node is greater than that measured by the child node, if the transmission timing is smaller, the child node advances its transmission timing.

Here, Alternative 1 and Alternative 2 may have to maintain separate reception timing in the parent node for case 6 uplink transmission from other child nodes.

In case 7, by introducing TDM between child IAB node/Rel-16 UEs supporting an effective negative TA and a new TA value and child IAB nodes/UEs that do not support the new TA value, it is compatible for Rel-15 UEs. To enable alignment between downlink and uplink reception within an IAB node, examples of the following solutions have been identified.

Alternative 1: Introduce negative initial time alignment (TA) to be applied to the child node of the IAB node to which the case 7 timing is applied.

Alternative 2: In the IAB node, apply a positive TA that enables symbol alignment rather than slot alignment between downlink reception and uplink reception.

Alternative 3: Signaling of the relative offset of the most recent TA value, to be applied to the child node of the IAB node to which the case 7 timing is applied to achieve an efficient negative TA.

In addition to OTA synchronization, other techniques such as GNSS and PTP may be used to obtain synchronization between IAB nodes.

In the following, cross-link interference measurement and management will be described.

The impact of cross-link interference (CLI) on access and backhaul links (including spanning multiple hops) shall be considered. Furthermore, interference measurement and management solutions should be considered.

Hereinafter, a CLI mitigation technique will be described.

CLI mitigation techniques including advanced receiver and transmitter coordination should be considered and prioritized in terms of complexity and performance. CLI mitigation technology shall be able to manage the following IAB-to-node interference scenarios.

Case 1: The victim IAB node receives in downlink through its MT, and the interfering IAB node transmits in uplink through its MT.

Case 2: The victim IAB node receives in downlink through its MT, and the interfering IAB node transmits in downlink through its DU.

Case 3: The victim IAB node receives in uplink through its DU, and the interfering IAB node transmits in uplink through its MT.

Case 4: The victim IAB node receives in uplink through its DU, and the interfering IAB node transmits in downlink through its DU.

In the case of FDM/SDM reception between access and backhaul links at a given IAB node, the interference experienced at the IAB node should be further considered.

Hereinafter, spectral efficiency enhancement will be described.

Support of 1024 quadrature amplitude modulation (QAM) for the backhaul link should be considered.

Hereinafter, the proposal of the present disclosure will be described in more detail.

The following drawings were created to explain a specific example of the present specification. Since the names of specific devices described in the drawings or the names of specific signals/messages/fields are presented by way of example, the technical features of the present specification are not limited to the specific names used in the following drawings.

The content of the present specification is described assuming an in-band environment, but may also be applied in an out-band environment. In addition, the contents of the present specification are described in consideration of an environment in which the DgNB, a relay node (RN), and the UE perform a half-duplex operation, but may be applied to an environment in which the DgNB, the RN, and/or the UE perform a full-duplex operation.

In the existing IAB node, IAB DU and IAB MT performed TDM operation through different time resources. On the other hand, it is required to perform resource multiplexing such as SDM/FDM and FD (full duplexing) between the IAB DU and the IAB MT for efficient resource management. As shown in FIG. 24, a link between the MT of IAB Node 2 or IAB Node 2 and the DU of IAB Node 1 or IAB Node 1 is referred to as a parent link of IAB Node 2, a link between the DU of IAB Node 2 or IAB Node 2 and the MT of IAB Node 3 or IAB Node 3 may be referred to as a child link of IAB Node 2. In this case, SDM/FDM and FD operations are required in addition to the TDM operation between the parent link and the child link.

For effective SDM/FDM operation between the parent link and the child link, when the MT or DU of a specific IAB node operates with a resource pattern in the form of downlink (D)-flexible (F)-uplink (U), that is, D-F-U, the DU or MT of the IAB node operates with a resource pattern in the form of uplink-flexible-downlink, that is, U-F-D. Through this, when the IAB node MT performs a downlink reception operation, it is preferable that the IAB node DU performs an uplink transmission operation. In addition, when the IAB node MT performs an uplink transmission operation, it is preferable that the IAB node DU performs a downlink reception operation. For this, a resource pattern/slot format having the form of U-F-D and U-D may be considered for the IAB node MT/DU. In the U-F-D resource pattern/slot format, consecutive uplink symbol(s) for a specific symbol period are located at the beginning of the period, consecutive downlink symbol(s) are located at the end of the period, and the remaining middle period is the flexible symbol(s). In the case of the U-D resource pattern/slot format, consecutive uplink symbol(s) and consecutive downlink symbol(s) are sequentially located during a specific symbol period, and there is no flexible symbol.

Meanwhile, according to the transmission/reception timing of the MT and DU of the IAB node, the uplink resource and the downlink resource may be mapped as follows.

Figure 25:
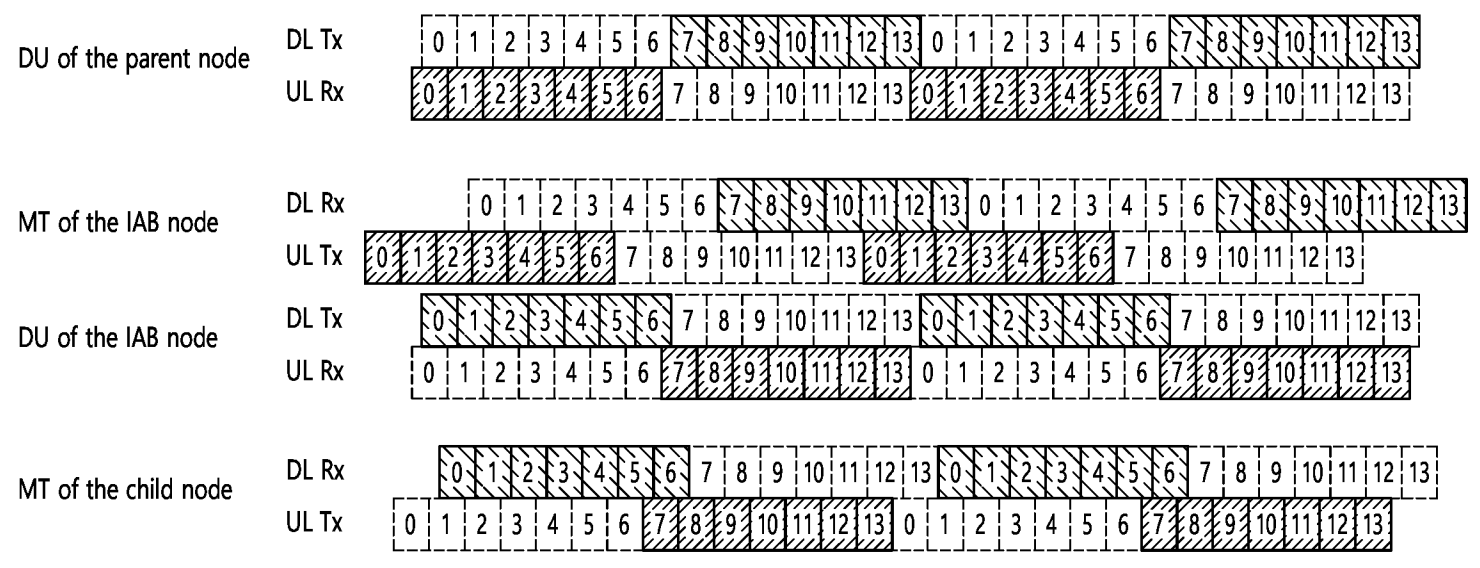

FIG. 25 shows an example of IAB node timing when using timing alignment case 1.

Referring to FIG. 25, downlink transmission timings between IAB node DUs are aligned. In other words, in FIG. 25, the downlink transmission timing of the DU of the IAB node and the DU of the parent node of the IAB node and the downlink transmission timing of the DU of the child node of the IAB node are aligned with each other, although not shown in FIG. 25. The transmission timing and reception timing of the IAB node DU consider a reception-transmission switching time (Rx to Tx switching time). The uplink reception timing of the IAB node DU may be advanced by T_offset than the downlink transmission timing of the IAB node DU.

At this time, in the case of the IAB node MT, the uplink transmission timing is earlier than the downlink reception timing. Accordingly, when the IAB node MT has a slot format of U-F-D/U-D, overlapping between downlink symbols and uplink symbols occurs at a slot boundary. In FIG. 25, in the case of the IAB node MT, OFDM symbols 0 to 6 are configured as uplink and OFDM symbols 7 to 13 are configured as downlink. In this case, there is a problem in that the resources of the downlink symbols 11 to 13 and the uplink symbols 0 to 2 overlap.

In the case of the DU of the parent node, OFDM symbols 0 to 6 are configured as uplink and OFDM symbols 7 to 13 are configured as downlink in order to use the resource pattern/slot format having the form of U-F-D and U-D. In this case, a problem occurs in that the resources of the downlink symbol 13 and the uplink symbol 0 overlap.

Figure 26:
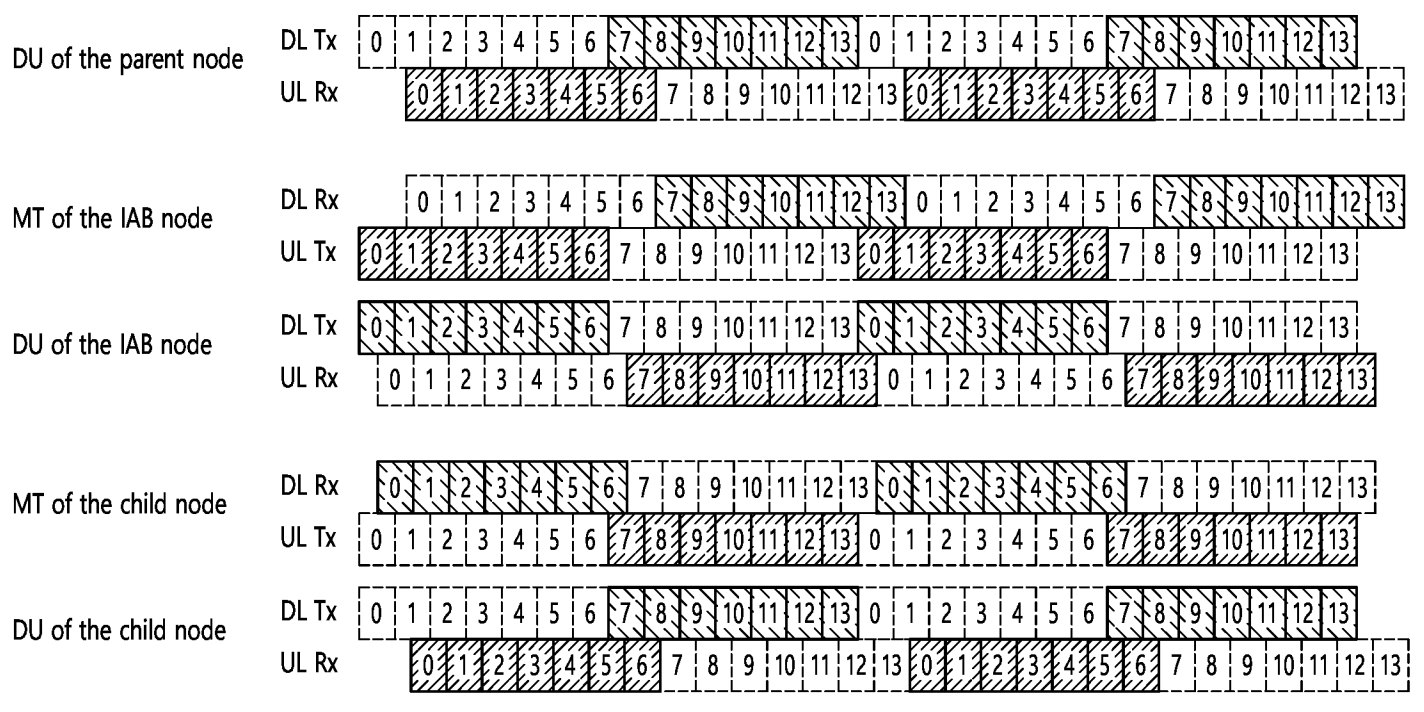

FIG. 26 shows an example of the timing of the IAB node when using the timing alignment case 6.

Referring to FIG. 26, downlink transmission timings between IAB node DUs are aligned, and additionally, uplink transmission timing of MT in an IAB node and downlink transmission timing of DU in the IAB node are aligned.

At this time, in the case of the IAB node MT, the uplink transmission timing is earlier than the downlink reception timing. Accordingly, when the IAB node MT has a resource pattern/slot format of U-F-D/U-D, overlapping between downlink symbols and uplink symbols occurs at the slot boundary. In FIG. 26, in the case of the IAB node MT, OFDM symbols 0 to 6 are configured as uplink and OFDM symbols 7 to 13 are configured as downlink. In this case, there is a problem in that the resources of the downlink symbols 12 and 13 and the uplink symbols 0 and 1 overlap.

Figure 27:
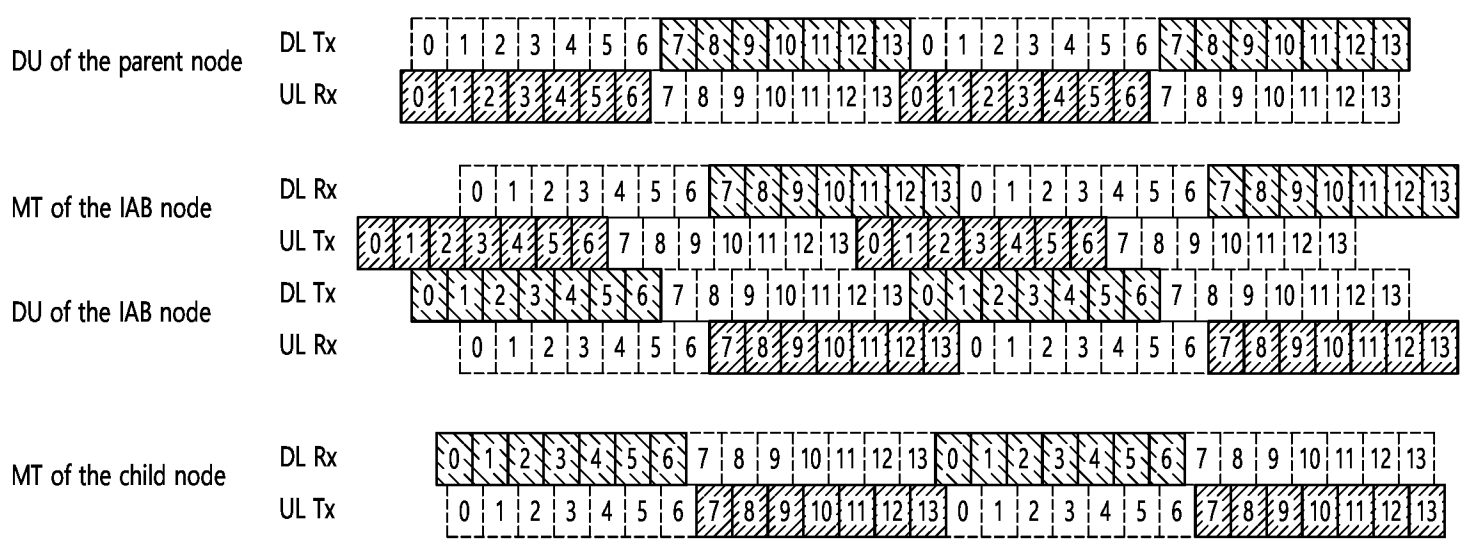

FIG. 27 shows an example of the timing of the IAB node when using the timing alignment case 7.

Referring to FIG. 27, downlink transmission timings between IAB node DUs are aligned. Additionally, the downlink reception timing of the MT in the IAB node and the uplink reception timing of the DU are aligned.

In this case, in the case of the IAB node MT, the uplink transmission timing may be earlier than the downlink reception timing. Accordingly, when the IAB node MT has a resource pattern/slot format of U-F-D/U-D, overlapping between downlink symbols and uplink symbols may occur at the slot boundary. In FIG. 27, in the case of the MT of the IAB node, OFDM symbols 0 to 6 are configured as uplink and OFDM symbols 7 to 13 are configured as downlink. In this case, there is a problem in that the resources of the downlink symbols 11 to 13 and the uplink symbols 0 to 2 overlap. Alternatively, in the case of the IAB node MT, the downlink reception timing may be earlier than the uplink transmission timing. Accordingly, when the IAB node MT has a resource pattern/slot format of D-F-U, overlapping between downlink symbols and uplink symbols may occur at the slot boundary. In FIG. 27, in the case of the MT of the child node, OFDM symbols 0 to 6 are configured as downlink and OFDM symbols 7 to 13 are configured as uplink. In this case, there is a problem that the resources of the uplink symbol 13 and the downlink symbol 0 overlap.

In the case of the IAB node DU, the uplink reception timing may be earlier than the downlink transmission timing. Accordingly, when the IAB node DU has a resource pattern/slot format of U-F-D/U-D, overlapping between downlink symbols and uplink symbols may occur at the slot boundary. In FIG. 27, in the case of the DU of the parent node, OFDM symbols 0 to 6 are configured as uplink and OFDM symbols 7 to 13 are configured as downlink. In this case, a problem occurs in that the resources of the downlink symbol 13 and the uplink symbol 0 overlap. Alternatively, in the case of the IAB node DU, the downlink transmission timing may be earlier than the uplink reception timing. Therefore, when the IAB node DU has a resource pattern/slot format of D-F-U, overlapping between downlink symbols and uplink symbols may occur at the slot boundary. In FIG. 27, in the case of the IAB node DU, OFDM symbols 0 to 6 are configured as downlink and OFDM symbols 7 to 13 are configured as uplink. In this case, there is a problem in that the resources of the uplink symbols 12 and 13 and the downlink symbols 0 and 1 overlap.

As described above, in the MT and DU operations of the IAB node, due to the different timing relationship between the downlink and the uplink and the newly introduced slot format/resource pattern, an overlapping problem occurs between the uplink symbol and the downlink symbol configured by the MT and DU of the IAB node. In the present specification, a method for preventing overlapping between uplink symbols and downlink symbols and operations of DUs and MTs of IAB nodes when overlapping occurs are proposed.

A case in which the above-described overlapping problem occurs is summarized as follows.

Figure 28:
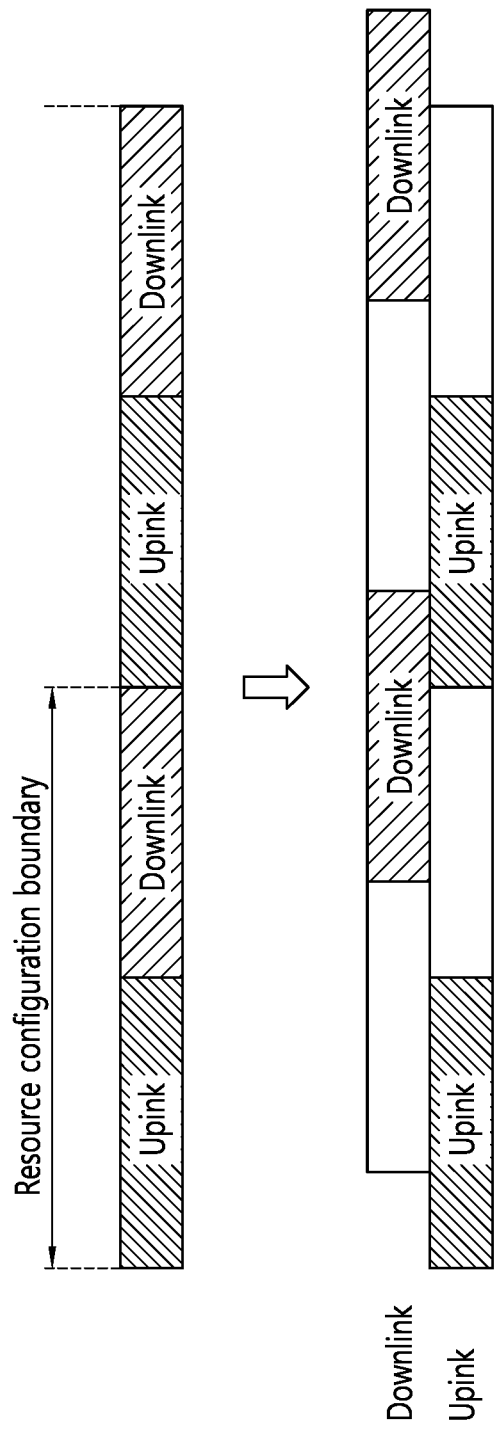
FIG. 28 shows an example of overlapping between uplink symbols and downlink symbols.

FIG. 28 shows an example of overlapping between uplink symbols and downlink symbols.

Assuming that D/U/F resource configuration is made by resource configuration boundary as a unit, as shown in FIG. 28, resource configuration may be performed in the order of uplink resources and downlink resources within a resource configuration boundary. For example, when both consecutive resource boundaries have U-D resource patterns, a situation in which uplink resources continuously exist after the downlink resource region occurs. In this case, when the uplink timing of the MT/DU precedes the downlink timing, a problem in that the downlink region and the uplink region overlap may occur. That is, when the last symbol within a specific resource configuration boundary is a downlink resource and the first symbol within the next resource configuration boundary is an uplink resource, if the uplink timing is ahead of the downlink timing, a problem in which the downlink region and the uplink region overlap may occur.

Figure 29:
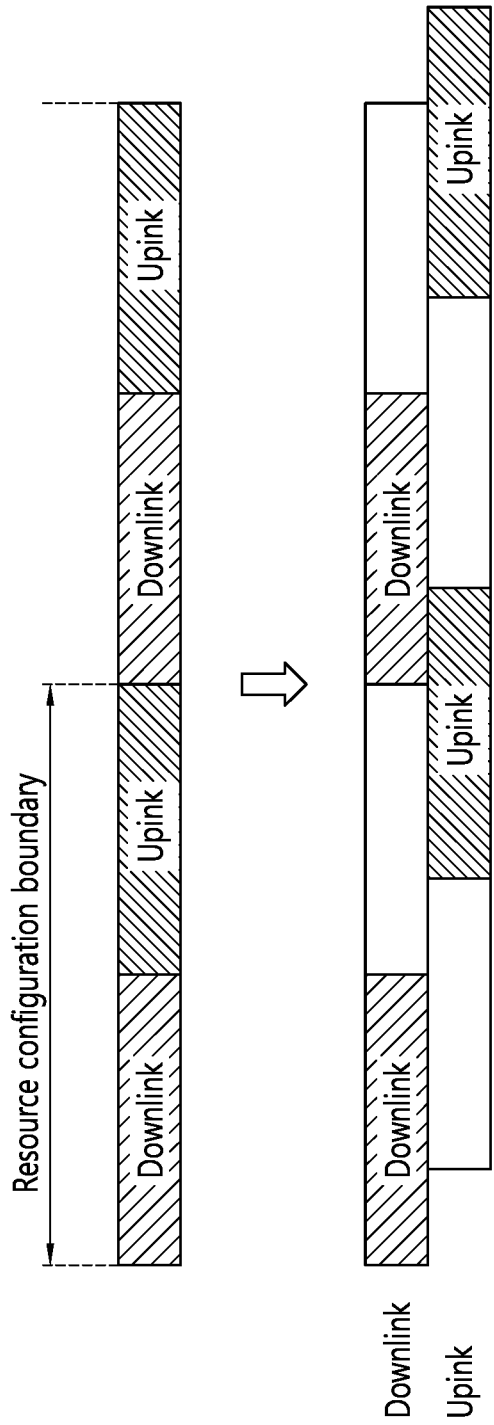
FIG. 29 illustrates another example of overlapping between uplink symbols and downlink symbols.

FIG. 29 illustrates another example of overlapping between uplink symbols and downlink symbols.

When it is assumed that D/U/F resource configuration is performed in units of resource configuration boundaries, as shown in FIG. 29, resource configuration may be performed in the order of downlink resources and uplink resources within the resource configuration boundaries. For example, when two consecutive resource boundaries have a resource pattern of D-U, a situation in which a downlink resource continuously exists after an uplink resource region occurs. In this case, when the downlink timing of the MT/DU precedes the uplink timing, a problem in which the downlink region and the uplink region overlap may occur. That is, when the last symbol within a specific resource configuration boundary is an uplink resource and the first symbol within the next resource configuration boundary is a downlink resource, if the downlink timing is ahead of the uplink timing, a problem in that the downlink region and the uplink region overlap may occur.

In order to solve this problem, it is necessary to define an improved resource configuration method and an appropriate MT/DU operation when the above-mentioned problem occurs. Hereinafter, specific details of these methods are proposed.

First, a new resource pattern/slot format will be described.

In order to prevent the overlapping problem between the uplink symbol and the downlink symbol of the MT and/or DU of the IAB node, a method of configuring a new D/U/F resource pattern not previously supported may be considered when configuring a D/U/F resource for the MT and/or DU.

In order to prevent the overlapping problem between the uplink symbol and the downlink symbol of the MT and/or DU of the IAB node, when the uplink timing precedes the downlink timing, the downlink symbol should not be located immediately after the uplink symbol. Conversely, when the downlink timing precedes the uplink timing, the uplink symbol should not be located immediately after the downlink symbol.

The resource pattern of the MT and/or DU of the IAB node may have a form that starts with an uplink resource and ends with a downlink resource within a resource configuration boundary, for example, a U-F-D or U-D pattern. In this case, when the uplink timing precedes the downlink timing, it is necessary to prevent a phenomenon in which the uplink symbol is located immediately after the downlink symbol. To this end, flexible symbol(s) may be located at the beginning and/or at the end within the resource configuration boundary. That is, a resource pattern/slot format in which resources are located in the following order within a specific resource configuration boundary may be considered.

F-U-F-D and/or F-U-D
U-F-D-F and/or U-D-F
F-U-F-D-F and/or F-U-D-F

The resource pattern of the MT and/or DU of the IAB node may have a form starting with a downlink resource and ending with an uplink resource within a resource configuration boundary, that is, a D-F-U or D-U pattern. In this case, when the downlink timing precedes the uplink timing, it is necessary to prevent a phenomenon in which the downlink symbol is located immediately after the uplink symbol. For this, the flexible symbol(s) may be located at the beginning and/or the last part within the resource configuration boundary. That is, a resource pattern/slot format in which resources are located in the following order within a specific resource configuration boundary may be considered.

F-D-F-U and/or F-D-U
D-F-U-F and/or D-U-F
F-D-F-U-F and/or F-D-U-F

As an example, the IAB node MT may receive TDD-UL-DL-Config-IAB-MT configured through RRC through a donor node/CU, etc., and a semi-static resource pattern may be configured. In this case, a new resource pattern as described above may be configured in the TDD-UL-DL-Config-IAB-MT.

format among slot formats in a slot format table may be set for a specific slot. In this case, a new slot format as described above may be added to this slot format table and applied to the IAB node MT.

Next, an additional setting method for the flexible symbol area will be described.

In order to prevent an overlapping problem between uplink symbols and downlink symbols of the IAB node MT and/or DU, a separate flexible symbol region may be configured for the MT and/or DU. That is, in order to support the resource pattern/slot format that was not previously supported as described above, the existing D/U/F resource configuration method may be reused. Thereafter, the flexible resource region may be allocated to the IAB node MT and/or DU through a separate configuration. In this case, the additionally configured flexible resource region may override the resource type configured through the existing D/U/F resource configuration.

Specifically, as an example of an additional setting method for the flexible symbol region, a semi-static flexible symbol setting method may be considered.

Through TDD-UL-DL-Config-Common information set through system information and TDD-UL-DL-Config-IAB-MT set through RRC, the IAB node MT may know the type of resource for its own time resource.

The following table shows an example of TDD-UL-DL-Config-Common.

TABLE 9

TDD-UL-DL-ConfigCommon
The IE TDD-UL-DL-ConfigCommon determines the cell specific Uplink/Downlink
TDD configuration.
    TDD-UL-DL-ConfigCommon information element
-- ASN1START
-- TAG-TDD-UL-DL-CONFIGCOMMON-START
TDD-UL-DL-ConfigCommon ::=    SEQUENCE {
  referenceSubcarrierSpacing    SubcarrierSpacing,
  pattern1    TDD-UL-DL-Pattern,
  pattern2    TDD-UL-DL-Pattern
OPTIONAL, -- Need R
  ...
}
TDD-UL-DL-Pattern ::=    SEQUENCE {
  dl-UL-TransmissionPeriodicity    ENUMERATED {ms0p5, ms0p625, ms1, ms1p25, ms2, ms2p5, ms5, ms10},
  nrofDownlinkSlots    INTEGER (0..maxNrofSlots),
  nrofDownlinkSymbols    INTEGER (0..maxNrofSymbols-1,
  nrofUplinkSlots    INTEGER (0..maxNrofSlots),
  nrofUplinkSymbols    INTEGER (0..maxNrofSymbols-1),
  ...,
  [[
  dl-UL-TransmissionPeriodicity-v1530   ENUMERATED {ms3, ms4}
OPTIONAL -- Need R
  ]]
}
-- TAG-TDD-UL-DL-CONFIGCOMMON-STOP
-- ASN1STOP In addition, the IAB node MT may receive the slot format dynamically through DCI through the DU of the parent node/parent node, or the like. Through such DCI, one slot The following table describes an example of a field of TDD-UL-DL-Config-Common and a field of TDD-UL-DL-Pattern.

TABLE 10 referenceSubcarrierSpacing: Reference SCS used to determine the time domain boundaries
in the UL-DL pattern which must be common across all subcarrier specific carriers, i.e., TABLE 10-continued independent of the actual subcarrier spacing using for data transmission. Only the values 15, 30 or 60 kHz (FR1), and 60 or 120 kHz (FR2) are applicable. The network configures a not larger than any SCS of configured BWPs for the serving cell.
dl-UL-TransmissionPeriodicity: Periodicity of the DL-UL pattern. If the dl-UL-TransmissionPeriodicity-v1530 is signalled, UE shall ignore the dl-UL-TransmissionPeriodicity.
nrofDownlinkSlots: Number of consecutive full DL slots at the beginning of each DL-UL pattern. The maximum value for this field is 80.
nrofDownlinkSymbols: Number of consecutive DL symbols in the beginning of the slot following the last full DL slot (as derived from nrofDownlinkSlots). The value 0 indicates that there is no partial-downlink slot.
nrofUplinkSlots: Number of consecutive full UL slots at the end of each DL-UL pattern. The maximum value for this field is 80.
nrofUplinkSymbols: Number of consecutive UL symbols in the end of the slot preceding the first full UL slot (as derived from nrofUplinkSlots). The value 0 indicates that there is no partial-uplink slot.

Meanwhile, in the case of TDD-UL-DL-Config-IAB-MT, the type of D/U/F resource for symbols constituting the slot may be set in units of slots. Through TDD-UL-DL-Config-IAB-MT, each slot may receive one of the following D/U/F resource patterns configured.

All symbols in the slot are set to downlink (D).
All symbols in the slot are set to uplink (U).
D-F-U
U-F-D In this case, the D/U/F resource type setting method through the existing TDD-UL-DL-Config-IAB-MT may be used as it is, but the location of the flexible resource may be additionally informed. Such a flexible resource additionally informed may be referred to as an additional flexible resource. In this case, information on the location of such an additional flexible resource may be configured by RRC signaling. In this way, when the location of the additional flexible resource is set, the IAB node MT may operate as follows.

As an example, if a specific symbol is set as an additional flexible resource, the type of D/U/F resource previously configured through TDD-UL-DL-Config-Common and/or TDD-UL-DL-Config-IAB-MT may be ignored and replaced with a flexible resource.

In another example, when a specific symbol is set as an additional flexible resource, if the D/U/F resource type of the corresponding symbol has been previously set through TDD-UL-DL-Config-IAB-MT, the configured D/U/F resource type may be ignored and replaced with a flexible resource. However, if the D/U/F resource type of the corresponding symbol is not previously set through TDD-UL-DL-Config-IAB-MT and is determined through TDD-UL-DL-Config-Common, the D/U/F resource type may be maintained without being replaced with a flexible resource. That is, only the resource that is set as a flexible resource through TDD-UL-DL-Config-Common and has the type of D/U/F resource reset through TDD-UL-DL-Config-IAB-MT can be set as an additional flexible resource.

Figure 30:
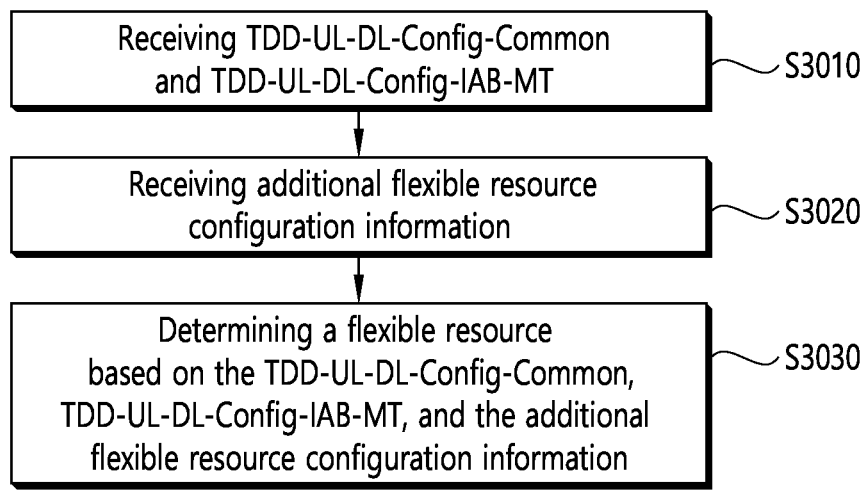
FIG. 30 is a flowchart of an example of a method for determining a flexible resource according to some implementations of the present specification.

FIG. 30 is a flowchart of an example of a method for determining a flexible resource according to some implementations of the present specification.

Referring to FIG. 30, the IAB node receives TDD-UL-DL-Config-Common and TDD-UL-DL-Config-IAB-MT (S3010). Here, the TDD-UL-DL-Config-Common and TDD-UL-DL-Config-IAB-MT may be transmitted through RRC signaling. In addition, the TDD-UL-DL-Config-Common and TDD-UL-DL-Config-IAB-MT may be transmitted by a parent node or a donor node of the IAB node.

In addition, the IAB node receives additional flexible resource configuration information (S3020). Here, the additional flexible resource configuration information may be transmitted by the parent node or the donor node.

Thereafter, the IAB node determines a flexible resource based on the TDD-UL-DL-Config-Common, TDD-UL-DL-Config-IAB-MT, and the additional flexible resource configuration information (S3030).

Here, the setting of the flexible resource may be performed based on the above-described examples.

Meanwhile, after a specific symbol is set as an additional flexible resource, the resource may be reconfigured to a different D/U/F resource type by a dynamic slot format indication in DCI. In this case, the IAB node MT may operate as follows.

For example, when a specific symbol is set as an additional flexible resource, it may not be changed to another resource type by a dynamic slot format indication. That is, if a specific symbol has been set as an additional flexible resource and then if the specific symbol is set as a different resource type through a slot format indication, the setting based on the slot format indication may be ignored and the specific symbol may be maintained as a flexible symbol.

As another example, when a specific symbol is set as an additional flexible resource, it may be changed to another resource type through a dynamic slot format indication.

Meanwhile, the location of the additional flexible resource may be set through the following additional settings.

(Option 1) When configuring the resource pattern for each slot through TDD-UL-DL-Config-IAB-MT, information indicating the location of the flexible symbol may be additionally added. That is, when setting the D/U/F resource pattern for a specific slot, the location of the additional flexible resource may be informed.

Here, as an example, information on the position of the flexible symbol may be set as follows.

(Option 1-1) The information may indicate the number of flexible symbols from the beginning of the slot. When the number of flexible symbols from the beginning of the slot is N, the IAB node MT may determine that N symbols are set as flexible symbols in order from the beginning of the slot. That is, it can be determined that OFDM symbols 0 to (N−1) in the slot are set as flexible symbols.

(Option 1-2) The information may indicate the number of flexible symbols from the end of the slot. When the number of flexible symbols from the end of the slot is M, the IAB node MT may determine that M symbols are set as flexible symbols in the reverse order from the end of the slot. That is, it can be determined that OFDM symbols (13−M+1) to 13 in the slot are set as flexible symbols.

(Option 1-3) The information may inform the number of flexible symbols from the beginning of the slot and the number of flexible symbols from the end of the slot, that is, N and M. The IAB node MT may determine that N symbols are set as flexible symbols in the order from the beginning of the slot and M symbols from the end of the slot in reverse order. That is, it can be determined that OFDM symbols 0 to (N−1) and (13−M+1) to 13 in the slot are set as flexible symbols.

For example, as shown in the following table, when the D/U/F resource pattern of the IAB node MT for a plurality of slots is set through TDD-UL-DL-Config-IAB-MT and when the D/U/F resource pattern for each slot of the IAB node MT is configured through TDD-UL-DL-SlotConfig in TDD-UL-DL-Config-IAB-MT, additional information called flexibleSymbols may be included in TDD-UL-DL-SlotConfig. The information may inform nrofFlexibleSymbolsFront and/or nrofFlexibleSymbolsEnd, and may mean the number of flexible symbols from the beginning of the slot (N) and the number of flexible symbols from the end of the slot (M), respectively.

as flexible symbols in order from the beginning of the indicated slot. That is, it can be determined that OFDM symbols 0 to (N−1) in the indicated slot are set as flexible symbols.

(Option 2-2) The information may inform the number of flexible symbols from the end of the corresponding slot together with the slot index in which the additional flexible symbol is located. When the number of flexible symbols from the end of the slot is M, the IAB node MT may determine that M symbols are set as flexible symbols in the reverse order from the end of the indicated slot. That is, it can be determined that OFDM symbols (13−M+1) to 13 in the indicated slot are set as flexible symbols.

(Option 2-3) The information may inform the number of flexible symbols N from the beginning of the corresponding slot and the number M of flexible symbols from the end of the corresponding slot together with the slot index in which the additional flexible symbol is located. The IAB node MT may determine that the N symbols in the order from the beginning of the indicated slot and the M symbols in the reverse order from the end of the indicated slot are set as flexible symbols. That is, it can be determined that OFDM symbols 0

TABLE 11

```
TDD-UL-DL-Config-IAB-MT ::=             SEQUENCE {
    slotSpecificConfigurationsToAddModList   SEQUENCE (SIZE (1..maxNrofSlots)) OF TDD-UL-
DL-SlotConfig                           OPTIONAL, -- Need N
    slotSpecificConfigurations ToreleaseList  SEQUENCE (SIZE (1..maxNrofSlots)) OF TDD-UL-DL-
SlotIndex                               OPTIONAL,-- Need N
    ...
}
TDD-UL-DL-SlotConfig ::=                SEQUENCE {
    slotIndex                               TDD-UL-DL-SlotIndex,
    symbols                                 CHOICE {
        allDownlink                             NULL,
        allUplink                               NULL,
        explicit                                SEQUENCE {
            nrofDownlinkSymbols                     INTEGER (1..maxNrofSymbols−1)
OPTIONAL,  -- Need S
            nrofUplinkSymbols                       INTEGER (1..maxNrofSymbols−1)
OPTIONAL  -- Need S
        }
    }
}
flexibleSymbols                         SEQUENCE {
    nrofFlexibleSymbolsFront                INTEGER (1..maxNrofSymbols−1)
    nrofFlexibleSymbolsEnd                  INTEGER (1..maxNrofSymbols−1)
    }
}
TDD-UL-DL-SlotIndex ::=                 INTEGER (0..maxNrofSlots−1)
```

(Option 2) When a resource pattern for a plurality of slots is configured through TDD-UL-DL-Config-IAB-MT, information indicating the location of the slot to which additional flexible symbols are added and the location of the flexible symbols in the corresponding slot may be included. That is, the location of the additional flexible resource for each slot may be informed separately from the setting of the D/U/F resource pattern for a specific slot.

Information on the position of the flexible symbol may be set as follows.

(Option 2-1) The information may inform the number of flexible symbols from the beginning of the corresponding slot together with the slot index in which the additional flexible symbol is located. When the number of flexible symbols from the beginning of the slot is N, the IAB node MT may determine that N symbols are set through (N−1) and (13−M+1) through 13 within the indicated slot are set as flexible symbols.

For example, as in the following table, when the D/U/F resource pattern of the IAB node MT for a plurality of slots is set through TDD-UL-DL-Config-IAB-MT, and when the D/U/F resource pattern for each slot of the IAB node MT is set through TDD-UL-DL-SlotConfig in TDD-UL-DL-Config-IAB-MT, additional information called slotSpecificFlexibleConfigurationToAddModList may be informed in TDD-UL-DL-Config-IAB-MT. The information may inform the position of the slot in which the additional flexible symbol exists and the position of the flexible symbol in the slot. Through the above information, nrofFlexibleSymbolsFront and/or nrofFlexibleSymbolsEnd may be informed along with slotIndex. Here, slotIndex means an index of a slot. nrofFlexibleSymbolsFront and nrofFlexibleSymbolsEnd may mean the number N of flexible symbols from the beginning of the slot and the number M of flexible symbols from the end of the slot within a slot indicated through slotIndex, respectively.

TABLE 12

```
TDD-UL-DL-Config-IAB-MT ::=          SEQUENCE {
    slotSpecificConfigurationsToAddModList    SEQUENCE (SIZE (1..maxNrofSlots)) OF TDD-UL-
DL-SlotConfig                        OPTIONAL, -- Need N
    slotSpecificFlexibleConfigurationToAddModList SEQUENCE (SIZE (1..maxNrofSlots)) OF TDD-
Flexible-SlotConfig                  OPTIONAL, -- Need N
    slotSpecificConfigurationsToreleaseList   SEQUENCE (SIZE (1..maxNrofSlots)) OF TDD-UL-DL-
SlotIndex                            OPTIONAL,-- Need N
    ...
}
TDD-UL-DL-SlotConfig ::=             SEQUENCE {
    slotIndex                            TDD-UL-DL-SlotIndex,
    symbols                              CHOICE {
        allDownlink                          NULL,
        allUplink                            NULL,
        explicit                             SEQUENCE {
            nrofDownlinkSymbols                  INTEGER (1..maxNrofSymbols-1)
OPTIONAL,  -- Need S
            nrofUplinkSymbols                    INTEGER (1..maxNrofSymbols-1)
OPTIONAL   -- Need S
        }
    }
}
TDD-Flexible-SlotConfig ::=          SEQUENCE {
    slotIndex                            TDD-UL-DL-SlotIndex,
    flexibleSymbols                      SEQUENCE {
        nrofFlexibleSymbolsFront             INTEGER (1..maxNrofSymbols-1)
        nrofFlexibleSymbolsEnd               INTEGER (1..maxNrofSymbols-1)
}
}
TDD-UL-DL-SlotIndex ::=              INTEGER (0..maxNrofSlots-1)
```

Next, as an example of an additional setting method for the flexible symbol region, a dynamic flexible symbol setting method may be considered.

The IAB node MT may know the type of D/U/F resource for its time resource through slot format configuration information configured through DCI. More specifically, for only symbols set as flexible resources through TDD-UL-DL-Config-Common and TDD-UL-DL-Config-IAB-MT, the type of D/U/F resource may be newly set through DCI format 2_0.

The slot format (U/F/D resource type) for a plurality of slots may be set through the slot format configuration set through DCI format 2_0, and one slot format among a plurality of slot formats defined in the slot format table may be set in units of slots.

Figure 31:
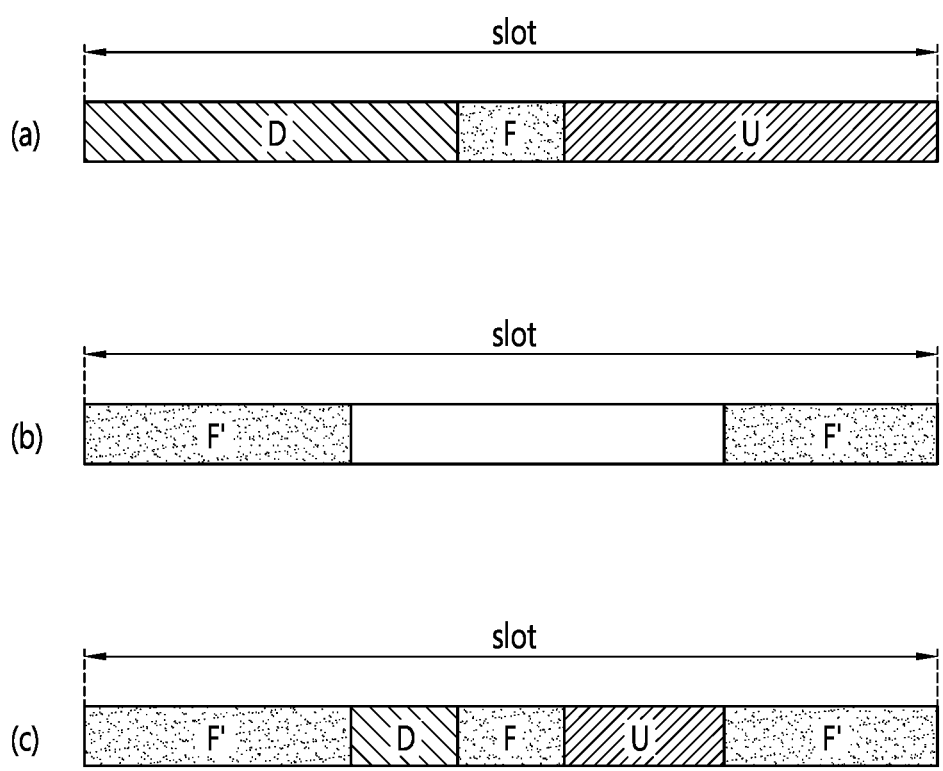
FIGS. 31 to 33 show an example of a resource type setting method according to some implementations of the present specification.
Figure 32:
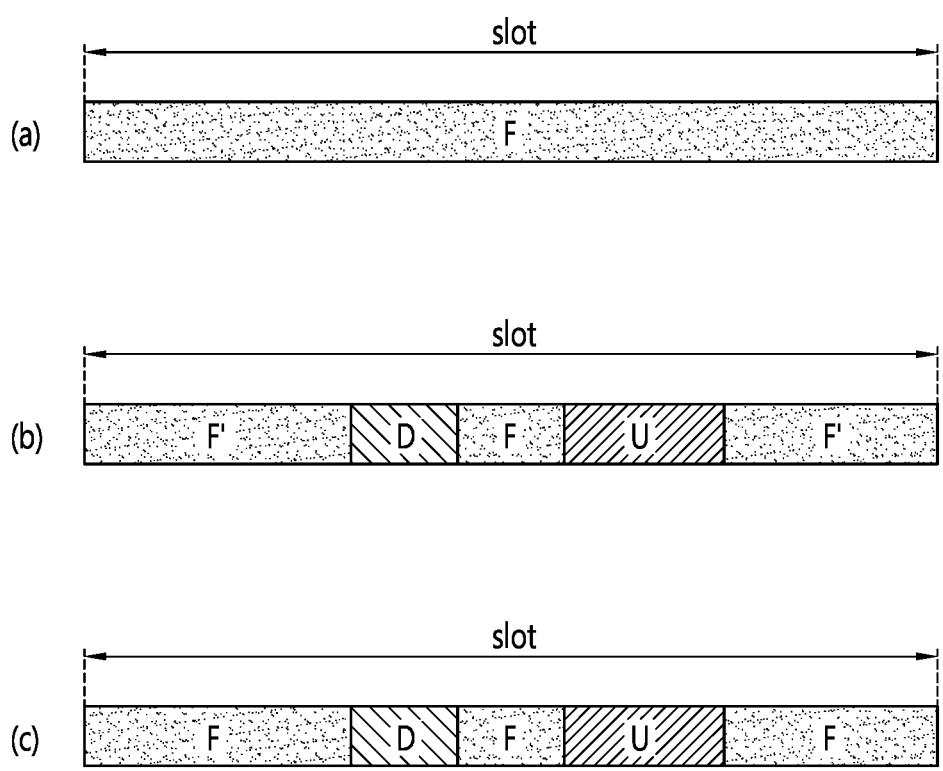
Figure 33:
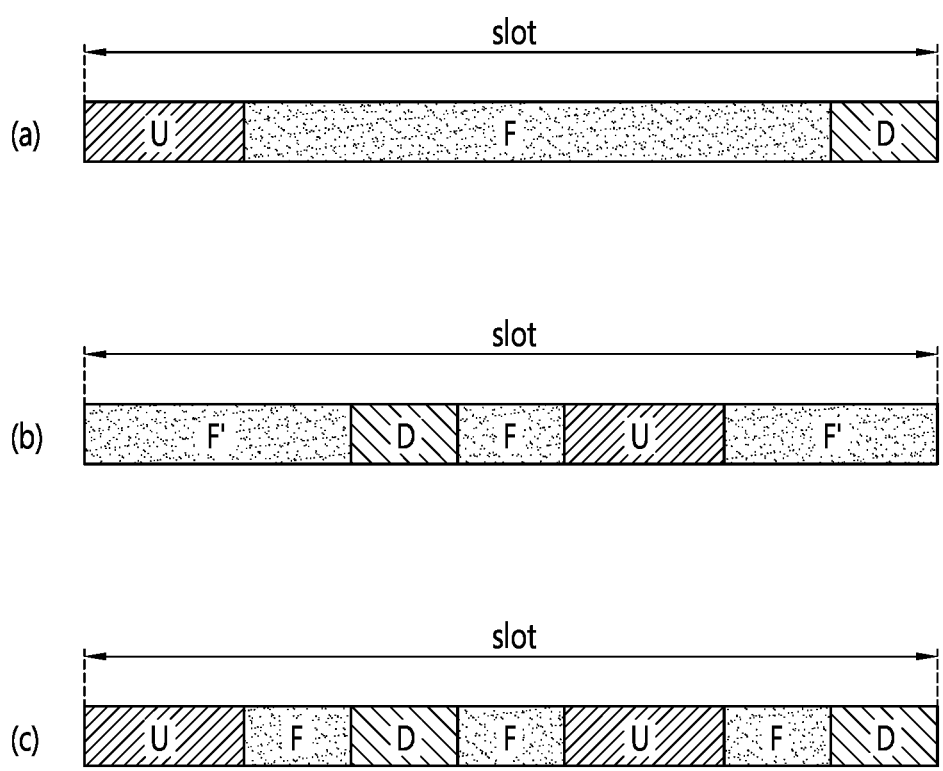

FIG. 31 to FIG. 33 show an example of a resource type setting method according to some implementations of the present specification.

Referring to FIG. 31, the IAB node MT may receive the type of D/U/F resource for the resource in the slot by using the same slot format table as the existing one, but may additionally receive the location of the flexible resource. In this case, the additionally configured flexible symbol may override the type of D/U/F resource set using the slot format table. That is, for example, the IAB node MT may receive the type of D/U/F resource for the resource in the slot as shown in (a) of FIG. 31 using the existing slot format table. The IAB node MT may additionally receive the location of an additional flexible symbol for the same slot as in (b) of FIG. 31. In FIG. 31, this additional flexible resource is denoted as F. In this case, the additional flexible symbol ignores the type of resource set using the slot format table, and as a result, the resources in the corresponding slot may have the type of D/U/F resource as shown in (c) of FIG. 31.

As mentioned above, the slot format dynamically set through the existing slot format indication and the setting of the additional flexible resource location may be applied only to a symbol whose resource type is configured as a flexible resource through TDD-UL-DL-Config-Common and TDD-UL-DL-Config-IAB-MT. That is, when a specific symbol is set to downlink or uplink through TDD-UL-DL-Config-Common and TDD-UL-DL-Config-IAB-MT, even if another resource type is set through the dynamically set slot format, the existing resource type may be maintained without applying the corresponding resource type.

In this case, for example, for a specific slot, all symbols in the slot can be set as flexible resources through TDD-UL-DL-Config-Common and TDD-UL-DL-Config-IAB-MT as in (a) of FIG. 32, and as shown in (b) of FIG. 32, the slot format may be dynamically set. In this case, the final D/U/F resource type of the corresponding slot may be determined as shown in (c) of FIG. 32 by setting the dynamic slot format ignoring the resource types of all symbols in the slot.

As another example, for a specific slot, the resource type may be set through TDD-UL-DL-Config-Common and TDD-UL-DL-Config-IAB-MT as shown in (a) of FIG. 33. Thereafter, the slot format may be dynamically set as shown in (b) of FIG. 33. In this case, the dynamic slot format indication is applied only to the flexible resource shown in (a) of FIG. 33, and as a result, the corresponding slot may have the same type of D/U/F resource as in (c) of FIG. 33.

In this case, a method of setting the position of an additional flexible symbol in a specific slot is proposed. In the present specification, for convenience of description, information on a position of an additional flexible symbol in a specific slot may be referred to as flexible symbol position information.

The position of the additional flexible symbol in a specific slot may be limited to consecutive symbols located at the beginning of the slot and/or consecutive symbols located at the end of the slot.

Specifically, the flexible symbol position information may be set as follows.

For example, a specific index may be indicated through flexible symbol position information, and the corresponding index may indicate the configuration of the position of the flexible symbol in a specific slot. That is, when there are a plurality of indexes, each index may indicate a different position configuration of the flexible symbol in the slot. For example, the configuration of the flexible symbol in the slot according to the index may be as shown in Table 13. In the case of a symbol marked F in Table 13, a symbol set as an additional flexible symbol may be indicated.

TABLE 13

| | Symbol number in a slot | | | | | | | | | | | | | |
|---|---|---|---|---|---|---|---|---|---|---|---|---|---|---|
| Index | 0 | 1 | 2 | 3 | 4 | 5 | 6 | 7 | 8 | 9 | 10 | 11 | 12 | 13 |
| 0 | — | — | — | — | — | — | — | — | — | — | — | — | — | — |
| 1 | F | F | — | — | — | — | — | — | — | — | — | — | — | — |
| 2 | F | F | F | F | — | — | — | — | — | — | — | — | — | — |
| 3 | F | F | F | F | F | F | — | — | — | — | — | — | — | — |
| 4 | F | F | F | F | F | F | F | F | — | — | — | — | — | — |
| 5 | — | — | — | — | — | — | — | — | — | — | — | — | F | F |
| 6 | — | — | — | — | — | — | — | — | — | — | F | F | F | F |
| 7 | — | — | — | — | — | — | — | — | F | F | F | F | F | F |
| 8 | — | — | — | — | — | — | F | F | F | F | F | F | F | F |
| 9 | F | F | — | — | — | — | — | — | — | — | — | — | F | F |
| 10 | F | F | F | F | — | — | — | — | — | — | — | — | F | F |
| 11 | F | F | — | — | — | — | — | — | — | — | F | F | F | F |
| 12 | F | F | F | F | — | — | — | — | — | — | F | F | F | F |
| 13 | F | F | F | F | F | F | — | — | — | — | F | F | F | F |
| 14 | F | F | F | F | — | — | — | — | F | F | F | F | F | F |
| 15 | F | F | F | F | F | F | — | — | F | F | F | F | F | F |

As another example, the number N of flexible symbols from the beginning of the corresponding slot and/or the number M of flexible symbols from the end of the corresponding slot may be informed through the flexible symbol position information. The IAB node MT may determine that the N symbols in the order from the beginning of the slot and/or the M symbols in the reverse order from the end of the slot are set as flexible symbols. That is, it can be determined that OFDM symbols 0 to (N−1) and/or OFDM symbols (13−M+1) to 13 in the indicated slot are set as flexible symbols.

On the other hand, in the case of the slot format indication through the existing DCI, the IAB node MT/UE may obtain the SFI-Index value indicated to it through the DCI format 2_0. SFI-Index indicates a specific slotFormatCombinationId, and a specific slotFormatCombinationId indicates a specific slotFormatCombinations. That is, slotFormatCombinations matching each slotFormatCombinationId exist, and slotFormatCombinationId information and slotFormatCombinations information can be obtained by receiving an SFI-Index indication. Here, slotFormatCombinations may include information on slot format indexes for a plurality of slots. For example, if slotFormatCombinations mapped with a specific slotFormatCombinationId are {0, 0, 0, 20, 1, 1, 1, 0, 0, 0}, the slot format index for each of 10 consecutive slots is 0, 0, 0, 20, 1, 1, 1, 0, 0, 0. In this way, the IAB node MT/UE may obtain slot format information for a plurality of slots through DCI format 2_0.

Based on this, the present specification proposes a method of transmitting flexible symbol position information through DCI. The existing dynamic slot format indication information and additionally provided flexible symbol position information may be transmitted through the same DCI, for example, DCI format 2_0. A method for this may be specifically as follows.

(Option 3-1) slotFormatCombinations indicated by slotFormatCombinationId may indicate a slot format index and flexible symbol position information for each slot. In this case, the flexible symbol position information may be configured as described above. For example, if the existing slotFormatCombinations indicated by a specific slotFormatCombinationId are {0, 2, 0, 0, 0, 20, 0, 1, 0, 1, 0, 1, 7, 0, 0, 0, 0, 0, 0}, odd-numbered numbers may indicate a slot format index for each slot as before, and even-numbered numbers may indicate flexible symbol position information for each slot in order. In this case, the flexible symbol position information may indicate the index of Table 13 above. That is, for the first slot, the slot format index is 0 and the index of the flexible symbol position information is 2. Accordingly, the slot format indicated by the slot format index 0 is {D D D D D D D D D D D D D D} for each symbol in the slot. And index 2 of the flexible symbol position information indicates that symbols having symbol numbers 0 to 3 in the slot become flexible symbols based on Table 13 above. As a result, the slot format in the corresponding slot may be {F F F F D D D D D D D D D D}.

(Option 3-2) When SFI-Index indicates a specific slotFormatCombinationId, the corresponding slotFormatCombinationId may be mapped to a specific slotFormatCombinations and a specific flexibleLocationCombinations. In this case, flexibleLocationCombinations may include flexible symbol location information for n consecutive slots. For example, slotFormatCombinations mapped to a specific slotFormatCombinationId is {0, 0, 0, 20, 1, 1, 1, 0, 0}, flexibleLocationCombinations is {2, 0, 0, 0, 0, 0, 7, 0, 0, 0}. In this case, the flexible symbol position information may indicate the index of Table 13 above. In this case, the slot format index is 0 and the index of the flexible symbol position information is 2 for the first slot. Accordingly, the slot format indicated by the slot format index 0 is {D D D D D D D D D D D D D D} for each symbol in the slot. Index 2 of the flexible symbol position information indicates that symbols having symbol numbers 0 to 3 in the slot become flexible symbols. As a result, the slot format in the corresponding slot may be {F F F F D D D D D D D D D D}. In this case, information about slotFormatCombinations and flexibleLocationCombinations mapped to each slotFormatCombinationId may be set in advance through RRC signaling or the like.

(Option 3-3) One SFI-Index can point to a specific slotFormatCombinationId and flexibleLocationCombinationId. In this case, the corresponding slotFormatCombinationId may be mapped to a specific slotFormatCombinations, and flexibleLocationCombinationId may be mapped to a specific flexibleLocationCombinations. For example, when the SFI-Index indicated by the IAB node MT is 1, slotFormatCombinationId mapped to the corresponding SFI-Index may be 1 and flexibleLocationCombinationId may be 3. In this case, for example, a slotFormatCombinations mapped to slotFormatCombinationId 1 is {0, 0, 0, 20, 1, 1, 1, 0, 0, 0}, and flexibleLocationCombinations mapped to flexibleLocationCombinationId 3 is {2, 0, 0, 0, 0, 7, 0, 0, 0}. In this case, the flexible symbol position information may indicate the index of Table 13 above. Accordingly, the slot format indicated by the slot format index 0 is {D DDDD D D D D D D D D D} for each symbol in the slot. And, index 2 of the flexible symbol position information indicates that symbols having symbol numbers 0 to 3 in the slot become flexible symbols. Therefore, as a result, the slot format in the corresponding slot becomes {F F F F D D D D D D D D D D}. In this case, slotFormatCombinationId information and flexibleLocationCombinationId information mapped to each SFI-Index may be set in advance through RRC signaling or the like. In addition, slotFormatCombinations information mapped to each slotFormatCombinationId and flexibleLocationCombinations information mapped to each flexibleLocationCombinationId may be set in advance through RRC signaling or the like.

(Option 3-4) The IAB node MT may be instructed with the SFI-Index and additionally the FL-Index through DCI. Here, the SFI-Index indicates a specific slotFormatCombinationId as before, and each slotFormatCombinationId may be mapped to a specific slotFormatCombinations. Also, here, FL-Index indicates a specific flexibleLocationCombinationId, and each flexibleLocationCombinationId may be mapped with a specific flexibleLocationCombinations. At this time, for example, SFI-Index and FL-Index are set to 1 and 3, respectively, slotFormatCombinationId may be 1 and flexibleLocationCombinationId may be 3. At this time, slotFormatCombinations mapped to slotFormatCombinationId 1 is {0, 0, 0, 20, 1, 1, 1, 0, 0, 0}, and flexibleLocationCombinations mapped to flexibleLocationCombinationId 3 is {2, 0, 0, 0, 0, 0, 7, 0, 0, 0}. In this case, the flexible symbol position information may indicate the index of Table 13 above. Accordingly, the slot format indicated by the slot format index 0 is {D D D D D D D D D D D D D D} for each symbol in the slot. Index 2 of the flexible symbol position information indicates that symbols having symbol numbers 0 to 3 in the slot become flexible symbols. Therefore, as a result, the slot format in the corresponding slot becomes {F F F F D D D D D D D D D D}. In this case, slotFormatCombinationId information FIG. 34 is a flowchart of an example of an SFI-Index identification method of an IAB node MT according to some implementations of the present specification.

Figure 34:
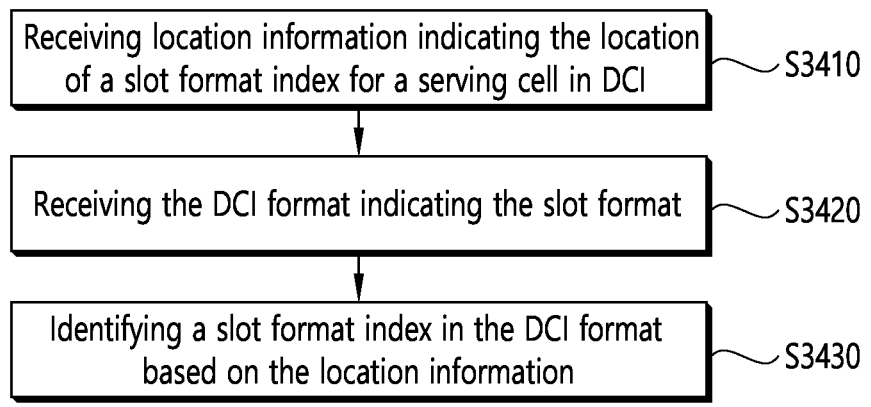
FIG. 34 is a flowchart of an example of an SFI-Index identification method of an IAB node MT according to some implementations of the present specification.

Referring to FIG. 34, the IAB node MT receives location information indicating the location of a slot format index for a serving cell in DCI (S3410). Here, the slot format index may be determined through the aforementioned slotFormatCombinationId. Also, here, as an example, the position of the slot format index may be determined through the start bit of the corresponding information in the DCI. Also, here, the location information may be positionInDCI.

Thereafter, the IAB node MT receives the DCI format indicating the slot format (S3420). Here, the DCI format may be DCI format 2_0.

Thereafter, the IAB node MT identifies a slot format index in the DCI format based on the location information (S3430).

Meanwhile, the position of the SFI-Index value among bits constituting the contents of the DCI received by the IAB node MT may be obtained through the positionInDCI value. The positionInDCI value may mean the (starting) position (bit) of the slotFormatCombinationId (SFI-Index) for this serving cell (servingCellId) within the DCI payload. The IAB node MT may be configured with a positionInDCI value through RRC signaling, and among the payloads of DCI format 2_0, K bits from positionInDCI may be determined as their SFI-Index values. In this case, the value of K may be equal to max {ceil($\log_2$(maxSFIindex+1)), 1}. Here, ceil( ) is a ceiling function. The value of maxSFIIndex may be the maximum value of the values provided by corresponding slotFormatCombinationId. That is, it means the largest value among slotFormatCombinationId values given to the IAB node MT. When the IAB node MT receives slotFormatCombinations for slotFormatCombinationId of 0 to 127, the SFI-Index indicated by the corresponding IAB node MT may have one of values of 0 to 127. At this time, the value of maxSFIIndex of the corresponding IAB node MT becomes 127. The following table is an example of DCI format 2_0.

TABLE 14

Format 2_0

DCI format 2_0 is used for notifying the slot format, COT duration, available RB set, and search space group switching.
The following information is transmitted by means of the DCI format 2_0 with CRC scrambled by SFI-RNTI:
- Slot format indicator 1, Slot format indicator 2, . . . , Slot format indicator N.
- If the higher layer parameter availableRB-SetPerCell-r16 is configured,
  - Available RB set Indicator 1, Available RB set Indicator 2, . . . , Available RB set Indicator N1,
- If the higher layer parameter CO-DurationPerCell-r16 is configured
  - COT duration indicator 1, COT duration indicator 2, . . . , COT duration indicator N2.
- If the higher layer parameter searchSpaceSwitching-r16 = "explicit"
  - Monitoring group flag 1, Monitoring group flag 2, . . . , Monitoring group flag [M].
The size of DCI format 2_0 is configurable by higher layers up to 128 bits.

mapped to each SFI-Index and flexibleLocationCombinationId information mapped to each FL-Index may be set in advance through RRC signaling or the like. Alternatively, the SFI-Index value may be equal to slotFormatCombinationId, and/or the FL-Index value may be equal to flexibleLocationCombinationId. In addition, slotFormatCombinations information mapped to each slotFormatCombinationId and flexibleLocationCombinations information mapped to each flexibleLocationCombinationId may be set in advance through RRC signaling or the like.

Meanwhile, if the IAB node MT knows the position of the start bit indicating the FL-Index value among bits constituting the received DCI payload, the FL-Index value can be obtained through L consecutive bits at the corresponding position. In this case, the L value may be max {ceil($\log_2$ (maximum value of FL-Index+1)), 1}. In this case, the start bit position specifically indicating the FL-Index value may be as follows.

For example, the IAB node MT may be configured with the value of positionDCI2 set separately from positionInDCI. This positionDCI2 value may be set through RRC signaling. The value of positionDCI2 may indicate the position of the start bit indicating the FL-Index value from the payload of DCI.

As another example, the IAB node MT may determine the sum of the positionInDCI and a values (i.e., positionInDCI+α) as the position of the start bit indicating the FL-Index value from the DCI payload. Characteristically, the value of a may be equal to maxSFIIndex. That is, the next L consecutive bits of bits constituting the SFI-Index of the IAB node MT in the payload of the DCI may indicate the FL-Index value of the IAB node MT.

Next, a method of applying a guard symbol when switching between uplink and downlink will be described.

In order to solve the overlapping problem between the uplink symbol and the downlink symbol of the IAB node MT and/or the IAB node DU, the IAB node MT and/or the IAB node DU may drop a specific resource among the resources in which the uplink resource and the downlink resource overlap. That is, the downlink (or uplink) operation may be performed without performing the uplink (or downlink) operation in the time resource in which the uplink resource and the downlink resource overlap. The following will be described based on the IAB node MT, but the same principle may be applied to the IAB node DU.

First, an overlapping problem between an uplink symbol and a downlink symbol of an IAB node MT (or DU) may have the following characteristics.

From the point of view of the IAB node MT, if the TA (timing advance) value corresponding to the difference of the uplink transmission timing from the downlink reception timing is positive, overlapping between uplink symbols and downlink symbols may occur during downlink-uplink switching (switching from downlink to uplink) in the IAB node MT. On the other hand, if the TA value is negative, overlapping between uplink symbols and downlink symbols may occur during uplink-downlink switching (switching from uplink to downlink) in the IAB node MT.

Figure 35:
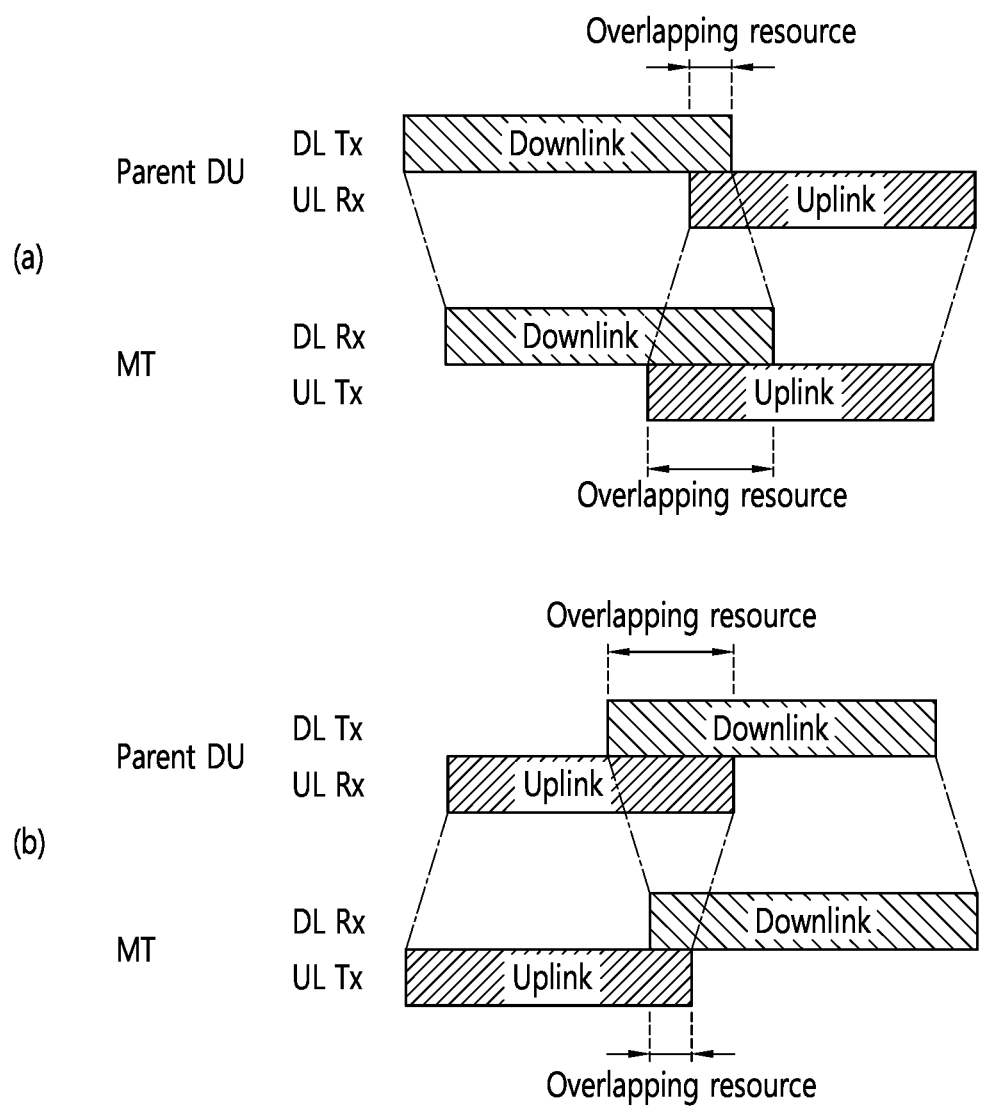
FIG. 35 illustrates an example of overlapping between downlink symbols and uplink symbols.

FIG. 35 illustrates an example of overlapping between downlink symbols and uplink symbols. In FIG. 35, the DU of the parent node may be referred to as a parent DU, and the MT of the IAB node may be referred to as an MT.

During downlink-uplink switching, overlapping between uplink symbols and downlink symbols may occur in both the DU of the parent node for the IAB node and the MT of the IAB node, or overlapping may occur only in the MT of the IAB node. In this case, as shown in (a) of FIG. 35, the overlapping section of the MT of the IAB node is larger than the overlapping section of the DU of the parent node. That is, the overlapping section of the DU of the parent node is a subset of the overlapping section of the MT of the IAB node.

On the other hand, during uplink-downlink switching, overlapping between uplink symbols and downlink symbols may occur in both the DU of the parent node and the MT of the IAB node, or overlapping may occur only in the DU of the parent node. In this case, as shown in (b) of FIG. 35, the overlapping section of the DU of the parent node is larger than the overlapping section of the MT of the IAB node. That is, the overlapping section of the MT of the IAB node is a subset of the overlapping section of the DU of the parent node.

Hereinafter, a method of setting a guard symbol will be described.

In the present specification, a guard symbol is set for the IAB node MT, and thus, it is proposed to solve the above-described overlapping problem. That is, the IAB node MT may not perform transmission/reception in the corresponding guard symbol by setting the uplink and/or downlink resource in the overlapping resource as a guard symbol. Characteristically, the number of guard symbols is set only in one case, among when the MT of the IAB node switches from an uplink transmission operation to a downlink reception operation and when switching from a downlink reception operation to an uplink transmission operation, or alternatively, it may be set separately for both cases. At this time, it is specifically proposed to set the guard symbol as follows.

(Option 4-1) Cell-Specific Settings

The IAB node DU may inform MTs of the child node of DU-specifically applied guard symbol resource information. Here, the resource may mean a resource that the IAB node DU intends to use as a guard symbol due to overlapping between the uplink resource and the downlink resource. Alternatively, the resource may refer to a resource that the MTs of the child node of the IAB node DU set as a guard symbol and use due to overlapping between the uplink resource and the downlink resource. That is, the IAB node MT may receive cell-specific guard symbol resource information from the DU of the parent node. The resource may refer to a resource that is not used for transmission/reception (with the MT of the IAB node) used by the DU of the parent node as a guard symbol. Alternatively, it may mean a resource to be used by the IAB node MT as a guard symbol due to overlapping between uplink resources and downlink resources. Accordingly, the IAB node MT may set its own guard symbol using the configured guard symbol resource information, and may not perform transmission/reception with the DU of the parent node in the corresponding resource.

(Option 4-2) MT-Specific Settings

The IAB node DU may inform MT-specific guard symbol resource information of the child node to the MTs of the child node. The corresponding resource may mean a resource that the IAB node DU intends to use as a guard symbol due to overlapping between the uplink resource and the downlink resource. Alternatively, the corresponding resource may mean a resource that the MT of the child node of the IAB node DU sets as a guard symbol and uses due to overlapping between the uplink resource and the downlink resource. That is, the IAB node MT may receive MT-specific guard symbol resource information from the DU of the parent node. The resource may refer to a resource that is not used for transmission/reception (with the MT of the IAB node) used by the DU of the parent node as a guard symbol. Alternatively, it may mean a resource to be used by the IAB node MT as a guard symbol due to overlapping between uplink resources and downlink resources. Accordingly, the IAB node MT may set its own guard symbol using the configured guard symbol resource information, and may not perform transmission/reception with the DU of the parent node in the corresponding resource.

In this case, the IAB node MT may additionally inform the DU of the parent node of information on the location and/or the number of guard symbols it needs. The DU of the parent node may determine the position and/or the number of guard symbols of the IAB node MT based on the information.

(Option 4-3) IAB Node MT Determines and Applies the Guard Symbol

The IAB node MT may know information about a resource in which overlapping between its uplink resource and downlink resource occurs. Accordingly, the IAB node MT may determine and apply the resource location and/or the number of guard symbols required by itself.

In this case, the IAB node MT may additionally inform the DU of the parent node of information on the location and/or the number of guard symbols it applies. The DU of the parent node may not perform transmission/reception with the corresponding IAB node MT in the resource used by the IAB node MT as a guard symbol based on the above information.

Meanwhile, a method of determining the resource location and number of guard symbols in options 4-1 to 4-3 will be described later.

When the IAB node MT determines the guard symbol resource information using the above-described method, it may operate as follows.

As an example, the IAB node MT may be configured with resource information of the guard symbol from the DU of the parent node based on the cell-specific configuration and/or may be additionally configured based on the MT-specific configuration. That is, cell-specifically, guard symbol information applied to IAB node MTs connected to the DU of the same parent node may be configured, and guard symbol information may be additionally configured MT-specifically. At this time, this MT-specific guard symbol resource replaces the cell-specifically configured guard symbol resource information, always includes the cell-specifically configured guard symbol resource information, or is guard symbol resource information additionally applied along with cell-specifically configured guard symbol resource information.

In another example, information on the guard symbol applied when the IAB node MT performs uplink-downlink switching is configured based on the above-described cell-specific configuration, information on guard symbols applied during downlink-uplink switching may be configured based on the aforementioned MT-specific configuration.

As described in FIG. 35, during uplink-downlink switching, the overlapping resource of the DU of the parent node may include the overlapping resource of the IAB node MT. That is, a resource that the IAB node MT cannot use due to overlapping may be included in the resource that the DU of the parent node cannot use due to overlapping. Therefore, cell-specifically, the DU of the parent node informs the resource information that it cannot use due to overlapping, the IAB node MT may determine the corresponding resource as a resource that cannot be used for communication with the DU of the parent node. Accordingly, information on the guard symbol applied when the IAB node MT performs uplink-downlink switching may be configured based on the aforementioned cell-specific configuration.

On the other hand, as described with reference to FIG. 35, during downlink-uplink switching, the overlapping resource of the DU of the parent node may be a subset of the overlapping resource of the IAB node MT. That is, there are more resources that the IAB node MT cannot use due to overlapping than the resources that the DU of the parent node cannot use due to overlapping, which may be different for each IAB node MT. Accordingly, information on the guard symbol applied when the IAB node MT performs downlink-uplink switching may be configured based on the aforementioned MT-specific configuration.

As another example, the IAB node MT is configured with information on guard symbols applied when the IAB node MT switches uplink-downlink, and information on guard symbols applied when the IAB node MT switches downlink-uplink based on the aforementioned cell-specific configuration. And the IAB node MT is configured with information on a guard symbol applied during downlink-uplink switching based on the above-described MT-specific configuration. At this time, the guard symbol resource applied during downlink-uplink switching by the MT-specific configuration may replace cell-specifically set guard symbol resource information, or always include cell-specifically set guard symbol resource information, or it may mean additionally applied guard symbol resource information in addition to the cell-specifically configured guard symbol resource information.

Hereinafter, a method of determining the position and number of guard symbols will be described.

The number of guard symbols required to solve the overlapping problem between the uplink symbol and the downlink symbol of the IAB node MT may be set as follows.

As an example, since the IAB node MT may determine the amount of overlapping resources, it may determine/determine the number of necessary guard symbols by itself.

As another example, the number of guard symbols may be set from the DU of the parent node. In this case, such information may be set based on the above-described method of setting the guard symbol.

On the other hand, the position of the guard symbol required to solve the overlapping problem between the uplink symbol and the downlink symbol of the IAB node MT may be determined as follows.

(Option 5-1) An uplink resource may be set as a guard symbol. That is, the downlink operation has priority among the uplink operation and the downlink operation, so that the downlink operation may be performed and the uplink operation may be dropped. In this case, a specific number of uplink resources may be used as guard symbols during uplink-downlink switching or downlink-uplink switching.

(Option 5-2) A downlink resource may be configured as a guard symbol. That is, the uplink operation has priority among the uplink operation and the downlink operation, so that the uplink operation may be performed and the downlink operation may be dropped. In this case, a specific number of downlink resources may be used as guard symbols during uplink-downlink switching or downlink-uplink switching.

(Option 5-3) Whether an uplink resource or a downlink resource is used as the guard symbol may be configured in the IAB node MT. Information related thereto may be set based on the above-described method of setting the guard symbol. That is, information on a priority operation among the uplink operation and the downlink operation may be set to the IAB node MT.

(Option 5-4) Both the number of downlink resources (Ng_D) and the number of uplink resources (Ng_U) used as guard symbols may be set. In this case, when the IAB node MT transitions from an uplink transmission operation to a downlink reception operation or from a downlink reception operation to an uplink transmission operation, Ng_D downlink symbols and Ng_U uplink symbols can be used as guard symbols. For example, when the IAB node MT performs downlink operation up to symbol (n−1) and performs uplink operation from symbol n, Ng_D symbols before symbol (n−1) and Ng_U symbols after symbol n can be used as guard symbols. For another example, when the IAB node MT performs uplink operation up to symbol (n−1) and performs downlink operation from symbol n, Ng_U symbols before symbol (n−1) and Ng_D symbols after symbol n can be used as guard symbols. Information related thereto may be set based on the above-described method of setting the guard symbol.

(Option 5-5) When the IAB node MT transitions from an uplink transmission operation to a downlink reception operation or from a downlink reception operation to an uplink transmission operation, the previous symbol(s) at the time the transition occurs can be guard symbols. For example, when an IAB node MT transitions from an uplink operation to a downlink operation, the uplink resource becomes a guard symbol, when the IAB node MT transitions from the downlink operation to the uplink operation, the downlink resource may be a guard symbol.

(Option 5-6) When the IAB node MT transitions from the uplink transmission operation to the downlink reception operation or from the downlink reception operation to the uplink transmission operation, the symbol(s) after the time when the transition occurs can be guard symbols. For example, when the IAB node MT transitions from the uplink operation to the downlink operation, the downlink resource can be a guard symbol, and when the IAB node MT transitions from the downlink operation to the uplink operation, the uplink resource can be the guard symbol.

(Option 5-7) When the IAB node MT transitions from an uplink transmission operation to a downlink reception operation or from a downlink reception operation to an uplink transmission operation, whether the previous symbol(s) at the time point at which the transition occurs becomes the guard symbol or the symbol(s) after the time at which the transition occurs becomes the guard symbol may be configured in the IAB node MT. Information related thereto may be set based on the above-described method of setting the guard symbol. That is, the method applied among the options 5-5 and 5-6 may be configured for the IAB node MT.

(Option 5-8) When the IAB node MT transitions from an uplink transmission operation to a downlink reception operation or from a downlink reception operation to an uplink transmission operation, the number of guard symbols located before the transition (Ng_1) and the number of guard symbols located after the transition (Ng_2) may be configured in the IAB node MT. In this case, when the IAB node MT transitions from the uplink transmission operation to the downlink reception operation or from the downlink reception operation to the uplink transmission operation, Ng_1 symbols before the transition time and Ng_2 symbols after the transition time can be used as guard symbols. For example, when the IAB node MT performs downlink operation up to symbol (n−1) and then performs uplink operation from symbol n, Ng_1 symbols before symbol (n−1) and Ng_2 symbols after symbol n can be used as a guard symbol. Information related thereto may be set based on the above-described method of setting the guard symbol.

(Option 5-9) A position (e.g., symbol index information) of a symbol used as a guard symbol may be configured in the IAB node MT. For example, position information of a symbol used as a guard symbol may be set for symbols included in a specific time interval. Such information may be set, for example, in a bitmap manner, so that a symbol used as a guard symbol may be denoted as 1, and an unused symbol may be denoted as 0.

On the other hand, such a time period may be set to, for example, K msec or K slots, so that the set guard symbol information may be repeatedly applied during the corresponding time period.

Alternatively, this time interval means, for example, N symbols before and after a time point at which uplink-downlink switching or downlink-uplink switching occurs, meaning guard symbol information during the corresponding symbol interval.

In this case, when a specific signal/channel is additionally transmitted/received in the overlapping resource region of the downlink symbol and the uplink symbol, the following operation may be performed.

For example, when the IAB node MT needs to receive a synchronization signal/physical broadcast channel (SS/PBCH) block transmitted by the DU of its parent node and/or when it is necessary to perform measurement by receiving the SS/PBCH block transmitted by the DU of another IAB node within the overlapped resource, the IAB node MT may drop an uplink transmission operation in the corresponding overlapped resource or set uplink symbols as guard symbols, and may perform a downlink reception operation. Alternatively, a downlink reception operation is performed on a symbol for receiving an SS/PBCH block among the overlapped resources, and a priority operation among an uplink operation and a downlink operation is performed on the remaining overlapping resources.

As another example, when the IAB node MT needs to receive periodic and/or aperiodic CSI-RS (channel state information reference signal) within the overlapped resource, the IAB node MT may drop an uplink transmission operation in the corresponding overlapping resource or may set uplink symbols as guard symbols and perform a downlink reception operation. Alternatively, a downlink reception operation is performed on a symbol for receiving a CSI-RS among the overlapped resources, and a priority operation is performed between an uplink operation and a downlink operation in the remaining overlapping resources.

As another example, when the IAB node MT needs to transmit a physical random access channel (PRACH) within the overlapped resource, the IAB node MT may drop a downlink reception operation in the corresponding overlapping resource or may set downlink symbols as guard symbols and perform an uplink transmission operation. Alternatively, an uplink transmission operation is performed on a symbol for transmitting a PRACH among corresponding overlapping resources, and a priority operation among an uplink operation and a downlink operation is performed on the remaining overlapping resources.

As another example, when the IAB node MT needs to transmit an SR (scheduling request) within the overlapped resource, the IAB node MT may drop a downlink reception operation in the corresponding overlapping resource or may set downlink symbols as guard symbols and perform an uplink transmission operation. Alternatively, an uplink transmission operation is performed on a symbol for transmitting an SR among the overlapped resources, and a priority operation is performed between an uplink operation and a downlink operation on the remaining overlapped resources.

Summarizing the above contents, for example, the IAB node MT may determine/apply a guard symbol due to the overlapping problem between the uplink resource and the downlink resource as follows.

As an example, the IAB node MT may be configured with resource direction information (uplink or downlink) to generate a guard symbol during downlink-uplink switching and the number of guard symbols, and resource direction information (uplink or downlink) to generate a guard symbol during uplink-downlink switching and the number of guard symbols. This information may be cell-specific and/or MT-specific. The IAB node MT may not perform an operation in the guard symbol region when directly switching from a downlink symbol to an uplink symbol using the configured information. In addition, the IAB node MT may not perform an operation in the guard symbol region when directly switching from an uplink symbol to a downlink symbol using the configured information. However, for example, if the guard symbol region exists in the downlink symbol, but the SS/PBCH block needs to be received in the corresponding symbol, the downlink operation may be performed by setting the uplink symbol as the guard symbol.

As another example, the IAB node MT may be configured with information on the guard symbol position during downlink-uplink switching and information on the guard symbol position during uplink-downlink switching from the DU of the parent node. Each piece of information may inform, for example, that the position of the guard symbol is set for the front and rear 4 symbols (total 8 symbols) based on the time when the switching occurs. For example, when switching from symbol n to symbol (n+1), if switching from downlink to uplink (downlink-uplink switching) occurs, the position of the guard symbol may be set for symbols (n−3) to (n+4) in a bitmap manner. Here, as an example, when a guard symbol is set as {0 0 1 1 1 0 0 0}, symbols (n−1) to (n+1) become guard symbols, and a downlink symbol (n−1) and it means that the downlink symbol (n−1) and n and the uplink symbol (n+1) are used as guard symbols.

Meanwhile, the above description may be applied to inform the guard symbol information not used by the IAB node MT due to the overlapping problem. However, for other purposes/reasons, the IAB node MT may be applied to inform information of unused/unusable resources. For example, the DU of the parent node informs the resource information that the DU of the parent node has decided not to use for a specific IAB node MT for multiplexing with the MT of another IAB node or the UE, or the above description may be applied to inform a resource that the DU of the parent node cannot use, for example, a resource whose availability is NA (not available).

Figure 36:
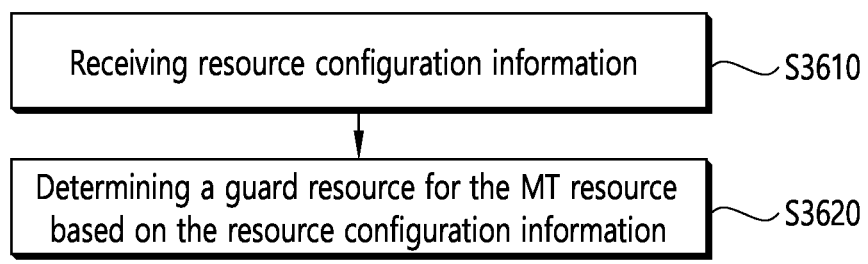
FIG. 36 is a flowchart for an example of a resource configuration method of an IAB node according to some implementations of the present specification.

FIG. 36 is a flowchart for an example of a resource configuration method of an IAB node according to some implementations of the present specification.

Referring to FIG. 36, the IAB node receives resource configuration information (S3610). The resource configuration information may inform the link direction (e.g., downlink, uplink, flexible) of the MT resource for the IAB node.

Thereafter, the IAB node determines a guard resource for the MT resource based on the resource configuration information (S3620).

Here, the guard resource may include at least one of an uplink resource and a downlink resource overlapping in the time domain among the MT resources. Also, here, the uplink resource may be a resource earlier than the downlink resource in the time domain.

Meanwhile, since it is obvious that the above-described various methods can be applied in relation to the setting of the guard resource among the methods of FIG. 36, a redundant description will be omitted.

Hereinafter, an example of a communication system to which the present disclosure is applied will be described.

Although not limited thereto, the various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 37:
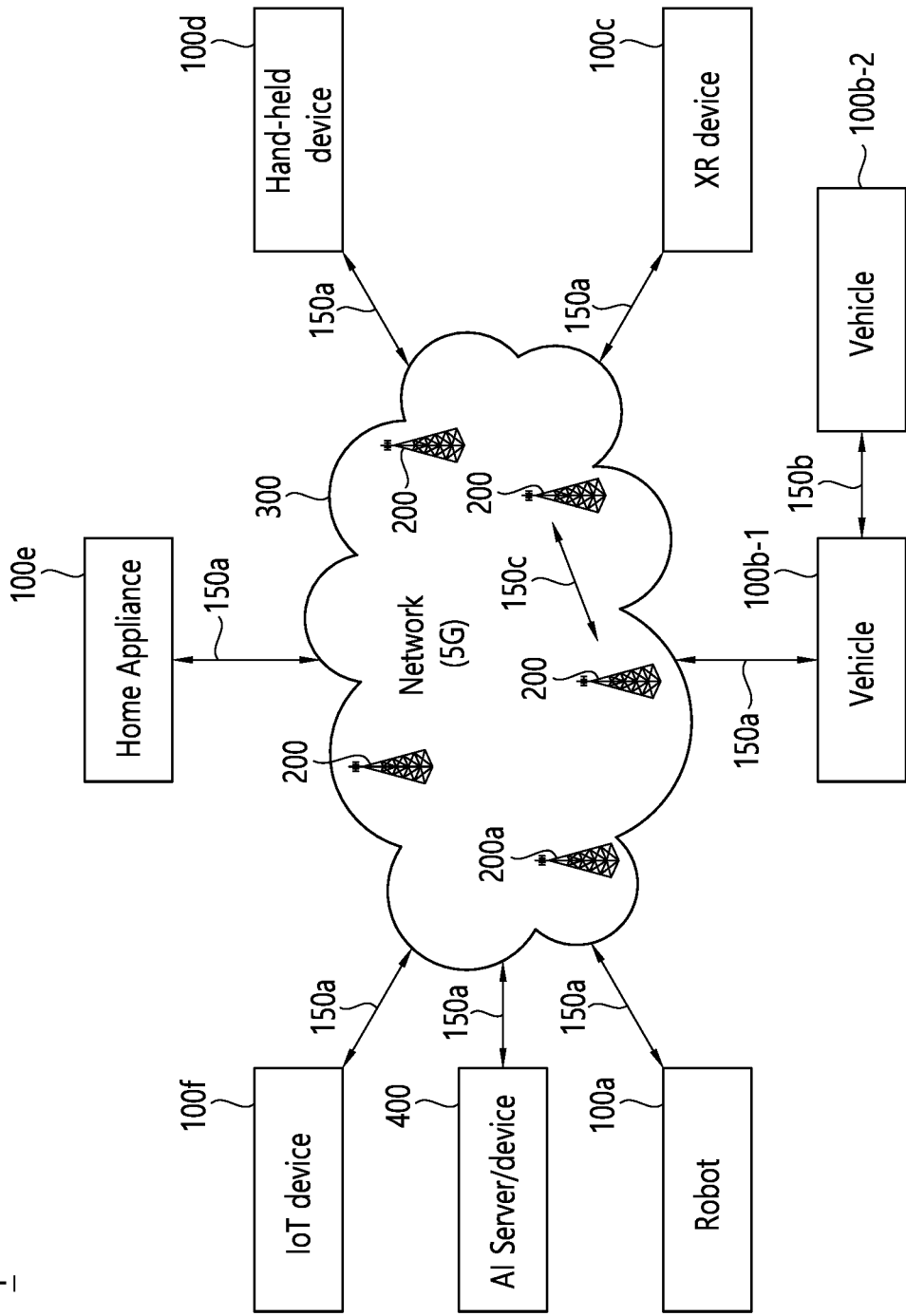
FIG. 37 illustrates a communication system 1 applied to the present specification.

FIG. 37 illustrates a communication system 1 applied to the present disclosure.

Referring to FIG. 37, the communication system 1 applied to the present disclosure includes a wireless device, a base station, and a network. Here, the wireless device refers to a device that performs communication using a wireless access technology (e.g., 5G NR (New RAT), LTE (Long Term Evolution)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e.), an Internet of Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and it may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and a specific wireless device 200a may operate as a base station/network node to other wireless devices.

Here, the wireless communication technology implemented in the wireless device of the present specification may include a narrowband Internet of Things for low-power communication as well as LTE, NR, and 6G. In this case, for example, the NB-IoT technology may be an example of a Low Power Wide Area Network (LPWAN) technology. In addition, it may be implemented in standards such as LTE Cat NB1 and/or LTE Cat NB2, and is not limited to the above-described name. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless device of the present specification may include at least one of ZigBee, Bluetooth, and Low Power Wide Area Network (LPWAN) in consideration of low-power communication, and is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 38:
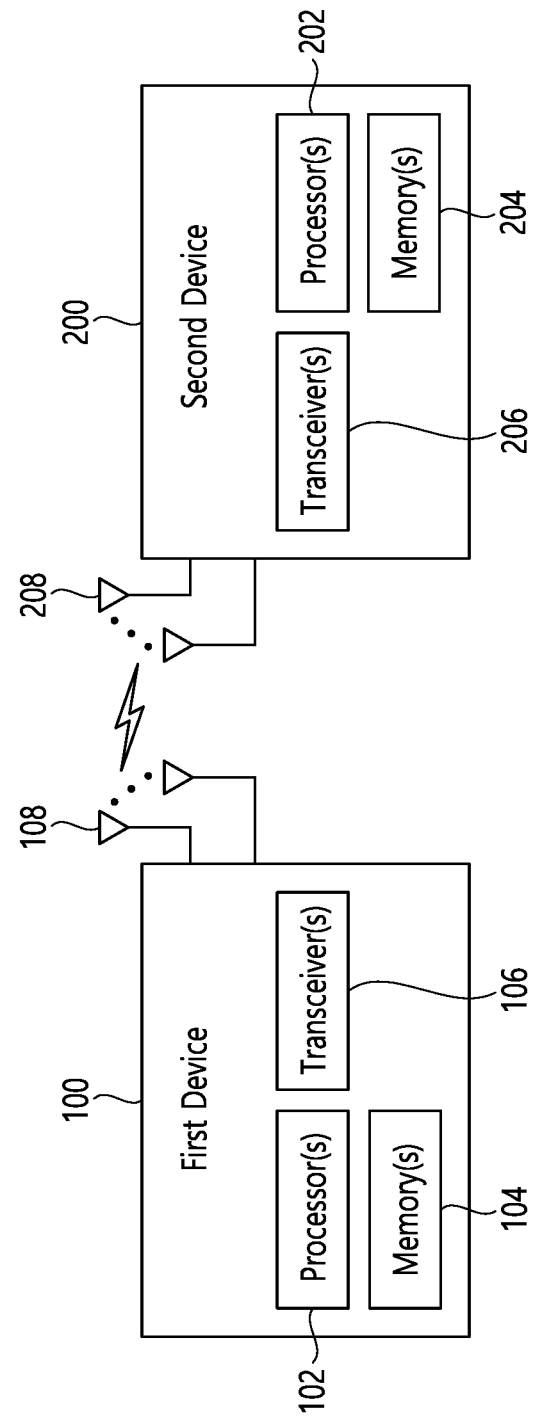
FIG. 38 illustrates a wireless device applicable to the present disclosure.

FIG. 38 illustrates a wireless device applicable to the present disclosure.

Referring to FIG. 38, the first wireless device 100 and the second wireless device 200 may transmit and receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 37.

The first wireless device 100 may include one or more processors 102 and one or more memories 104 and additionally further include one or more transceivers 106 and/or one or more antennas 108. The processors 102 may control the memory 104 and/or the transceivers 106 and may be configured to implement the descriptions, functions, procedures, proposals, methods, and/or operational flowcharts disclosed in this document. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code including commands for performing a part or the entirety of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present disclosure, the wireless device may represent a communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code including commands for performing a part or the entirety of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 39:
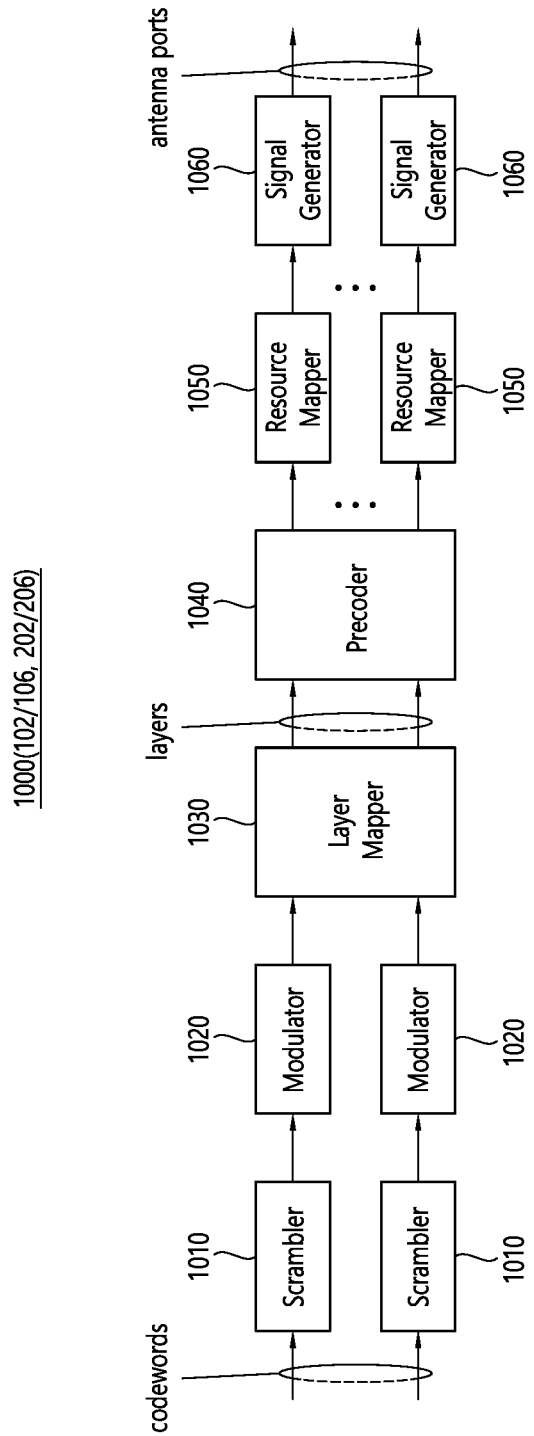
FIG. 39 illustrates a signal processing circuit for a transmission signal.

FIG. 39 exemplifies a signal processing circuit for a transmission signal.

Referring to FIG. 39, a signal processing circuit 1000 includes a scrambler 1010, a modulator 1020, a layer mapper 1030, a precoder 1040, a resource mapper 1050, and a signal generator 1060. The operations/functions of FIG. 39 may be performed in the processors 102 and 202 and/or the transceivers 106 and 206 of FIG. 38 but are not limited thereto. The hardware elements of FIG. 39 may be implemented in the processors 102 and 202 and/or the transceivers 106 and 206 of FIG. 38. For example, blocks 1010 to 1060 may be implemented in the processors 102 and 202 of FIG. 38. In addition, blocks 1010 to 1050 may be implemented in the processors 102 and 202 of FIG. 38, and block 1060 may be implemented in the transceivers 106 and 206 of FIG. 38.

A codeword may be converted into a wireless signal through the signal processing circuit 1000 of FIG. 39. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH).

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 39. For example, a wireless device (e.g., 100 or 200 in FIG. 38) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 40:
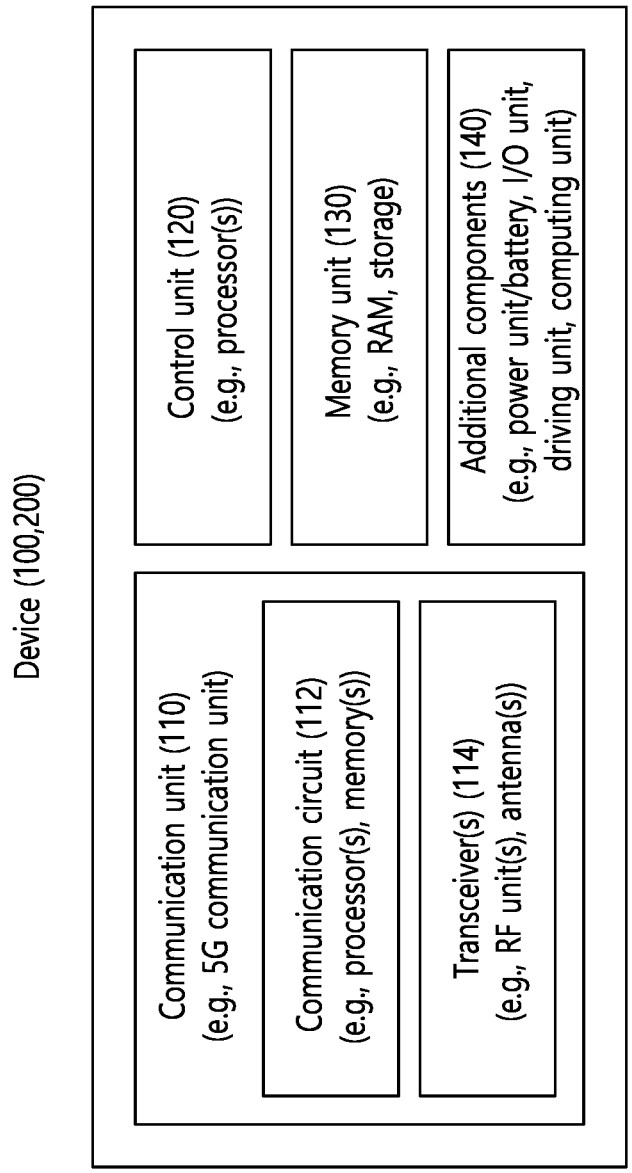
FIG. 40 shows another example of a wireless device applied to the present disclosure.

FIG. 40 shows another example of a wireless device applied to the present disclosure. The wireless device can be implemented in various forms according to use-examples/services (Refer to FIG. 37).

Referring to FIG. 40, wireless devices (100, 200) may correspond to the wireless devices (100, 200) of FIG. 38 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 38. For example, the transceiver(s) (114) may include the one or more transceivers (106, 206) and/or the one or more antennas (108, 208) of FIG. 38. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 37), the vehicles (100*b*-1, 100*b*-2 of FIG. 37), the XR device (100*c* of FIG. 37), the hand-held device (100*d* of FIG. 37), the home appliance (100*e* of FIG. 37), the IoT device (100*f* of FIG. 37), a digital broadcast UE, a hologram device, a public safety device, an MTC device, a medicine device, a fintech device (or a finance device), a security device, a climate/environment device, the AI server/device (400 of FIG. 37), the BS s (200 of FIG. 37), a network node, and so on. The wireless device may be used in a mobile or fixed place according to a usage-example/service.

In FIG. 40, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 40 will be described in detail with reference to the drawings.

Figure 41:
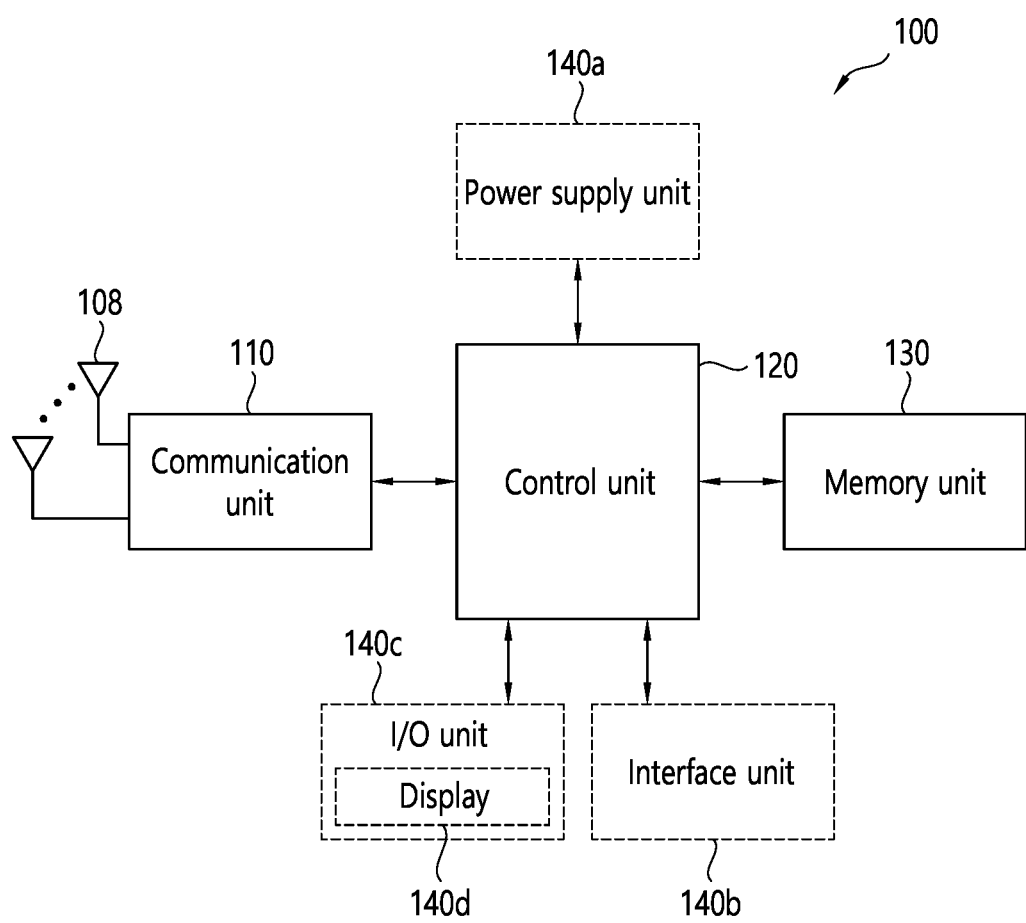
FIG. 41 illustrates a portable device applied to the present disclosure.

FIG. 41 illustrates a portable device applied to the present disclosure. The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 41, the portable device 100 may include an antenna unit 108, a communication unit 110, a controller 120, a memory unit 130, a power supply unit 140*a*, an interface unit 140*b*, and input/output unit 140*c*. The antenna unit 108 may be configured as a part of the communication unit 110. Blocks 110 to 130/140*a* to 140*c* correspond to blocks 110 to 130/140 of FIG. 40, respectively.

The communication unit 110 may transmit and receive signals (e.g., data, control signals, etc.) with other wireless devices and BS s. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140*a* supplies power to the portable device 100 and may include a wired/wireless charging circuit, a battery, and the like. The interface unit 140*b* may support connection between the portable device 100 and other external devices. The interface unit 140*b* may include various ports (e.g., audio input/output ports or video input/output ports) for connection with external devices. The input/output unit 140*c* may receive or output image information/signal, audio information/signal, data, and/or information input from a user. The input/output unit 140*c* may include a camera, a microphone, a user input unit, a display unit 140*d*, a speaker, and/or a haptic module.

For example, in the case of data communication, the input/output unit 140*c* acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140*c*.

Figure 42:
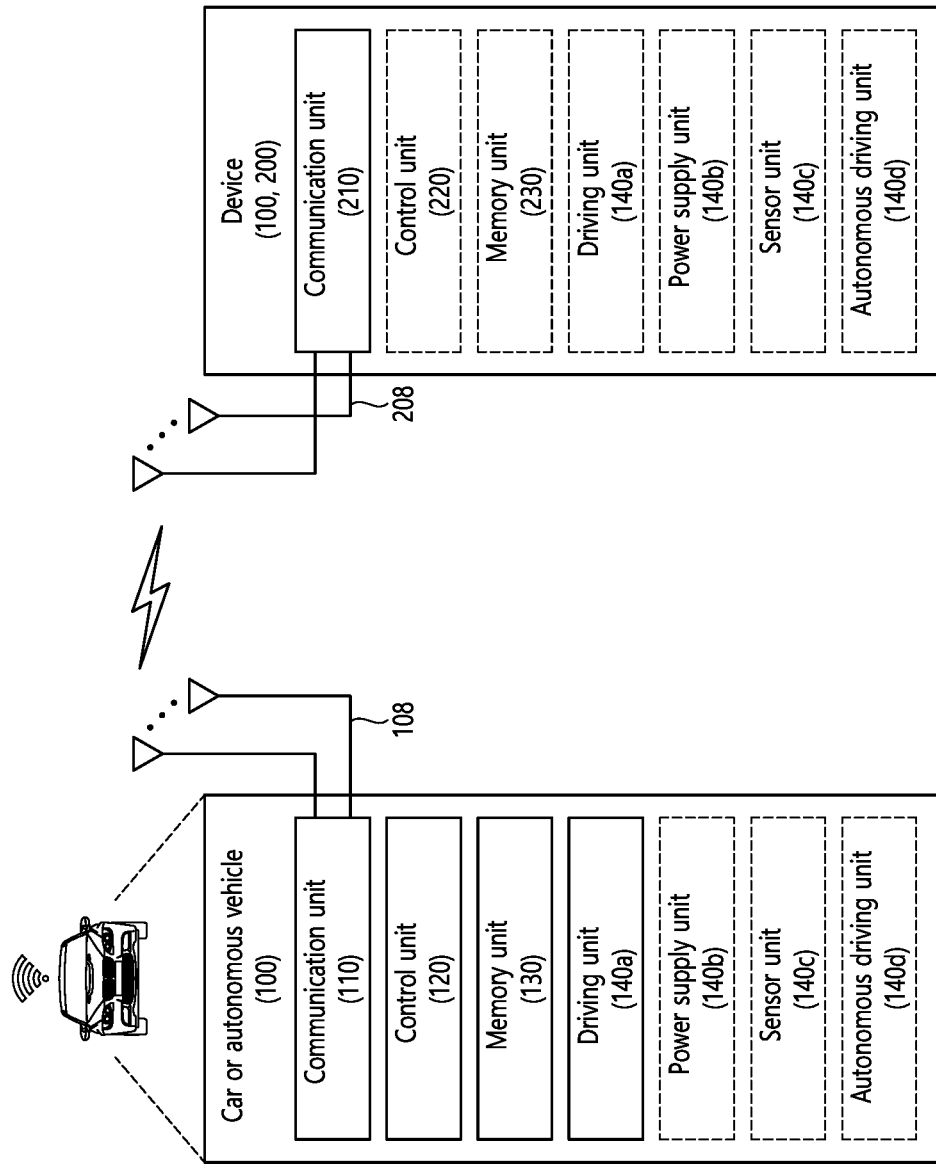
FIG. 42 illustrates a vehicle or an autonomous driving vehicle applied to the present disclosure.

FIG. 42 illustrates a vehicle or an autonomous vehicle applied to the present disclosure. A vehicle or an autonomous vehicle may be implemented as a moving robot, a vehicle, a train, an aerial vehicle (AV), a ship, or the like.

Referring to FIG. 42, a vehicle or autonomous vehicle 100 includes an antenna unit 108, a communication unit 110, a control unit 120, a driving unit 140*a*, a power supply unit 140*b*, and a sensor unit 140*c*, and an autonomous driving unit 140*d*. The antenna unit 108 may be configured as a portion of the communication unit 110. Blocks 110/130/140*a* to 140*d* correspond to blocks 110/130/140 of FIG. 40, respectively.

The communication unit 110 may transmit and receive signals (e.g., data, control signals, etc.) with external devices such as other vehicles, base stations (BSs) (e.g. base station, roadside unit, etc.), and servers. The control unit 120 may perform various operations by controlling elements of the vehicle or the autonomous vehicle 100. The control unit 120 may include an electronic control unit (ECU). The driving unit 140*a* may cause the vehicle or the autonomous vehicle 100 to travel on the ground. The driving unit 140*a* may include an engine, a motor, a power train, a wheel, a brake, a steering device, and the like. The power supply unit 140*b* supplies power to the vehicle or the autonomous vehicle 100, and may include a wired/wireless charging circuit, a battery, and the like. The sensor unit 140*c* may obtain vehicle status, surrounding environment information, user information, and the like. The sensor unit 140*c* may include an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, a pedal position sensor, etc. The autonomous driving unit 140*d* may implement a technology of maintaining a driving lane, a technology of automatically adjusting a speed such as adaptive cruise control, a technology of automatically traveling along a predetermined route, and a technology of automatically setting a route and traveling when a destination is set.

For example, the communication unit 110 may receive map data, traffic information data, and the like from an external server. The autonomous driving unit 140*d* may generate an autonomous driving route and a driving plan based on the acquired data. The control unit 120 may control the driving unit 140*a* so that the vehicle or the autonomous vehicle 100 moves along the autonomous driving route according to the driving plan (e.g., speed/direction adjustment). During autonomous driving, the communication unit 110 may asynchronously/periodically acquire the latest traffic information data from an external server and may acquire surrounding traffic information data from surrounding vehicles. In addition, during autonomous driving, the sensor unit 140*c* may acquire vehicle state and surrounding environment information. The autonomous driving unit 140*d* may update the autonomous driving route and the driving plan based on newly acquired data/information. The communication unit 110 may transmit information on a vehicle location, an autonomous driving route, a driving plan, and the like to the external server. The external server may predict traffic information data in advance using AI technology or the like based on information collected from the vehicle or autonomous vehicles and may provide the predicted traffic information data to the vehicle or autonomous vehicles.

Figure 43:
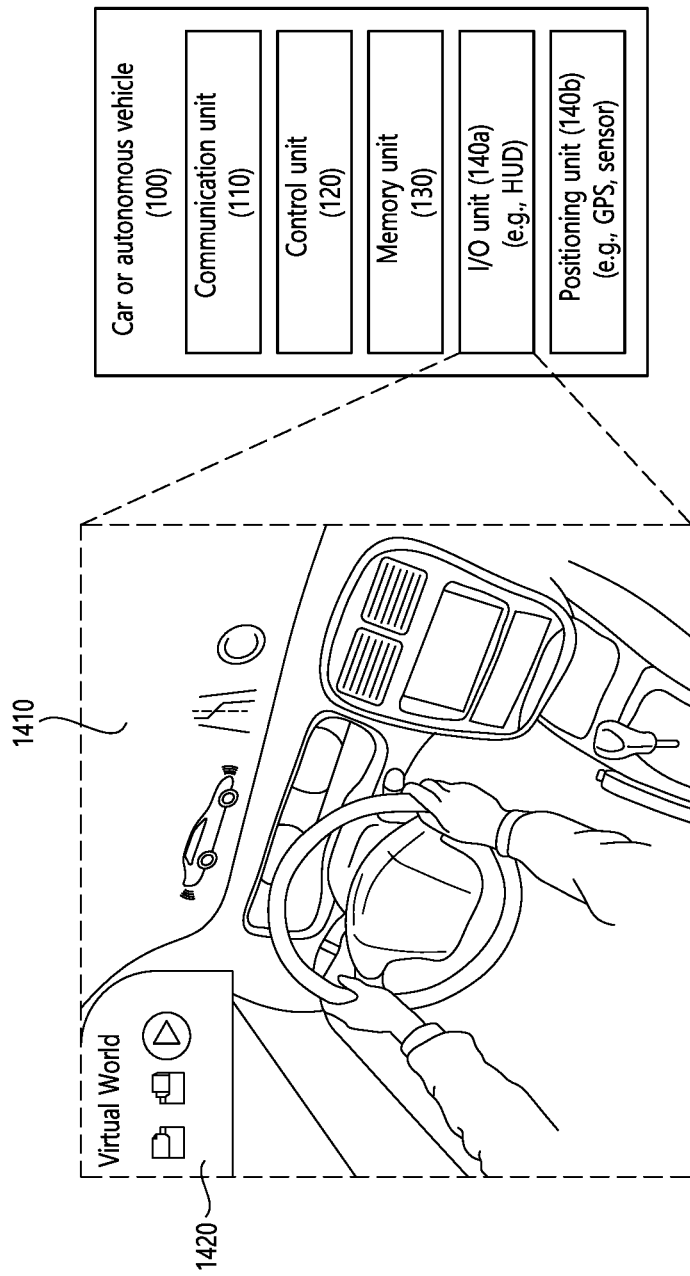
FIG. 43 illustrates a vehicle applied to the present disclosure.

FIG. 43 illustrates a vehicle applied to the present disclosure. Vehicles may also be implemented as means of transportation, trains, aircraft, and ships.

Referring to FIG. 43, the vehicle 100 may include a communication unit 110, a control unit 120, a memory unit 130, an input/output unit 140*a*, and a position measurement unit 140*b*. Here, blocks 110 to 130/140*a* to 140*d* correspond to blocks 110 to 130/140 of FIG. 40, respectively.

The communication unit 110 may transmit and receive signals (e.g., data, control signals, etc.) with other vehicles or external devices such as a BS. The control unit 120 may perform various operations by controlling components of the vehicle 100. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The location measurement unit 140*b* may acquire location information of the vehicle 100. The location information may include absolute location information of the vehicle 100, location information within a driving line, acceleration information, location information with surrounding vehicles, and the like. The location measurement unit 140*b* may include a GPS and various sensors.

For example, the communication unit 110 of the vehicle 100 may receive map information, traffic information, etc., from an external server and store the information in the memory unit 130. The location measurement unit 140*b* may acquire vehicle location information through GPS and various sensors and store the vehicle location information in the memory unit 130. The control unit 120 may generate a virtual object based the on map information, the traffic information, the vehicle location information, and the like, and the input/output unit 140*a* may display the generated virtual object on a window of the vehicle (1410, 1420). In addition, the control unit 120 may determine whether the vehicle 100 is operating normally within a driving line based on vehicle location information. When the vehicle 100 deviates from the driving line abnormally, the control unit 120 may display a warning on a windshield of the vehicle through the input/output unit 140*a*. In addition, the control unit 120 may broadcast a warning message regarding a driving abnormality to nearby vehicles through the communication unit 110. Depending on a situation, the control unit 120 may transmit location information of the vehicle and information on driving/vehicle abnormalities to related organizations through the communication unit 110.

Figure 44:
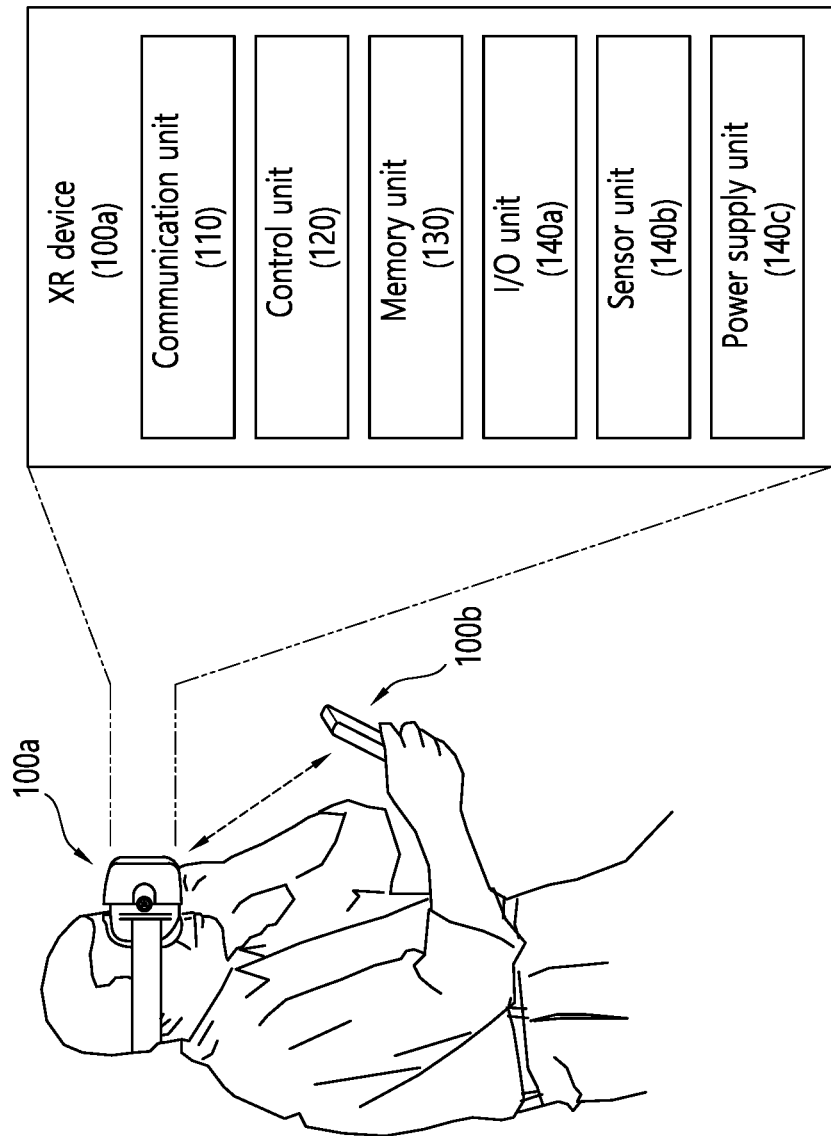
FIG. 44 illustrates an XR device applied to the present disclosure.

FIG. 44 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 44, the XR device 100*a* may include a communication unit 110, a control unit 120, a memory unit 130, an input/output unit 140*a*, a sensor unit 140*b*, and a power supply unit 140c. Here, blocks 110 to 130/140a to 140c correspond to blocks 110 to 130/140 of FIG. 40, respectively.

The communication unit 110 may transmit and receive signals (e.g., media data, control signals, etc.) with external devices such as other wireless devices, portable devices, media servers. Media data may include images, sounds, and the like. The control unit 120 may perform various operations by controlling components of the XR device 100a. For example, the control unit 120 may be configured to control and/or perform procedures such as video/image acquisition, (video/image) encoding, and metadata generating and processing. The memory unit 130 may store data/parameters/programs/codes/commands required for driving the XR device 100a/generating an XR object. The input/output unit 140a may obtain control information, data, etc. from the outside and may output the generated XR object. The input/output unit 140a may include a camera, a microphone, a user input unit, a display unit, a speaker, and/or a haptic module. The sensor unit 140b may obtain XR device status, surrounding environment information, user information, and the like. The sensor unit 140b may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140c may supply power to the XR device 100a and may include a wired/wireless charging circuit, a battery, and the like.

As an example, the memory unit 130 of the XR device 100a may include information (e.g., data, etc.) necessary for generating an XR object (e.g., AR/VR/MR object). The input/output unit 140a may acquire a command to manipulate the XR device 100a from a user, and the control unit 120 may drive the XR device 100a according to the user's driving command. For example, when the user tries to watch a movie, news, etc., through the XR device 100a, the control unit 120 may transmit content request information through the communication unit 130 to another device (for example, the portable device 100b) or to a media server. The communication unit 130 may download/stream content such as movies and news from another device (e.g., the portable device 100b) or the media server to the memory unit 130. The control unit 120 may control and/or perform procedures such as video/image acquisition, (video/image) encoding, and metadata generating/processing for the content, and generate/output an XR object based on information on a surrounding space or a real object through the input/output unit 140a/sensor unit 140b.

In addition, the XR device 100a may be wirelessly connected to the portable device 100b through the communication unit 110, and an operation of the XR device 100a may be controlled by the portable device 100b. For example, the portable device 100b may operate as a controller for the XR device 100a. To this end, the XR device 100a may acquire 3D location information of the portable device 100b, generate an XR entity corresponding to the portable device 100b, and output the generated XR entity.

Figure 45:
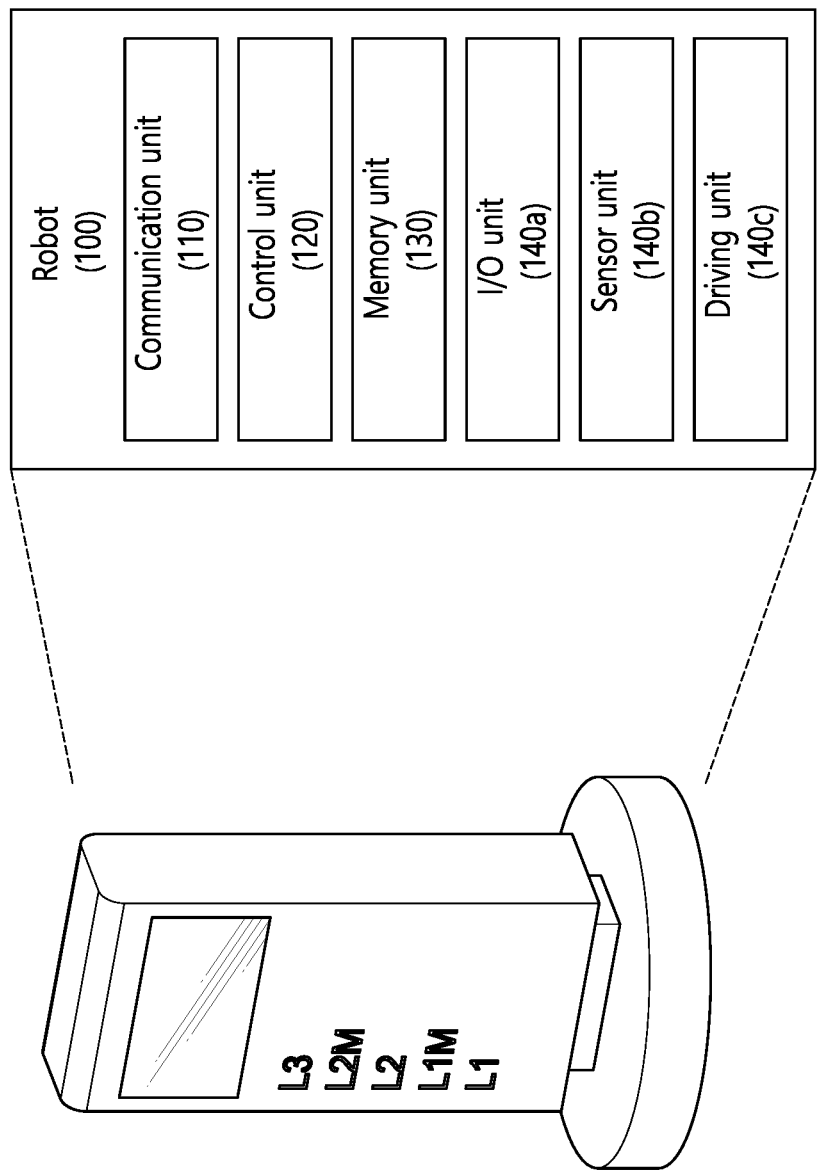
FIG. 45 illustrates a robot applied to the present disclosure.

FIG. 45 illustrates a robot applied to the present disclosure. Robots may be classified as industrial, medical, household, military, etc. depending on the purpose or field of use.

Referring to FIG. 45, a robot 100 may include a communication unit 110, a control unit 120, a memory unit 130, an input/output unit 140a, a sensor unit 140b, and a driving unit 140c. Here, blocks 110 to 130/140a to 140d correspond to blocks 110 to 130/140 of FIG. 40, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The input/output unit 140a may acquire information from the outside of the robot 100 and may output the information to the outside of the robot 100. The input/output unit 140a may include a camera, a microphone, a user input unit, a display unit, a speaker, and/or a haptic module. The sensor unit 140b may obtain internal information, surrounding environment information, user information, and the like of the robot 100. The sensor unit 140b may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may cause the robot 100 to travel on the ground or fly in the air. The driving unit 140c may include an actuator, a motor, a wheel, a brake, a propeller, and the like.

Figure 46:
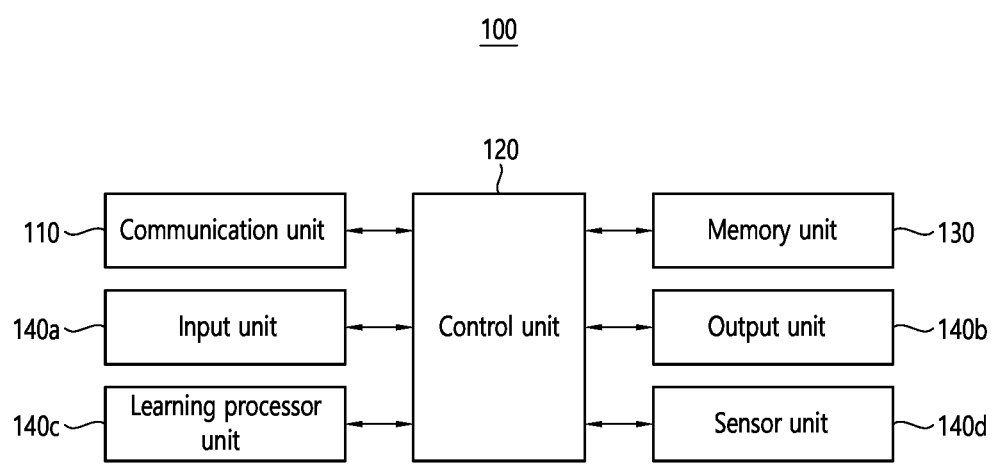
FIG. 46 illustrates an AI device applied to the present disclosure.

FIG. 46 illustrates an AI device applied to the present disclosure. AI devices may be implemented as fixed devices or moving devices such as TVs, projectors, smartphones, PCs, notebooks, digital broadcasting UEs, tablet PCs, wearable devices, set-top boxes (STBs), radios, washing machines, refrigerators, digital signage, robots, vehicles, etc.

Referring to FIG. 46, the AI device 100 may include a communication unit 110, a control unit 120, a memory unit 130, an input/output unit 140a/140b, a learning processor unit 140c, and a sensor unit. Blocks 110 to 130/140a to 140d correspond to blocks 110 to 130/140 of FIG. 40, respectively.

The communication unit 110 may transmit and receive wireless signals (e.g., sensor information, user input, learning model, control signals, etc.) with external devices such as another AI device (e.g., FIG. 37, 100x, 200, or 400) or an AI server (e.g., 400 in FIG. 37) using wired/wireless communication technology. To this end, the communication unit 110 may transmit information in the memory unit 130 to an external device or may transfer a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data from the learning processor unit 140c or the memory unit 130, and may control components of the AI device 100 to execute a predicted operation among at least one an executable operation or an operation determined to be desirable. In addition, the control unit 120 may collect history information including operation content of the AI device 100 or the user's feedback on the operation, and store the collected information in the memory unit 130 or the learning processor unit 140c or transmit the information to an external device such as an AI server (400 of FIG. 38). The collected historical information may be used to update a learning model.

The memory unit 130 may store data supporting various functions of the AI device 100. For example, the memory unit 130 may store data obtained from the input unit 140a, data obtained from the communication unit 110, output data from the learning processor unit 140c, and data obtained from the sensing unit 140. In addition, the memory unit 130 may store control information and/or software codes necessary for the operation/execution of the control unit 120.

The input unit 140a may acquire various types of data from the outside of the AI device 100. For example, the input unit 140a may acquire training data for model training and input data to which the training model is applied. The input unit 140a may include a camera, a microphone, and/or a user input unit. The output unit 140b may generate output related to visual, auditory, or tactile sense. The output unit 140b may include a display unit, a speaker, and/or a haptic module. The sensing unit 140 may obtain at least one of internal information of the AI device 100, surrounding environment information of the AI device 100, and user information by using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140c may train a model configured as an artificial neural network using training data. The learning processor unit 140c may perform AI processing together with the learning processor unit (400 in FIG. 36) of the AI server. The learning processor unit 140c may process information received from an external device through the communication unit 110 and/or information stored in the memory unit 130. In addition, an output value of the learning processor unit 140c may be transmitted to an external device through the communication unit 110 and/or may be stored in the memory unit 130.

What is claimed is:

1. A method, comprising:
receiving, by an integrated access and backhaul (IAB) node including a mobile termination (MT) and a distributed unit (DU), resource configuration information, wherein the resource configuration information includes link directions of a MT resources for the IAB node, wherein the MT resources comprises MT uplink resources and MT downlink resources,
receiving, by the IAB node, guard symbol information through at least one of a cell-specific configuration and a MT-specific configuration; and
determining, by the IAB node, a guard resource for the MT resources based on the resource configuration information and the guard symbol information,
wherein based on the MT of the IAB node performing a switching from an uplink to a downlink, guard symbol information received through the cell-specific configuration is used and based on the MT of the IAB node performing a switching from a downlink to an uplink, guard symbol information received through the MT-specific configuration is used.

2. The method of claim 1, wherein the MT resources are resources related to a communication between the IAB node and a parent node of the IAB node.

3. The method of claim 1, wherein the resource configuration information is cell-specific information.

4. The method of claim 1, wherein the IAB node does not perform a communication with a parent node of the IAB node on the guard resource.

5. The method of claim 1, wherein based on the IAB node being configured to transmit or receive a synchronization signal/physical broadcast channel (SS/PBCH) block on a guard symbol, the IAB node transmits or receives the SS/PBCH block on the guard symbol.

6. The method of claim 1, wherein based on the IAB node being configured to receive a channel state information-reference signal (CSI-RS) on a guard symbol, the IAB node receives the CSI-RS on the guard symbol.

7. The method of claim 1, wherein based on the IAB node being configured to transmit a physical random access channel (PRACH) on a guard symbol, the IAB node transmits the PRACH on the guard symbol.

8. The method of claim 1, wherein based on the IAB node being configured to transmit a scheduling request (SR) on a guard symbol, the IAB node transmits the SR on the guard symbol.

9. The method of claim 1, wherein the guard resource is set periodically.

10. An integrated access and backhaul (IAB) node including a mobile termination (MT) and a distributed unit (DU), the IAB node comprising:
at least one memory;
at least one transceiver; and
at least one processor operably connectable to the at least one transceiver and the at least one memory,
wherein the at least one memory stores instructions that, based on being executed by the at least one processor, cause the at least one processor to perform operations comprising:
receiving resource configuration information, wherein the resource configuration information includes link directions of MT resources for the IAB node, wherein the MT resources comprises MT uplink resources and MT downlink resources,
receiving guard symbol information through at least one of a cell-specific configuration and a MT-specific configuration; and
determining a guard resource for the MT resources based on the resource configuration information and the guard symbol information,
wherein based on the MT of the IAB node performing a switching from an uplink to a downlink, guard symbol information received through the cell-specific configuration is used and based on the MT of the IAB node performing a switching from a downlink to an uplink, guard symbol information received through the MT-specific configuration is used.

11. The IAB node of claim 10, wherein the IAB node communicates with at least one of a user equipment (UE), a network, and an autonomous vehicle other than the IAB node.

12. An apparatus configured to control an integrated access and backhaul (IAB) node including a mobile termination (MT) and a distributed unit (DU), the apparatus comprising:
at least one memory; and
at least one processor operably connectable to the at least one memory,
wherein the at least one memory stores instructions that, based on being executed by the at least one processor, cause the at least one processor to perform operations comprising:
receiving resource configuration information, wherein the resource configuration information includes link directions of mobile termination (MT) resources for the IAB node, wherein the MT resources comprises MT uplink resources and MT downlink resources, receiving guard symbol information through at least one of a cell-specific configuration and a MT-specific configuration; and determining a guard resource for the MT resources based on the resource configuration information and the guard symbol information, wherein based on the MT of the IAB node performing a switching from an uplink to a downlink, guard symbol information received through the cell-specific configuration is used and based on the MT of the IAB node performing a switching from a downlink to an uplink, guard symbol information received through the MT-specific configuration is used.

* * * * *